US007710483B2

(12) United States Patent
Kato

(10) Patent No.: US 7,710,483 B2
(45) Date of Patent: May 4, 2010

(54) SOLID-STATE IMAGING APPARATUS, DRIVING METHOD THEREOF, AND CAMERA

(75) Inventor: Yoshiaki Kato, Shiga (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 11/858,209

(22) Filed: Sep. 20, 2007

(65) Prior Publication Data

US 2008/0074527 A1 Mar. 27, 2008

(30) Foreign Application Priority Data

Sep. 21, 2006 (JP) ............................. 2006-256068

(51) Int. Cl.
*H04N 5/335* (2006.01)
*H04N 9/64* (2006.01)

(52) U.S. Cl. ........................ 348/311; 348/245; 348/294

(58) Field of Classification Search ................. 348/311, 348/294, 245
See application file for complete search history.

(56) References Cited

U.S. PATENT DOCUMENTS 4,498,105 A * 2/1985 Crawshaw .................. 348/245

(Continued)

FOREIGN PATENT DOCUMENTS

JP 9-298755 11/1997
JP 2004-180284 6/2004

OTHER PUBLICATIONS

English language Abstract of JP 9-298755.

(Continued)

*Primary Examiner*—Sinh Tran
*Assistant Examiner*—Hung H Lam
(74) *Attorney, Agent, or Firm*—Greenblum & Bernstein, P.L.C.

(57) ABSTRACT

A solid-state imaging apparatus includes: a plurality of light-receiving elements which are arranged by rows and columns; a plurality of vertical transfer units each of which is arranged for a corresponding column of the light-receiving elements, and is operable to vertically transfer a plurality of signal packets and a dummy packet in a packets-mixing mode, the signal packet including charges read from the light-receiving elements, the dummy packet being a packet other than the signal packets, and N columns of the vertical transfer units forming one column group; a plurality of holding units which are arranged in final stages of the vertical transfer units in N columns except M columns in the column group, and each of which is operable to mix, hold, and vertically transfer charges of the signal packets and the dummy packet without depending on vertical transfer from upstream of the corresponding vertical transfer unit; a horizontal transfer unit operable to mix, hold, and horizontally transfer the charges transferred from the holding units or the vertical transfer units in the M columns in the column group; and a driving unit operable to drive the vertical transfer units, the holding units, and the horizontal transfer unit, wherein the driving unit is operable to drive, in the packets-mixing mode, the holding units and the horizontal transfer unit to generate a first mixed packet and a second mixed packet in the horizontal transfer unit, the first mixed packet includes: a plurality of signal packets belonging to a same row and neighbor columns of a same color; and a dummy packet belonging to a same column as the signal packets, and the second mixed packet includes no signal packet but a plurality of dummy packets in a same column as the signal packets included in the first mixed packets.

17 Claims, 70 Drawing Sheets

U.S. PATENT DOCUMENTS

| | | | | |
|---|---|---|---|---|
| 4,660,090 | A * | 4/1987 | Hynecek | 348/311 |
| 7,148,524 | B2 * | 12/2006 | Ozumi | 257/223 |
| 2004/0150729 | A1 * | 8/2004 | Nishizawa et al. | 348/243 |
| 2004/0150733 | A1 | 8/2004 | Nagayoshi et al. | |
| 2005/0017154 | A1 * | 1/2005 | Ozumi | 250/208.1 |
| 2007/0165128 | A1 | 7/2007 | Kato | |
| 2007/0235756 | A1 | 10/2007 | Kato | |
| 2008/0301380 | A1 * | 12/2008 | Itho | 711/154 |

OTHER PUBLICATIONS

English language Abstract of JP 2004-180284.
U.S. Appl. No. 11/776,979 to Kato, filed Jul. 12, 2007.

* cited by examiner

Figure 8A:
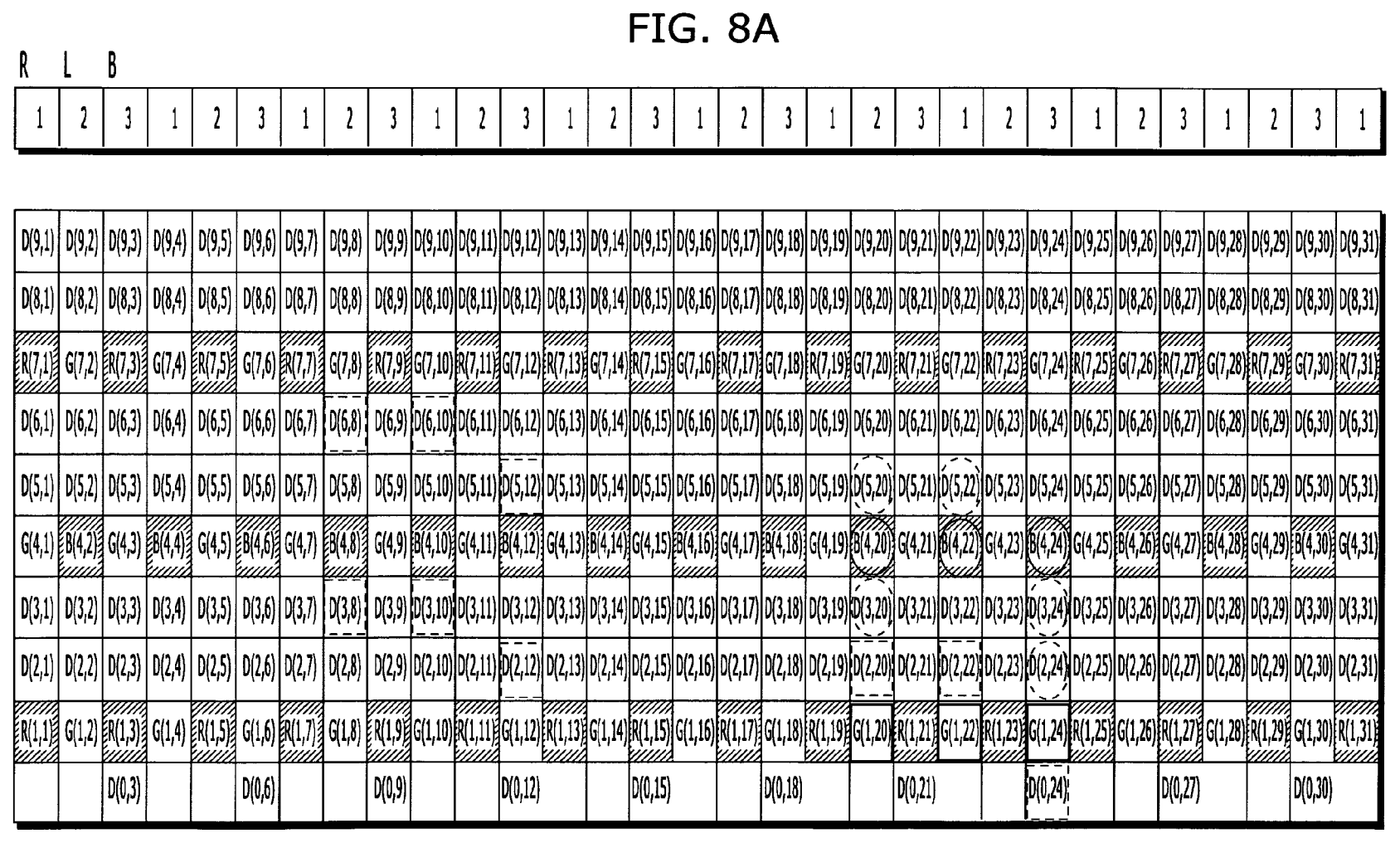

| 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 |
|---|---|---|---|---|---|---|---|---|---|---|---|---|---|---|---|---|---|---|---|---|---|---|---|---|---|---|---|---|---|---|
| D(9,1) | D(9,2) | D(9,3) | D(9,4) | D(9,5) | D(9,6) | D(9,7) | D(9,8) | D(9,9) | D(9,10) | D(9,11) | D(9,12) | D(9,13) | D(9,14) | D(9,15) | D(9,16) | D(9,17) | D(9,18) | D(9,19) | D(9,20) | D(9,21) | D(9,22) | D(9,23) | D(9,24) | D(9,25) | D(9,26) | D(9,27) | D(9,28) | D(9,29) | D(9,30) | D(9,31) |
| D(8,1) | D(8,2) | D(8,3) | D(8,4) | D(8,5) | D(8,6) | D(8,7) | D(8,8) | D(8,9) | D(8,10) | D(8,11) | D(8,12) | D(8,13) | D(8,14) | D(8,15) | D(8,16) | D(8,17) | D(8,18) | D(8,19) | D(8,20) | D(8,21) | D(8,22) | D(8,23) | D(8,24) | D(8,25) | D(8,26) | D(8,27) | D(8,28) | D(8,29) | D(8,30) | D(8,31) |
| R(7,1) | G(7,2) | R(7,3) | G(7,4) | R(7,5) | G(7,6) | R(7,7) | G(7,8) | R(7,9) | G(7,10) | R(7,11) | G(7,12) | R(7,13) | G(7,14) | R(7,15) | G(7,16) | R(7,17) | G(7,18) | R(7,19) | G(7,20) | R(7,21) | G(7,22) | R(7,23) | G(7,24) | R(7,25) | G(7,26) | R(7,27) | G(7,28) | R(7,29) | G(7,30) | R(7,31) |
| D(6,1) | D(6,2) | D(6,3) | D(6,4) | D(6,5) | D(6,6) | D(6,7) | D(6,8) | D(6,9) | D(6,10) | D(6,11) | D(6,12) | D(6,13) | D(6,14) | D(6,15) | D(6,16) | D(6,17) | D(6,18) | D(6,19) | D(6,20) | D(6,21) | D(6,22) | D(6,23) | D(6,24) | D(6,25) | D(6,26) | D(6,27) | D(6,28) | D(6,29) | D(6,30) | D(6,31) |
| D(5,1) | D(5,2) | D(5,3) | D(5,4) | D(5,5) | D(5,6) | D(5,7) | D(5,8) | D(5,9) | D(5,10) | D(5,11) | D(5,12) | D(5,13) | D(5,14) | D(5,15) | D(5,16) | D(5,17) | D(5,18) | D(5,19) | D(5,20) | D(5,21) | D(5,22) | D(5,23) | D(5,24) | D(5,25) | D(5,26) | D(5,27) | D(5,28) | D(5,29) | D(5,30) | D(5,31) |
| G(4,1) | B(4,2) | G(4,3) | B(4,4) | G(4,5) | B(4,6) | G(4,7) | B(4,8) | G(4,9) | B(4,10) | G(4,11) | B(4,12) | G(4,13) | B(4,14) | G(4,15) | B(4,16) | G(4,17) | B(4,18) | G(4,19) | B(4,20) | G(4,21) | B(4,22) | G(4,23) | B(4,24) | G(4,25) | B(4,26) | G(4,27) | B(4,28) | G(4,29) | B(4,30) | G(4,31) |
| D(3,1) | D(3,2) | D(3,3) | D(3,4) | D(3,5) | D(3,6) | D(3,7) | D(3,8) | D(3,9) | D(3,10) | D(3,11) | D(3,12) | D(3,13) | D(3,14) | D(3,15) | D(3,16) | D(3,17) | D(3,18) | D(3,19) | D(3,20) | D(3,21) | D(3,22) | D(3,23) | D(3,24) | D(3,25) | D(3,26) | D(3,27) | D(3,28) | D(3,29) | D(3,30) | D(3,31) |
| D(2,1) | D(2,2) | D(2,3) | D(2,4) | D(2,5) | D(2,6) | D(2,7) | D(2,8) | D(2,9) | D(2,10) | D(2,11) | D(2,12) | D(2,13) | D(2,14) | D(2,15) | D(2,16) | D(2,17) | D(2,18) | D(2,19) | D(2,20) | D(2,21) | D(2,22) | D(2,23) | D(2,24) | D(2,25) | D(2,26) | D(2,27) | D(2,28) | D(2,29) | D(2,30) | D(2,31) |
| R(1,1) | G(1,2) | R(1,3) | G(1,4) | R(1,5) | G(1,6) | R(1,7) | G(1,8) | R(1,9) | G(1,10) | R(1,11) | G(1,12) | R(1,13) | G(1,14) | R(1,15) | G(1,16) | R(1,17) | G(1,18) | R(1,19) | G(1,20) | R(1,21) | G(1,22) | R(1,23) | G(1,24) | R(1,25) | G(1,26) | R(1,27) | G(1,28) | R(1,29) | G(1,30) | R(1,31) |
| | | D(0,3) | | | D(0,6) | | | D(0,9) | | | D(0,12) | | | D(0,15) | | | D(0,18) | | | D(0,21) | | | D(0,24) | | | D(0,27) | | | D(0,30) | |

FIG. 8B

| R | L | B | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 |
| D(9,1) | D(9,2) | D(9,3) | D(9,4) | D(9,5) | D(9,6) | D(9,7) | D(9,8) | D(9,9) | D(9,10) | D(9,11) | D(9,12) | D(9,13) | D(9,14) | D(9,15) | D(9,16) | D(9,17) | D(9,18) | D(9,19) | D(9,20) | D(9,21) | D(9,22) | D(9,23) | D(9,24) | D(9,25) | D(9,26) | D(9,27) | D(9,28) | D(9,29) | D(9,30) | D(9,31) |
| D(8,1) | D(8,2) | D(8,3) | D(8,4) | D(8,5) | D(8,6) | D(8,7) | D(8,8) | D(8,9) | D(8,10) | D(8,11) | D(8,12) | D(8,13) | D(8,14) | D(8,15) | D(8,16) | D(8,17) | D(8,18) | D(8,19) | D(8,20) | D(8,21) | D(8,22) | D(8,23) | D(8,24) | D(8,25) | D(8,26) | D(8,27) | D(8,28) | D(8,29) | D(8,30) | D(8,31) |
| R(7,1) | G(7,2) | R(7,3) | G(7,4) | R(7,5) | G(7,6) | R(7,7) | G(7,8) | R(7,9) | G(7,10) | R(7,11) | G(7,12) | R(7,13) | G(7,14) | R(7,15) | G(7,16) | R(7,17) | G(7,18) | R(7,19) | G(7,20) | R(7,21) | G(7,22) | R(7,23) | G(7,24) | R(7,25) | G(7,26) | R(7,27) | G(7,28) | R(7,29) | G(7,30) | R(7,31) |
| D(6,1) | D(6,2) | D(6,3) | D(6,4) | D(6,5) | D(6,6) | D(6,7) | D(6,8) | D(6,9) | D(6,10) | D(6,11) | D(6,12) | D(6,13) | D(6,14) | D(6,15) | D(6,16) | D(6,17) | D(6,18) | D(6,19) | D(6,20) | D(6,21) | D(6,22) | D(6,23) | D(6,24) | D(6,25) | D(6,26) | D(6,27) | D(6,28) | D(6,29) | D(6,30) | D(6,31) |
| D(5,1) | D(5,2) | D(5,3) | D(5,4) | D(5,5) | D(5,6) | D(5,7) | D(5,8) | D(5,9) | D(5,10) | D(5,11) | D(5,12) | D(5,13) | D(5,14) | D(5,15) | D(5,16) | D(5,17) | D(5,18) | D(5,19) | D(5,20) | D(5,21) | D(5,22) | D(5,23) | D(5,24) | D(5,25) | D(5,26) | D(5,27) | D(5,28) | D(5,29) | D(5,30) | D(5,31) |
| G(4,1) | B(4,2) | G(4,3) | B(4,4) | G(4,5) | B(4,6) | G(4,7) | B(4,8) | G(4,9) | B(4,10) | G(4,11) | B(4,12) | G(4,13) | B(4,14) | G(4,15) | B(4,16) | G(4,17) | B(4,18) | G(4,19) | B(4,20) | G(4,21) | B(4,22) | G(4,23) | B(4,24) | G(4,25) | B(4,26) | G(4,27) | B(4,28) | G(4,29) | B(4,30) | G(4,31) |
| D(3,1) | D(3,2) | D(3,3) | D(3,4) | D(3,5) | D(3,6) | D(3,7) | D(3,8) | D(3,9) | D(3,10) | D(3,11) | D(3,12) | D(3,13) | D(3,14) | D(3,15) | D(3,16) | D(3,17) | D(3,18) | D(3,19) | D(3,20) | D(3,21) | D(3,22) | D(3,23) | D(3,24) | D(3,25) | D(3,26) | D(3,27) | D(3,28) | D(3,29) | D(3,30) | D(3,31) |
| D(2,1) | D(2,2) | D(2,3) | D(2,4) | D(2,5) | D(2,6) | D(2,7) | D(2,8) | D(2,9) | D(2,10) | D(2,11) | D(2,12) | D(2,13) | D(2,14) | D(2,15) | D(2,16) | D(2,17) | D(2,18) | D(2,19) | D(2,20) | D(2,21) | D(2,22) | D(2,23) | D(2,24) | D(2,25) | D(2,26) | D(2,27) | D(2,28) | D(2,29) | D(2,30) | D(2,31) |
| R(1,1) | G(1,2) | R(1,3) | G(1,4) | R(1,5) | G(1,6) | R(1,7) | G(1,8) | R(1,9) | G(1,10) | R(1,11) | G(1,12) | R(1,13) | G(1,14) | R(1,15) | G(1,16) | R(1,17) | G(1,18) | R(1,19) | G(1,20) | R(1,21) | G(1,22) | R(1,23) | G(1,24) | R(1,25) | G(1,26) | R(1,27) | G(1,28) | R(1,29) | G(1,30) | R(1,31) |
| | | D(0,3) | | | D(0,6) | | | D(0,9) | | | D(0,12) | | | D(0,15) | | | D(0,18) | | | D(0,21) | | | D(0,24) | | | D(0,27) | | | D(0,30) | |

| 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 |
|---|---|---|---|---|---|---|---|---|---|---|---|---|---|---|---|---|---|---|---|---|---|---|---|---|---|---|---|---|---|---|
| D(9,1) | D(9,2) | D(9,3) | D(9,4) | D(9,5) | D(9,6) | D(9,7) | D(9,8) | D(9,9) | D(9,10) | D(9,11) | D(9,12) | D(9,13) | D(9,14) | D(9,15) | D(9,16) | D(9,17) | D(9,18) | D(9,19) | D(9,20) | D(9,21) | D(9,22) | D(9,23) | D(9,24) | D(9,25) | D(9,26) | D(9,27) | D(9,28) | D(9,29) | D(9,30) | D(9,31) |
| D(8,1) | D(8,2) | D(8,3) | D(8,4) | D(8,5) | D(8,6) | D(8,7) | D(8,8) | D(8,9) | D(8,10) | D(8,11) | D(8,12) | D(8,13) | D(8,14) | D(8,15) | D(8,16) | D(8,17) | D(8,18) | D(8,19) | D(8,20) | D(8,21) | D(8,22) | D(8,23) | D(8,24) | D(8,25) | D(8,26) | D(8,27) | D(8,28) | D(8,29) | D(8,30) | D(8,31) |
| R(7,1) | G(7,2) | R(7,3) | G(7,4) | R(7,5) | G(7,6) | R(7,7) | G(7,8) | R(7,9) | G(7,10) | R(7,11) | G(7,12) | R(7,13) | G(7,14) | R(7,15) | G(7,16) | R(7,17) | G(7,18) | R(7,19) | G(7,20) | R(7,21) | G(7,22) | R(7,23) | G(7,24) | R(7,25) | G(7,26) | R(7,27) | G(7,28) | R(7,29) | G(7,30) | R(7,31) |
| D(6,1) | D(6,2) | D(6,3) | D(6,4) | D(6,5) | D(6,6) | D(6,7) | D(6,8) | D(6,9) | D(6,10) | D(6,11) | D(6,12) | D(6,13) | D(6,14) | D(6,15) | D(6,16) | D(6,17) | D(6,18) | D(6,19) | D(6,20) | D(6,21) | D(6,22) | D(6,23) | D(6,24) | D(6,25) | D(6,26) | D(6,27) | D(6,28) | D(6,29) | D(6,30) | D(6,31) |
| D(5,1) | D(5,2) | D(5,3) | D(5,4) | D(5,5) | D(5,6) | D(5,7) | D(5,8) | D(5,9) | D(5,10) | D(5,11) | D(5,12) | D(5,13) | D(5,14) | D(5,15) | D(5,16) | D(5,17) | D(5,18) | D(5,19) | D(5,20) | D(5,21) | D(5,22) | D(5,23) | D(5,24) | D(5,25) | D(5,26) | D(5,27) | D(5,28) | D(5,29) | D(5,30) | D(5,31) |
| G(4,1) | B(4,2) | G(4,3) | B(4,4) | G(4,5) | B(4,6) | G(4,7) | B(4,8) | G(4,9) | B(4,10) | G(4,11) | B(4,12) | G(4,13) | B(4,14) | G(4,15) | B(4,16) | G(4,17) | B(4,18) | G(4,19) | B(4,20) | G(4,21) | B(4,22) | G(4,23) | B(4,24) | G(4,25) | B(4,26) | G(4,27) | B(4,28) | G(4,29) | B(4,30) | G(4,31) |
| D(3,1) | D(3,2) | D(3,3) | D(3,4) | D(3,5) | D(3,6) | D(3,7) | D(3,8) | D(3,9) | D(3,10) | D(3,11) | D(3,12) | D(3,13) | D(3,14) | D(3,15) | D(3,16) | D(3,17) | D(3,18) | D(3,19) | D(3,20) | D(3,21) | D(3,22) | D(3,23) | D(3,24) | D(3,25) | D(3,26) | D(3,27) | D(3,28) | D(3,29) | D(3,30) | D(3,31) |
| D(2,1) | D(2,2) | D(2,3) | D(2,4) | D(2,5) | D(2,6) | D(2,7) | D(2,8) | D(2,9) | D(2,10) | D(2,11) | D(2,12) | D(2,13) | D(2,14) | D(2,15) | D(2,16) | D(2,17) | D(2,18) | D(2,19) | D(2,20) | D(2,21) | D(2,22) | D(2,23) | D(2,24) | D(2,25) | D(2,26) | D(2,27) | D(2,28) | D(2,29) | D(2,30) | D(2,31) |
| R(1,1) | G(1,2) | R(1,3) | G(1,4) | R(1,5) | G(1,6) | R(1,7) | G(1,8) | R(1,9) | G(1,10) | R(1,11) | G(1,12) | R(1,13) | G(1,14) | R(1,15) | G(1,16) | R(1,17) | G(1,18) | R(1,19) | G(1,20) | R(1,21) | G(1,22) | R(1,23) | G(1,24) | R(1,25) | G(1,26) | R(1,27) | G(1,28) | R(1,29) | G(1,30) | R(1,31) |

FIG. 12B

| R | L | B | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 |
| D(9,1) | D(9,2) | D(9,3) | D(9,4) | D(9,5) | D(9,6) | D(9,7) | D(9,8) | D(9,9) | D(9,10) | D(9,11) | D(9,12) | D(9,13) | D(9,14) | D(9,15) | D(9,16) | D(9,17) | D(9,18) | D(9,19) | D(9,20) | D(9,21) | D(9,22) | D(9,23) | D(9,24) | D(9,25) | D(9,26) | D(9,27) | D(9,28) | D(9,29) | D(9,30) | D(9,31) |
| D(8,1) | D(8,2) | D(8,3) | D(8,4) | D(8,5) | D(8,6) | D(8,7) | D(8,8) | D(8,9) | D(8,10) | D(8,11) | D(8,12) | D(8,13) | D(8,14) | D(8,15) | D(8,16) | D(8,17) | D(8,18) | D(8,19) | D(8,20) | D(8,21) | D(8,22) | D(8,23) | D(8,24) | D(8,25) | D(8,26) | D(8,27) | D(8,28) | D(8,29) | D(8,30) | D(8,31) |
| R(7,1) | G(7,2) | R(7,3) | G(7,4) | R(7,5) | G(7,6) | R(7,7) | G(7,8) | R(7,9) | G(7,10) | R(7,11) | G(7,12) | R(7,13) | G(7,14) | R(7,15) | G(7,16) | R(7,17) | G(7,18) | R(7,19) | G(7,20) | R(7,21) | G(7,22) | R(7,23) | G(7,24) | R(7,25) | G(7,26) | R(7,27) | G(7,28) | R(7,29) | G(7,30) | R(7,31) |
| D(6,1) | D(6,2) | D(6,3) | D(6,4) | D(6,5) | D(6,6) | D(6,7) | D(6,8) | D(6,9) | D(6,10) | D(6,11) | D(6,12) | D(6,13) | D(6,14) | D(6,15) | D(6,16) | D(6,17) | D(6,18) | D(6,19) | D(6,20) | D(6,21) | D(6,22) | D(6,23) | D(6,24) | D(6,25) | D(6,26) | D(6,27) | D(6,28) | D(6,29) | D(6,30) | D(6,31) |
| D(5,1) | D(5,2) | D(5,3) | D(5,4) | D(5,5) | D(5,6) | D(5,7) | D(5,8) | D(5,9) | D(5,10) | D(5,11) | D(5,12) | D(5,13) | D(5,14) | D(5,15) | D(5,16) | D(5,17) | D(5,18) | D(5,19) | D(5,20) | D(5,21) | D(5,22) | D(5,23) | D(5,24) | D(5,25) | D(5,26) | D(5,27) | D(5,28) | D(5,29) | D(5,30) | D(5,31) |
| G(4,1) | B(4,2) | G(4,3) | B(4,4) | G(4,5) | B(4,6) | G(4,7) | B(4,8) | G(4,9) | B(4,10) | G(4,11) | B(4,12) | G(4,13) | B(4,14) | G(4,15) | B(4,16) | G(4,17) | B(4,18) | G(4,19) | B(4,20) | G(4,21) | B(4,22) | G(4,23) | B(4,24) | G(4,25) | B(4,26) | G(4,27) | B(4,28) | G(4,29) | B(4,30) | G(4,31) |
| D(3,1) | D(3,2) | D(3,3) | D(3,4) | D(3,5) | D(3,6) | D(3,7) | D(3,8) | D(3,9) | D(3,10) | D(3,11) | D(3,12) | D(3,13) | D(3,14) | D(3,15) | D(3,16) | D(3,17) | D(3,18) | D(3,19) | D(3,20) | D(3,21) | D(3,22) | D(3,23) | D(3,24) | D(3,25) | D(3,26) | D(3,27) | D(3,28) | D(3,29) | D(3,30) | D(3,31) |
| D(2,1) | D(2,2) | D(2,3) | D(2,4) | D(2,5) | D(2,6) | D(2,7) | D(2,8) | D(2,9) | D(2,10) | D(2,11) | D(2,12) | D(2,13) | D(2,14) | D(2,15) | D(2,16) | D(2,17) | D(2,18) | D(2,19) | D(2,20) | D(2,21) | D(2,22) | D(2,23) | D(2,24) | D(2,25) | D(2,26) | D(2,27) | D(2,28) | D(2,29) | D(2,30) | D(2,31) |
| R(1,1) | G(1,2) | R(1,3) | G(1,4) | R(1,5) | G(1,6) | R(1,7) | G(1,8) | R(1,9) | G(1,10) | R(1,11) | G(1,12) | R(1,13) | G(1,14) | R(1,15) | G(1,16) | R(1,17) | G(1,18) | R(1,19) | G(1,20) | R(1,21) | G(1,22) | R(1,23) | G(1,24) | R(1,25) | G(1,26) | R(1,27) | G(1,28) | R(1,29) | G(1,30) | R(1,31) |
| | | | | | | | | | | | | | | | | | | | | | | | | | | | | | | |

FIG. 12C

| R L B | | | | | | | | | | |
|---|---|---|---|---|---|---|---|---|---|---|
| 1 | D(9,1) | D(8,1) | R(7,1) | D(6,1) | D(5,1) | G(4,1) | D(3,1) | | D(2,1) | R(1,1) |
| 2 | D(9,2) | D(8,2) | G(7,2) | D(6,2) | D(5,2) | B(4,2) | D(3,2) | D(2,2) G(1,2) | | |
| 3 | D(9,3) | D(8,3) | R(7,3) | D(6,3) | D(5,3) | G(4,3) | D(3,3) | D(2,3) R(1,3) | | |
| 1 | D(9,4) | D(8,4) | G(7,4) | D(6,4) | D(5,4) | B(4,4) | D(3,4) | | D(2,4) | G(1,4) |
| 2 | D(9,5) | D(8,5) | R(7,5) | D(6,5) | D(5,5) | G(4,5) | D(3,5) | D(2,5) R(1,5) | | |
| 3 | D(9,6) | D(8,6) | G(7,6) | D(6,6) | D(5,6) | B(4,6) | D(3,6) | D(2,6) G(1,6) | | |
| 1 | D(9,7) | D(8,7) | R(7,7) | D(6,7) | D(5,7) | G(4,7) | D(3,7) | | D(2,7) | R(1,7) |
| 2 | D(9,8) | D(8,8) | G(7,8) | D(6,8) | D(5,8) | B(4,8) | D(3,8) | D(2,8) G(1,8) | | |
| 3 | D(9,9) | D(8,9) | R(7,9) | D(6,9) | D(5,9) | G(4,9) | D(3,9) | D(2,9) R(1,9) | | |
| 1 | D(9,10) | D(8,10) | G(7,10) | D(6,10) | D(5,10) | B(4,10) | D(3,10) | | D(2,10) | G(1,10) |
| 2 | D(9,11) | D(8,11) | R(7,11) | D(6,11) | D(5,11) | G(4,11) | D(3,11) | D(2,11) R(1,11) | | |
| 3 | D(9,12) | D(8,12) | G(7,12) | D(6,12) | D(5,12) | B(4,12) | D(3,12) | D(2,12) G(1,12) | | |
| 1 | D(9,13) | D(8,13) | R(7,13) | D(6,13) | D(5,13) | G(4,13) | D(3,13) | | D(2,13) | R(1,13) |
| 2 | D(9,14) | D(8,14) | G(7,14) | D(6,14) | D(5,14) | B(4,14) | D(3,14) | D(2,14) G(1,14) | | |
| 3 | D(9,15) | D(8,15) | R(7,15) | D(6,15) | D(5,15) | G(4,15) | D(3,15) | D(2,15) R(1,15) | | |
| 1 | D(9,16) | D(8,16) | G(7,16) | D(6,16) | D(5,16) | B(4,16) | D(3,16) | | D(2,16) | G(1,16) |
| 2 | D(9,17) | D(8,17) | R(7,17) | D(6,17) | D(5,17) | G(4,17) | D(3,17) | D(2,17) R(1,17) | | |
| 3 | D(9,18) | D(8,18) | G(7,18) | D(6,18) | D(5,18) | B(4,18) | D(3,18) | D(2,18) G(1,18) | | |
| 1 | D(9,19) | D(8,19) | R(7,19) | D(6,19) | D(5,19) | G(4,19) | D(3,19) | | D(2,19) | R(1,19) |
| 2 | D(9,20) | D(8,20) | G(7,20) | D(6,20) | D(5,20) | B(4,20) | D(3,20) | D(2,20) G(1,20) | | |
| 3 | D(9,21) | D(8,21) | R(7,21) | D(6,21) | D(5,21) | G(4,21) | D(3,21) | D(2,21) R(1,21) | | |
| 1 | D(9,22) | D(8,22) | G(7,22) | D(6,22) | D(5,22) | B(4,22) | D(3,22) | | D(2,22) | G(1,22) |
| 2 | D(9,23) | D(8,23) | R(7,23) | D(6,23) | D(5,23) | G(4,23) | D(3,23) | D(2,23) R(1,23) | | |
| 3 | D(9,24) | D(8,24) | G(7,24) | D(6,24) | D(5,24) | B(4,24) | D(3,24) | D(2,24) G(1,24) | | |
| 1 | D(9,25) | D(8,25) | R(7,25) | D(6,25) | D(5,25) | G(4,25) | D(3,25) | | D(2,25) | R(1,25) |
| 2 | D(9,26) | D(8,26) | G(7,26) | D(6,26) | D(5,26) | B(4,26) | D(3,26) | D(2,26) G(1,26) | | |
| 3 | D(9,27) | D(8,27) | R(7,27) | D(6,27) | D(5,27) | G(4,27) | D(3,27) | D(2,27) R(1,27) | | |
| 1 | D(9,28) | D(8,28) | G(7,28) | D(6,28) | D(5,28) | B(4,28) | D(3,28) | | D(2,28) | G(1,28) |
| 2 | D(9,29) | D(8,29) | R(7,29) | D(6,29) | D(5,29) | G(4,29) | D(3,29) | D(2,29) R(1,29) | | |
| 3 | D(9,30) | D(8,30) | G(7,30) | D(6,30) | D(5,30) | B(4,30) | D(3,30) | D(2,30) G(1,30) | | |
| 1 | D(9,31) | D(8,31) | R(7,31) | D(6,31) | D(5,31) | G(4,31) | D(3,31) | | D(2,31) | R(1,31) |

FIG. 12D

| R | L | B | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 |

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| D(9,1) | D(9,2) | D(9,3) | D(9,4) | D(9,5) | D(9,6) | D(9,7) | D(9,8) | D(9,9) | D(9,10) | D(9,11) | D(9,12) | D(9,13) | D(9,14) | D(9,15) | D(9,16) | D(9,17) | D(9,18) | D(9,19) | D(9,20) | D(9,21) | D(9,22) | D(9,23) | D(9,24) | D(9,25) | D(9,26) | D(9,27) | D(9,28) | D(9,29) | D(9,30) | D(9,31) |
| D(8,1) | D(8,2) | D(8,3) | D(8,4) | D(8,5) | D(8,6) | D(8,7) | D(8,8) | D(8,9) | D(8,10) | D(8,11) | D(8,12) | D(8,13) | D(8,14) | D(8,15) | D(8,16) | D(8,17) | D(8,18) | D(8,19) | D(8,20) | D(8,21) | D(8,22) | D(8,23) | D(8,24) | D(8,25) | D(8,26) | D(8,27) | D(8,28) | D(8,29) | D(8,30) | D(8,31) |
| R(7,1) | G(7,2) | R(7,3) | G(7,4) | R(7,5) | G(7,6) | R(7,7) | G(7,8) | R(7,9) | G(7,10) | R(7,11) | G(7,12) | R(7,13) | G(7,14) | R(7,15) | G(7,16) | R(7,17) | G(7,18) | R(7,19) | G(7,20) | R(7,21) | G(7,22) | R(7,23) | G(7,24) | R(7,25) | G(7,26) | R(7,27) | G(7,28) | R(7,29) | G(7,30) | R(7,31) |
| D(6,1) | D(6,2) | D(6,3) | D(6,4) | D(6,5) | D(6,6) | D(6,7) | D(6,8) | D(6,9) | D(6,10) | D(6,11) | D(6,12) | D(6,13) | D(6,14) | D(6,15) | D(6,16) | D(6,17) | D(6,18) | D(6,19) | D(6,20) | D(6,21) | D(6,22) | D(6,23) | D(6,24) | D(6,25) | D(6,26) | D(6,27) | D(6,28) | D(6,29) | D(6,30) | D(6,31) |
| D(5,1) | D(5,2) | D(5,3) | D(5,4) | D(5,5) | D(5,6) | D(5,7) | D(5,8) | D(5,9) | D(5,10) | D(5,11) | D(5,12) | D(5,13) | D(5,14) | D(5,15) | D(5,16) | D(5,17) | D(5,18) | D(5,19) | D(5,20) | D(5,21) | D(5,22) | D(5,23) | D(5,24) | D(5,25) | D(5,26) | D(5,27) | D(5,28) | D(5,29) | D(5,30) | D(5,31) |
| G(4,1) | B(4,2) | G(4,3) | B(4,4) | G(4,5) | B(4,6) | G(4,7) | B(4,8) | G(4,9) | B(4,10) | G(4,11) | B(4,12) | G(4,13) | B(4,14) | G(4,15) | B(4,16) | G(4,17) | B(4,18) | G(4,19) | B(4,20) | G(4,21) | B(4,22) | G(4,23) | B(4,24) | G(4,25) | B(4,26) | G(4,27) | B(4,28) | G(4,29) | B(4,30) | G(4,31) |
| D(3,1) | D(3,2) | D(3,3) | D(3,4) | D(3,5) | D(3,6) | D(3,7) | D(3,8) | D(3,9) | D(3,10) | D(3,11) | D(3,12) | D(3,13) | D(3,14) | D(3,15) | D(3,16) | D(3,17) | D(3,18) | D(3,19) | D(3,20) | D(3,21) | D(3,22) | D(3,23) | D(3,24) | D(3,25) | D(3,26) | D(3,27) | D(3,28) | D(3,29) | D(3,30) | D(3,31) |
| | | D(2,3) | | | D(2,6) | | | D(2,9) | | | D(2,12) | | | D(2,15) | | | D(2,18) | | | D(2,21) | | | D(2,24) | | | D(2,27) | | | D(2,30) | |
| | | R(1,3) | | | G(1,6) | | | R(1,9) | | | G(1,12) | | | R(1,15) | | | G(1,18) | | | R(1,21) | | | G(1,24) | | | R(1,27) | | | G(1,30) | |

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | | | D(2,2) | | | D(2,5) | | | D(2,8) | | | D(2,11) | | | D(2,14) | | | D(2,17) | | | D(2,20) | | | D(2,23) | | | D(2,26) | | | D(2,29) | | |
| | | | G(1,2) | | | R(1,5) | | | G(1,8) | | | R(1,11) | | | G(1,14) | | | R(1,17) | | | G(1,20) | | | R(1,23) | | | G(1,26) | | | R(1,29) | | |
| D(2,1) | | | D(2,4) | | | D(2,7) | | | D(2,10) | | | D(2,13) | | | D(2,16) | | | D(2,19) | | | D(2,22) | | | D(2,25) | | | D(2,28) | | | D(2,31) | | |
| R(1,1) | | | G(1,4) | | | R(1,7) | | | G(1,10) | | | R(1,13) | | | G(1,16) | | | R(1,19) | | | G(1,22) | | | R(1,25) | | | G(1,28) | | | R(1,31) | | |

FIG. 12F

| | | | | | | | | | | | | | |
|---|---|---|---|---|---|---|---|---|---|---|---|---|---|
| | | | | | | | | | | | | D(2,1) | R(1,1) |
| | | | | | | | | | | | | | |
| | | | | | | | | | | | | | |
| | | | | | | | | | | D(2,2) | G(1,2) | D(2,4) | G(1,4) |
| R 1 | D(9,1) | D(8,1) | R(7,1) | D(6,1) | D(5,1) | G(4,1) | | | | | | | D(3,1) |
| L 2 | D(9,2) | D(8,2) | G(7,2) | D(6,2) | D(5,2) | B(4,2) | D(3,2) | | | | | | |
| B 3 | D(9,3) | D(8,3) | R(7,3) | D(6,3) | D(5,3) | G(4,3) | D(3,3) | D(2,3) | R(1,3) | D(2,5) | R(1,5) | D(2,7) | R(1,7) |
| 1 | D(9,4) | D(8,4) | G(7,4) | D(6,4) | D(5,4) | B(4,4) | | | | | | | D(3,4) |
| 2 | D(9,5) | D(8,5) | R(7,5) | D(6,5) | D(5,5) | G(4,5) | D(3,5) | | | | | | |
| 3 | D(9,6) | D(8,6) | G(7,6) | D(6,6) | D(5,6) | B(4,6) | D(3,6) | D(2,6) | G(1,6) | D(2,8) | G(1,8) | D(2,10) | G(1,10) |
| 1 | D(9,7) | D(8,7) | R(7,7) | D(6,7) | D(5,7) | G(4,7) | | | | | | | D(3,7) |
| 2 | D(9,8) | D(8,8) | G(7,8) | D(6,8) | D(5,8) | B(4,8) | D(3,8) | | | | | | |
| 3 | D(9,9) | D(8,9) | R(7,9) | D(6,9) | D(5,9) | G(4,9) | D(3,9) | D(2,9) | R(1,9) | D(2,11) | R(1,11) | D(2,13) | R(1,13) |
| 1 | D(9,10) | D(8,10) | G(7,10) | D(6,10) | D(5,10) | B(4,10) | | | | | | | D(3,10) |
| 2 | D(9,11) | D(8,11) | R(7,11) | D(6,11) | D(5,11) | G(4,11) | D(3,11) | | | | | | |
| 3 | D(9,12) | D(8,12) | G(7,12) | D(6,12) | D(5,12) | B(4,12) | D(3,12) | D(2,12) | G(1,12) | D(2,14) | G(1,14) | D(2,16) | G(1,16) |
| 1 | D(9,13) | D(8,13) | R(7,13) | D(6,13) | D(5,13) | G(4,13) | | | | | | | D(3,13) |
| 2 | D(9,14) | D(8,14) | G(7,14) | D(6,14) | D(5,14) | B(4,14) | D(3,14) | | | | | | |
| 3 | D(9,15) | D(8,15) | R(7,15) | D(6,15) | D(5,15) | G(4,15) | D(3,15) | D(2,15) | R(1,15) | D(2,17) | R(1,17) | D(2,19) | R(1,19) |
| 1 | D(9,16) | D(8,16) | G(7,16) | D(6,16) | D(5,16) | B(4,16) | | | | | | | D(3,16) |
| 2 | D(9,17) | D(8,17) | R(7,17) | D(6,17) | D(5,17) | G(4,17) | D(3,17) | | | | | | |
| 3 | D(9,18) | D(8,18) | G(7,18) | D(6,18) | D(5,18) | B(4,18) | D(3,18) | D(2,18) | G(1,18) | D(2,20) | G(1,20) | D(2,22) | G(1,22) |
| 1 | D(9,19) | D(8,19) | R(7,19) | D(6,19) | D(5,19) | G(4,19) | | | | | | | D(3,19) |
| 2 | D(9,20) | D(8,20) | G(7,20) | D(6,20) | D(5,20) | B(4,20) | D(3,20) | | | | | | |
| 3 | D(9,21) | D(8,21) | R(7,21) | D(6,21) | D(5,21) | G(4,21) | D(3,21) | D(2,21) | R(1,21) | D(2,23) | R(1,23) | D(2,25) | R(1,25) |
| 1 | D(9,22) | D(8,22) | G(7,22) | D(6,22) | D(5,22) | B(4,22) | | | | | | | D(3,22) |
| 2 | D(9,23) | D(8,23) | R(7,23) | D(6,23) | D(5,23) | G(4,23) | D(3,23) | | | | | | |
| 3 | D(9,24) | D(8,24) | G(7,24) | D(6,24) | D(5,24) | B(4,24) | D(3,24) | D(2,24) | G(1,24) | D(2,26) | G(1,26) | D(2,28) | G(1,28) |
| 1 | D(9,25) | D(8,25) | R(7,25) | D(6,25) | D(5,25) | G(4,25) | | | | | | | D(3,25) |
| 2 | D(9,26) | D(8,26) | G(7,26) | D(6,26) | D(5,26) | B(4,26) | D(3,26) | | | | | | |
| 3 | D(9,27) | D(8,27) | R(7,27) | D(6,27) | D(5,27) | G(4,27) | D(3,27) | D(2,27) | R(1,27) | D(2,29) | R(1,29) | D(2,31) | R(1,31) |
| 1 | D(9,28) | D(8,28) | G(7,28) | D(6,28) | D(5,28) | B(4,28) | | | | | | | D(3,28) |
| 2 | D(9,29) | D(8,29) | R(7,29) | D(6,29) | D(5,29) | G(4,29) | D(3,29) | | | | | | |
| 3 | D(9,30) | D(8,30) | G(7,30) | D(6,30) | D(5,30) | B(4,30) | D(3,30) | | | | | D(2,30) | G(1,30) |
| 1 | D(9,31) | D(8,31) | R(7,31) | D(6,31) | D(5,31) | G(4,31) | | | | | | | D(3,31) |

SOLID-STATE IMAGING APPARATUS, DRIVING METHOD THEREOF, AND CAMERA

BACKGROUND OF THE INVENTION (1) Field of the Invention

The present invention relates to: a solid-state imaging apparatus which includes two-dimensionally arranged light-receiving elements, vertical transfer units, and a horizontal transfer unit, and outputs image signals; a driving method of the apparatus; and a camera using the apparatus, and particularly to a solid-state imaging apparatus having a still picture imaging mode and a packets-mixing mode; a driving method of the apparatus; and a camera using the apparatus.

(2) Description of the Related Art

Charge-Coupled Device (CCD) imaging sensors have been known as solid-state imaging apparatuses each of which has a plurality of light-receiving elements for converting incident light into electrical charges and outputs the charges as image signals. Furthermore, digital still cameras using such solid-state imaging apparatuses have become popular. In recent years, technologies of high pixel density in solid-state imaging apparatuses have been developed, so that some digital still cameras can provide images whose resolution is higher than resolution of silver halide photographs.

The conventional solid-state imaging apparatus includes a plurality of photoelectric conversion units, a plurality of vertical transfer units, a horizontal transfer unit, and an output unit. The photoelectric conversion units have color filters arranged in Bayer pattern array. Each of the vertical transfer units is formed corresponding to each column of the photoelectric conversion units, and vertically transfers signal charges read from each of the photoelectric conversion units to the horizontal transfer unit. The horizontal transfer unit horizontally transfers the signal charges received from the vertical transfer units. The output unit amplifies and then outputs the signal charges provided from the horizontal transfer units.

Most of digital still cameras have functions of imaging moving pictures as well as still pictures. The number of pixels in one still picture is generally more than 4 million pixels, for example, but for imaging moving pictures, the number of pixels are usually reduced (hereinafter, referred to also as “thinned”) to achieve necessary frequency (more than 30 frames per second, for example). A typical example of such pixel thinning in a vertical direction is selecting one photoelectric conversion unit from three neighboring photoelectric conversion units and reading signal charges from the selected photoelectric conversion unit to the vertical transfer unit.

Another example of the vertical pixel thinning is a method disclosed in Japanese Patent Application Publication No. 9-298755 (hereinafter, referred to as Patent Reference 1). By this method, to the horizontal transfer unit, signal charges are sequentially transferred from neighboring vertical transfer stages in vertical transfer stages including in a vertical transfer unit. Thereby, signal charges in the neighboring vertical transfer stages are mixed in the horizontal transfer unit, so that it is possible to reduce the number of pixels in a vertical direction and thereby increase frame frequency more.

Moreover, Japanese Patent Application Publication No. 2004-180284 (hereinafter, referred to as Patent Reference 2) discloses a solid-state imaging apparatus in which pixels are able to be reduced in a horizontal direction. This solid-state imaging apparatus has a vertical final stage in each vertical transfer unit. The vertical final stages in every (2n+1) columns (in every three columns, for example) have the same structure of transfer electrodes. Each vertical final stage in the (2n+1) columns has at least two transfer electrodes which are independent from electrodes of other columns, so that each column can be independently controlled to transfer signal charges from the vertical final stage to the horizontal transfer unit. For example, in the case where pixels of two different colors are alternately arranged in a row as in Bayer pattern array, every other pixels of the same color in a horizontal direction in the (2n+1) columns are selected to read signal charges, and the signal charges are transferred from the vertical final stages to the horizontal transfer unit and mixed together in the horizontal transfer unit. By repeating the above processing (2n+1) times, it is possible to reduce the number of pixels in a horizontal direction to one-(2n+1)th.

Thus, in the case where one of moving pictures is imaged by a solid-state imaging apparatus whose total pixels are numerous, the pixels are reduced without lowering frame frequency. In this case, for preventing image quality defects, it is desirable to keep a balance between horizontal resolution and vertical resolution by reducing the number of pixels in both horizontal and vertical directions.

However, it is impossible to combine the structure disclosed in Patent Reference 1 for vertical pixel reduction with the structure disclosed in Patent Reference 2 for horizontal pixel reduction. More specifically, in the structure disclosed in Patent Reference 2, every other pixels of the same color in a horizontal direction in the vertical final stage are selected, and signal charges are read and transferred from the selected pixels and then mixed in the horizontal transfer unit. However, at the same time of the above processing, it is impossible to sequentially transfer signal charges from all a plurality of vertical transfer units to the horizontal transfer unit, as the structure disclosed in Patent Reference 1. Therefore, if pixels are to be reduced also in a vertical direction when pixels are reduced in a horizontal direction using the technology of Patent Reference 2, the vertical pixel reduction has been realized by performing empty transfer using empty vertical transfer stages (empty transfer states) which are formed in some of the vertical transfer units and to which no signal charges are read out from photoelectric conversion units.

FIG. 1 is a diagram for explaining pixel mixing according to the conventional technology. In FIG. 1, 123123 . . . in a top section represent RLBRLB . . . columns of the vertical transfer units, respectively. Here, each of R and L columns has a final stage which performs transfer operation without depending on transfer operation of other vertical transfer stages in upstream of the same column. Each of B columns has a final stage which is not independent but performs transfer operation at the same time with other vertical transfer stages in upstream of the same column.

The top section in FIG. 1 shows only 9 rows and 31 columns, which is a part of the plurality of vertical transfer units (transfer CCDs). R (1, 1) represents a signal packet including signal charges representing red color positioned at the first row from bottom and the first column from left. D (9, 1) represents a dummy packet without valid signal charges, positioned at the ninth row from bottom and the first column from left. G and B represent a signal packet of green color and a signal packet of blue color, respectively. Here, the “signal packet” refers to a signal in a vertical transfer stage having signal charges corresponding an amount of light read from a light-receiving element, and the “dummy packet” refers to a signal in a vertical transfer stage to which no signal charges are read from a light-receiving element and which does not have any signal charges originally.

In a bottom section of FIG. 1, a result of mixing three same color signal packets in the same row into the horizontal transfer unit (horizontal CCDs) is shown. By combining of mixing packets in the vertical CCD final stage (vertical mixing) and mixing packets in the horizontal CCD (horizontal mixing), three same color signal packets corresponding to the same row and neighbor columns are mixed together, and furthermore, six dummy packets are also mixed to the three signal packets.

Such horizontal three-pixel mixing enables still picture imaging mode as well as packets-mixing mode to be realized.

SUMMARY OF THE INVENTION

The pixel mixing in the above conventional technology, however, has the first problem of significant image quality deterioration due to smears caused in imaging of a light source with extreme light intensity and the like. The second problem of the conventional pixel mixing is phenomenon of aliasing in smear edges which should be straight lines.

In more detail, when dummy packets are generated by the thinning as described regarding the conventional technology, noise components are added together in the dummy packets during vertical transfer. The dummy packets are added to the signal packets, so that image quality deterioration due to the noise components are more significant compared to the case where such dummy packets are not generated (the case without thinning).

For example, in the horizontal transfer stage in which signal packets shown by solid-line circles, R (1, 9), R (1, 11), and R (1, 13) are mixed together, in addition to these red signal packets of the 1st row and the 9th, 11th, and 13th columns, four dummy packets (four among six packets shown by dashed-line circles) in the different 1st and 5th columns are also mixed. Likewise, in the horizontal transfer stage in which signal packets shown by solid-line rectangles, B (4, 12), B (4, 14), and B (4, 16) are mixed together, two dummy packets (two among six packets shown by dashed lines) in the different columns are also mixed The above is the same in any horizontal transfer stages. In this example, as a result of the packet mixing, six dummy packets are added to three signal packets when smears occur, the mixed packets are further mixed with noise components of six packets, in addition to noise components which are originally included in the three signal packets. As described above, the mixed packets have significant noise components more than signal packets without thinning have. As a result, image quality deterioration due to smears is worse in the packets-mixing mode than the still picture imaging mode.

Furthermore, when smears occur, smear charges in the dummy packets are mixed to signal packets in a vertical transfer unit of a different column. As a result, smear edges which should be originally vertical straight lines are deviated for each pixel after the mixing, which are seen aliasing in image. Therefore, smears appear as straight lines in still picture imaging mode, but as aliasing in packets-mixing mode, which results in a problem that a user perceives that image quality in a moving picture is deteriorated more than a still picture.

Moreover, even if smears do not occur, when signal charges are leaked into dummy packets during transfer in vertical transfer stages, due to defectives or transfer errors of the vertical transfer stages transferring the signal charges, the dummy packets having the leaked signal charges are mixed in the horizontal transfer unit to signal packets belong to a different column, thereby causing vertical lines in image. Therefore, even if smears do not occur, there is a possibility of image quality defective due to transfer deterioration.

In a view of the above conventional problems, an object of the present invention is to provide: a solid-state imaging apparatus which prevents image quality deterioration in packets-mixing mode due to smears and prevents smear aliasing thereby improving image quality; a driving method of the apparatus; and a camera using the apparatus.

In order to solve the above problems, the solid-state imaging apparatus according to the present invention includes: a plurality of light-receiving elements which are arranged by rows and columns; a plurality of vertical transfer units each of which is arranged for a corresponding column of the light-receiving elements, and is operable to vertically transfer a plurality of signal packets and a dummy packet in a packets-mixing mode, the signal packet including charges read from the light-receiving elements, the dummy packet being a packet other than the signal packets, and N columns of the vertical transfer units forming one column group; a plurality of holding units which are arranged in final stages of the vertical transfer units in N columns except M columns in the column group, and each of which is operable to mix, hold, and vertically transfer charges of the signal packets and the dummy packet without depending on vertical transfer from upstream of the corresponding vertical transfer unit; a horizontal transfer unit operable to mix, hold, and horizontally transfer the charges transferred from the holding units or the vertical transfer units in the M columns in the column group; and a driving unit operable to drive the vertical transfer units, the holding units, and the horizontal transfer unit, wherein the driving unit is operable to drive, in the packets-mixing mode, the holding units and the horizontal transfer unit to generate a first mixed packet and a second mixed packet in the horizontal transfer unit, the first mixed packet includes: a plurality of signal packets belonging to a same row and neighbor columns of a same color; and a dummy packet belonging to a same column as the signal packets, and the second mixed packet includes no signal packet but a plurality of dummy packets in a same column as the signal packets included in the first mixed packets. With the above structure, the first mixed packet and the second mixed packet are outputted from the solid-state imaging apparatus. In signal processing in a later stage of the solid-state imaging apparatus, noise reduction processing using the first mixed packet and the second mixed packet enables noise components caused by smears or dark currents to be cancelled from the first mixed packet. Thereby, it is possible to cancel the smear itself, thereby improving image quality. Here, the second mixed packet includes dummy packets in a column same as the column of a plurality of signal packets included in the first mixed packet, so that it is possible to prevent noise components such as smears from being mixed to different columns, and even if smears are remained in packets-mixing mode, possible to prevent the smears from appearing as aliasing in image.

Further, the driving unit may drive the holding units and the horizontal transfer unit to generate the second mixed packet, by mixing dummy packets belonging to an identical column in the holding unit and then mixing the mixed dummy packets to a dummy packet belonging to a different column in the horizontal transfer unit by transferring the mixed packets from the holding unit to the horizontal transfer unit. With the above structure, by combining the mixing in the final stage (vertical mixing) and the mixing in the horizontal transfer unit (horizontal mixing), it is possible to generate the second mixed packet which includes a plurality of dummy packets in a column same as the column of a plurality of signal packets included in the first mixed packet.

Furthermore, the first mixed packet may be classified into a first type and a second type, this first mixed packet of the first type includes: i signal packets belonging to a same row and neighbor columns of a same color; and i or less dummy packets belonging to a same column as the signal packets, where i is equal to or more than 2, the first mixed packet of the second type may include: i signal packets belonging to a same row and neighbor columns of a same color; j dummy packets belonging to a same column as the signal packets; and k, where j+K>i, dummy packets not belonging to a same column as the signal packets, and the second mixed packet includes dummy packets belonging to a same column as the signal packets and the dummy packets included in the first mixed packet, the solid-state imaging apparatus may further include: a first noise reduction unit operable to reduce noise in the first mixed packet of the first type using the second mixed packet; and a second noise reduction unit operable to reduce noise in the first mixed packet of the second type using the second mixed packet. With the above structure, by subtracting, from the first mixed packets of the first and second types, dummy packets which belong to the same column as signal packets and dummy packets included in the first mixed packet and whose number is the same as the number of the signal packets and dummy packets included in the first mixed packet, it is possible to cancel most of noise components included in the first mixed packets of the first and second types. This is because an amount of the noise components in one signal packet is able to be considered as the same amount of noise components in one dummy packet belonging to the same column. In addition, it is thereby possible to prevent the noise components such as smears from being mixed to components of different columns, and even if a small amount of smears are remained in packets-mixing mode, possible to prevent the smears from appearing as aliasing in image.

Still further, the plurality of holding units may further include holding units in final stages of the vertical transfer units in M columns in N columns in the column group, and each of which is operable to mix, hold, and vertically transfer charges of the signal packets and the dummy packets without depending on vertical transfer from upstream of the corresponding vertical transfer unit. With the above structure, the vertical mixing become possible in all holding units, so that flexibility in transfer performed by the driving unit is increased. Thereby, it is possible to match the dummy packets in the second mixed packet with a column of the signal packets in the first mixed packet. As a result, it is possible to improve accuracy in the noise reduction processing.

Still further, the solid-state imaging apparatus may further include a comparison unit operable to compare a signal level of the first mixed packet of the first and second type to a threshold value, wherein the first noise reduction unit and the second noise reduction unit may be operable not to reduce noise from the first mixed packet, when the signal level of the first mixed packet exceeds the threshold value. With the above structure, if a signal level of the second-type first mixed packet exceeds a threshold value, it is possible to prevent image quality from being rather deteriorated due to the noise reduction processing. The threshold value may be, for example, a saturated signal amount in the horizontal transfer unit holding the first mixed packet, or a maximum value of input dynamic range in a later stage of the horizontal transfer unit.

Still further, the light-receiving elements may include an optical black pixel, the solid-state imaging apparatus may further include a pre-processing unit operable to reduce a signal level of the optical black pixel from the second mixed packet, prior to the reducing performed by the first noise reduction unit and the second noise reduction unit. With the above structure, a signal level of an optical black pixel is subtracted from the second mixed packet as pre-processing, it is possible to further improve accuracy of the noise reduction processing.

Still further, the driving unit may drive the holding units and the horizontal transfer unit to generate the first mixed packet, by mixing a signal packet and a dummy packet belonging to an identical column in the holding unit and then mixing the mixed packets to a signal packet belonging to a different column in the horizontal transfer unit by transferring the mixed packets from the holding unit to the horizontal transfer unit. With the above structure, by adding a step of mixing signal packets and dummy packets belonging to the identical column in the holding unit, it is possible to prevent transfer leakage. Thereby, it is possible to improve accuracy of the noise reduction processing.

Still further, the driving unit may be operable to: drive the holding units and the horizontal transfer unit to generate the first mixed packet, by mixing a signal packet and at least one dummy packet in the holding unit and then mixing the mixed packets to another mixed packet including a signal packet belonging to a different column in the horizontal transfer unit by transferring the mixed packets from the holding unit to the horizontal transfer unit, the dummy packet being among sequential dummy packets belonging to an identical column and being transferred vertically and sequentially after the former signal packet, and drive the holding units and the horizontal transfer unit to generate the second mixed packet, by mixing dummy packets remaining in the sequential dummy packets and mixing the mixed packets to another mixed packet including a dummy packet belonging to a different column in the horizontal transfer unit by transferring the mixed packets from the holding unit to the horizontal transfer unit. With the above structure, by transferring alternately and regularly the signal packets and the dummy packets, and by transferring the dummy packet for a plurality of times, it is possible to prevent transfer leakage of the signal packets and the dummy packets. Thereby, it is possible to improve accuracy of the noise reduction processing.

Still further, the driving unit may be operable to: drive the holding units and the horizontal transfer unit to generate the first or second mixed packet, by vertical mixing for mixing packets belonging to an identical column in the holding unit, and horizontal mixing for mixing packets belonging to respective different columns in the horizontal transfer unit by transferring the packets from the holding unit or the vertical transfer unit corresponding to the M columns, to the horizontal transfer unit; and drive the vertical mixing in the holding units in N columns except M columns in the column group, and simultaneously the horizontal mixing from the holding units corresponding to at least one column among the N columns and the vertical transfer units corresponding to the M columns, to the horizontal transfer unit. With the above structure, the driving unit drives the horizontal mixing corresponding to a plurality of columns among M columns in each column group, it is possible to reduce a total number of transferring steps required for generation of the first and second mixed packets.

Still further, the holding units may be final transfer stages of the vertical transfer units in N columns except M columns in the column group, and have independent transfer electrodes in every N other columns. With the above structure, by forming independent transfer electrodes in final transfer stages of vertical transfer units in N columns except M columns in each column group, and driving the transfer electrodes independently, it is possible to cancel smears and realize the above mixing for solving smear aliasing.

Still further, the holding units, each of which is formed between the horizontal transfer unit and each of the vertical transfer units in N columns except M columns in the column group, may be operable to hold and transfer the charges independently in every N other columns. With the above structure, by forming a holding unit which performs holding and transferring independently, between the horizontal transfer unit and each of vertical transfer units in N columns except M columns in each column group, it is possible to drive transferring easily, which is suitable for speed-up of frame rate.

Still further, one of the first and second noise reduction unit may be operable to reduce noise from the first mixed packet using an average value of a plurality of the second mixed packets belonging to an identical column, based on outputs from a plurality of rows outputted from the horizontal transfer unit. With the above structure, it is possible to reduce random noise such as shot noise included in the noise component amount, which improves image quality after the reducing.

Moreover, a driving method of driving the solid-state imaging apparatus according to the present invention includes: mixing dummy packets belonging to an identical column in the holding unit; and mixing the mixed dummy packets to a dummy packet belonging to a different column in the horizontal transfer unit by transferring the mixed packets from the holding unit to the horizontal transfer unit, so that the second mixed packet is generated.

Moreover, the camera according to the present invention includes the above-described solid-state imaging apparatus.

According to the solid-state imaging apparatus, the driving method of the apparatus, and the camera including the apparatus, it is possible to cancel noise components caused by smears and dark currents from mixed packets generated by pixel mixing. Thereby, it is possible to improve image quality. In addition, it is thereby possible to prevent noise components such as smears from being mixed to components of different columns, and prevent smears from appearing as aliasing in image of packets-mixing mode.

FURTHER INFORMATION ABOUT TECHNICAL BACKGROUND TO THIS APPLICATION

The disclosure of Japanese Patent Application No. 2006-256068 filed on Sep. 21, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIGS. 8A to 8L are diagrams for explaining pixel mixing according to the second embodiment;

DESCRIPTION OF THE PREFERRED EMBODIMENT(S)

First Embodiment

In the first embodiment, processing of thinning pixels in a packets-mixing mode in the solid-state imaging apparatus is described. By the thinning, 3×3 pixels in a still picture are reduced to one pixel. As thinning in a vertical direction, one is selected from three pixels of light-receiving elements, and read out to the vertical transfer unit (vertical CCD). As thinning in a horizontal direction, horizontal three pixels of the same color are mixed together in the horizontal transfer unit (horizontal CCD). The solid-state imaging apparatus according to the present invention, signals in a transfer state of the horizontal transfer unit in which the horizontal three pixels are mixed are generated as one first mixed packet. This first mixed packet includes: a plurality of signal packets belonging to the same row and neighbor columns of the same color; and dummy packets belonging to the same column as the signal packets. Furthermore, in the solid-state imaging apparatus according to the present invention, the transfer stage of the horizontal transfer unit does not include any signal packets, but generate one second mixed packet which includes a plurality of dummy packets in the same column as the signal packets in the first mixed packet. Here, the "signal packet" means signals in a vertical transfer stage including signal charges read out from a plurality of selected light-receiving elements. The "dummy packet" means signals in a vertical transfer stage which is originally empty and to which no signal charges are provided from light-receiving elements.

The plurality of first mixed packets and the plurality of the second mixed packets are outputted from the solid-state imaging apparatus. In signal processing in a later stage of the solid-state imaging apparatus, processing of reducing noise from the first mixed packet using the second mixed packet becomes possible. This makes it possible to cancel, from the first mixed packet, noise components resulted from smears and dark currents. Thereby, it is possible to almost cancel the smears, thereby improving image quality. Furthermore, the second mixed packet includes dummy packets in the same column as the signal packets in the first mixed packet, so that it is possible to prevent noise components such as smears from being mixed to components belonging to other columns, and even if a small amount of smears are remained in the packets-mixing mode, possible to prevent the smears from appearing as aliasing. Thereby, it is possible to improve image quality.

Note that such aliasing occur in a moving picture mode in which pixel thinning and mixing are performed, and, of course, the aliasing does not occur in a moving picture mode without pixel thinning. Hereinafter, the "moving picture mode" means a moving picture mode in which pixel thinning and mixing are performed.

Figure 1:
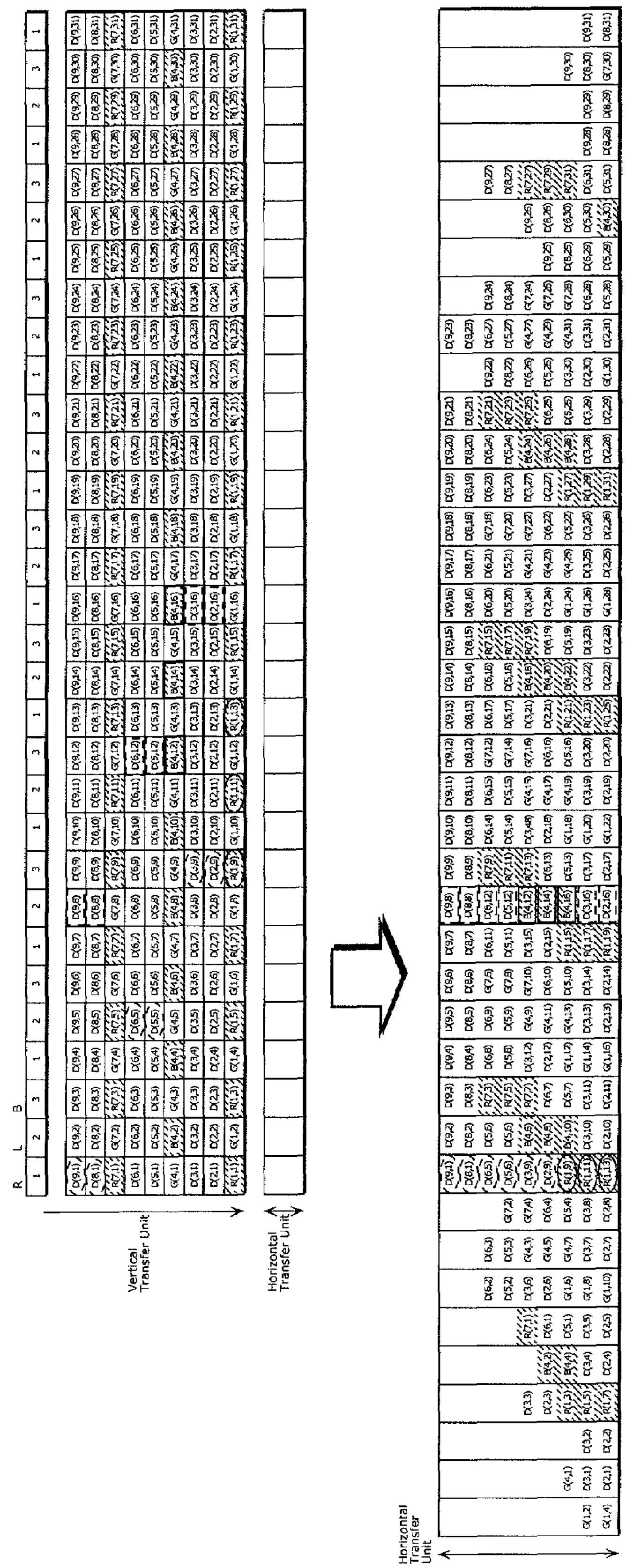
FIG. 1 is a diagram for explaining pixel mixing according to the conventional technology.
Figure 2:
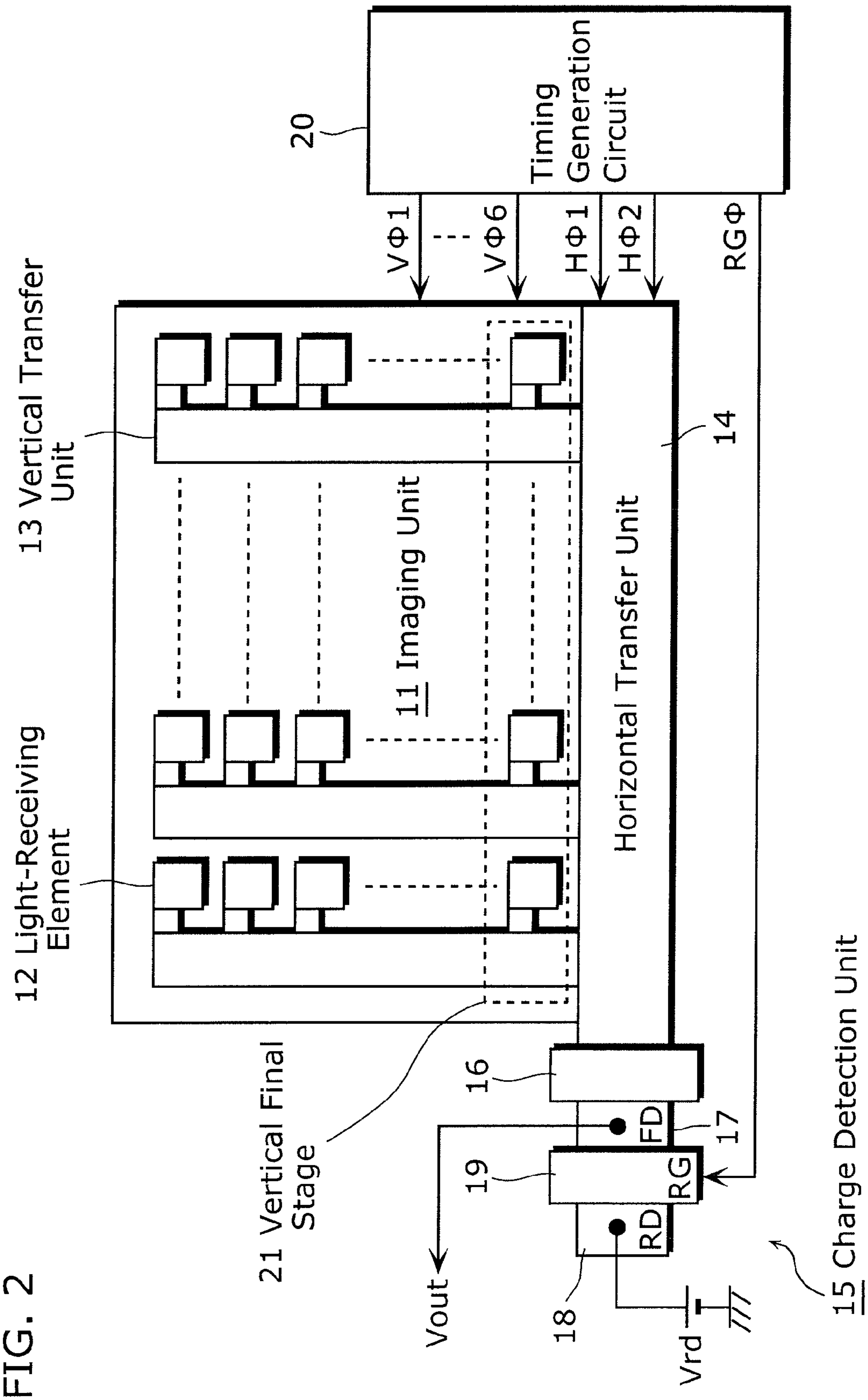
FIG. 2 is a block diagram showing a structure of a solid-state imaging apparatus according to the first embodiment of the present invention.

FIG. 2 is a block diagram showing a structure of the solid-state imaging apparatus according to the first embodiment of the present invention. The solid-state imaging apparatus of FIG. 2 is operated in a packets-mixing mode as well as a still picture imaging mode. The solid-state imaging apparatus of FIG. 2 includes a plurality of light-receiving elements 12, a plurality of vertical transfer units 13, a horizontal transfer unit 14, a charge detection unit 15, and a timing generation circuit 20.

The plurality of the light-receiving elements 12 are arranged by rows and columns. On the light-receiving elements 12, color filters are formed, for example, in Bayer pattern array.

Each of the vertical transfer units 13, which is formed corresponding to a column of the light-receiving elements 12, vertically transfers in the packets-mixing mode (i) a plurality of signal packets including signal charges read from the pixels applied with the pixel thinning, and (ii) dummy packets which are packets other than the signal packets.

Each of final stages 21, which are in vertical transfer units in N (3, for example) columns except M (1, for example) columns in each of column group each having N columns, is able to mix, hold, and vertically transfer the charges of the signal packets and the dummy packets, without depending on vertical transfer from upstream of the same column. In FIG. 2, the vertical transfer units 13 are called the 1st column (or R column), the 2nd column (or L column), the 3rd column (B column), the 1st column (R column), the 2nd column (or L column), the 3rd column (B column), . . . , respectively, from the left. In the first embodiment, each of final transfer stages in R and L columns has a function as a holding unit and includes transfer electrodes which are driven without depending on any transfer states in upstream of the same column. Each of the final transfer stages in B columns, in other words, M (=1) column among N columns in each column group, has transfer electrodes which are driven in the same way as all other transfer stages in the same column. In other words, each of the final transfer stages of R and L columns is able to be driven independently.

The horizontal transfer unit 14 mixes, holds, and horizontally transfer charges transferred from a plurality of the vertical transfer units 13.

In order to convert the charges transferred horizontally from the horizontal transfer unit 14 into voltage, the charge detection unit 15 has an output gate 16, a floating defusion (FD) unit 17, a reset drain (RD) unit 18, and a reset gate (RG) unit 19. The output gate 16 reads charges from a final stage of the horizontal transfer unit 14. The FD unit 17 holds the charges obtained by the output gate 16. The RD unit 18 drains the charges when the FD unit 17 is re-set. The RG unit 19 supplies a reset voltage to the FD unit 17.

The timing generation circuit 20 drives a plurality of the vertical transfer units 13 and the horizontal transfer unit 14. More specifically, the timing generation circuit 20 drives the vertical transfer units 13 and the horizontal transfer unit 14, so that, a plurality of the first mixed packets and a plurality of the second mixed packets are generated in the horizontal transfer unit 14, by combining, in the packets-mixing mode, mixing in a final stage (vertical mixing) and mixing in the horizontal transfer unit 14 (horizontal mixing).

Figure 3:
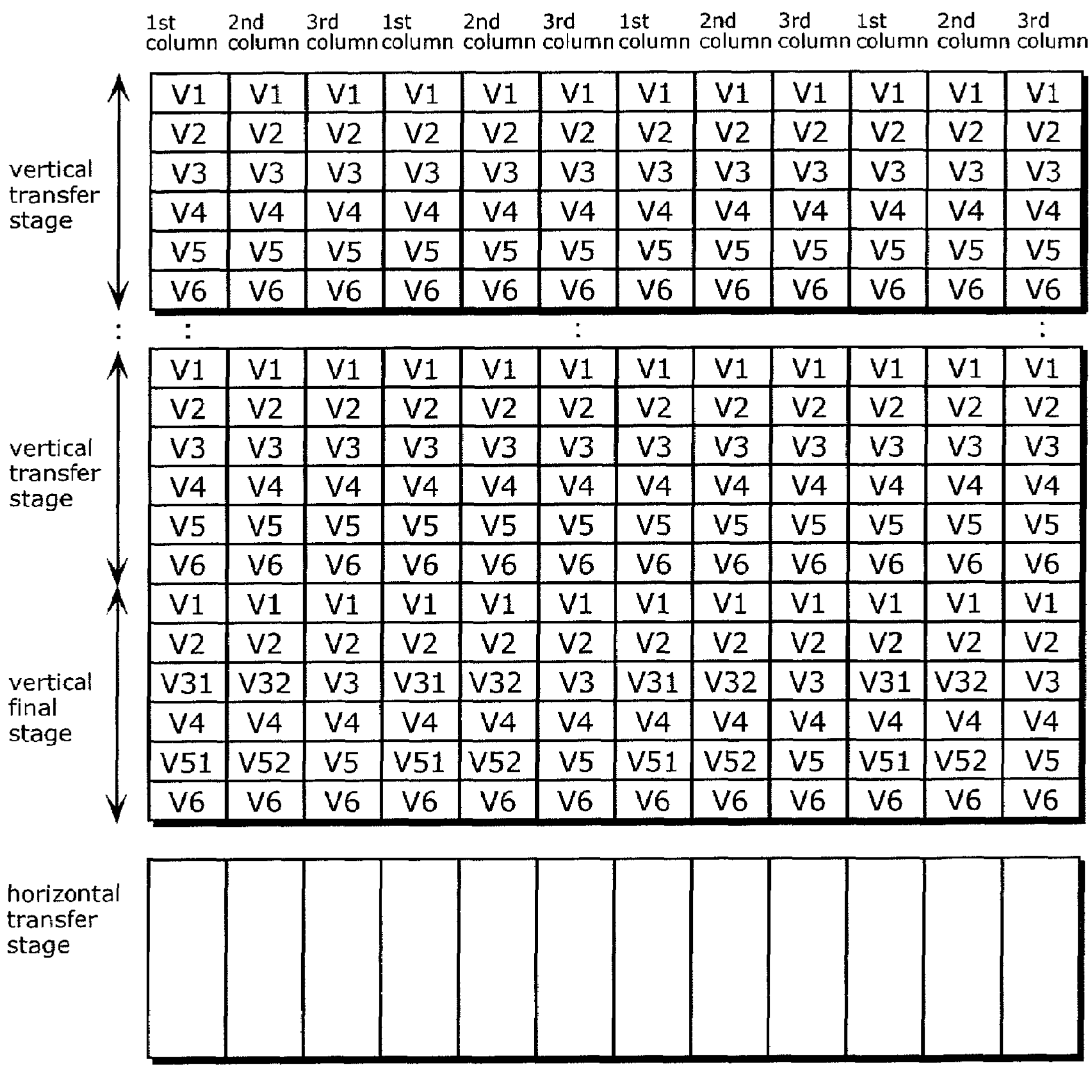
FIG. 3 is a block diagram showing a structure of electrodes in the solid-state imaging apparatus according to the first embodiment.

FIG. 3 is a block diagram showing a structure of electrodes in the solid-state imaging apparatus according to the first embodiment. In FIG. 3, six transfer electrode (six phases) V1 to V6 are formed on each of the vertical transfer units, and provided with six driving signals (six phases). The even-numbered electrodes (even-numbered phases) V2, V4, and V6 serve as transfer electrodes provided with driving signals for vertical transfer. The odd-numbered electrodes (odd-numbered phases) V1, V3, and V5 serve as transfer electrodes provided with driving signals for vertical transfer, and also serve as electrodes for reading charges from the light-receiving elements.

The six transfer electrodes (six phase) in each of vertical transfer stages except vertical final stages and in each of vertical final stages in the 3rd columns (B columns) are provided with common six driving signals (six phases). The electrodes V31 and V51 in each of the 1st columns (L columns) are able to be provided with driving signals which are independent from signals for the electrodes V3 and V5. The electrodes V32 and V52 in each of the 2nd columns (R columns) are also able to be provided with driving signals which are independent from signals for the electrodes V3 and V5. Thereby, the final transfer stage in each of the 1st and 2nd columns can be driven independently.

Figure 4:
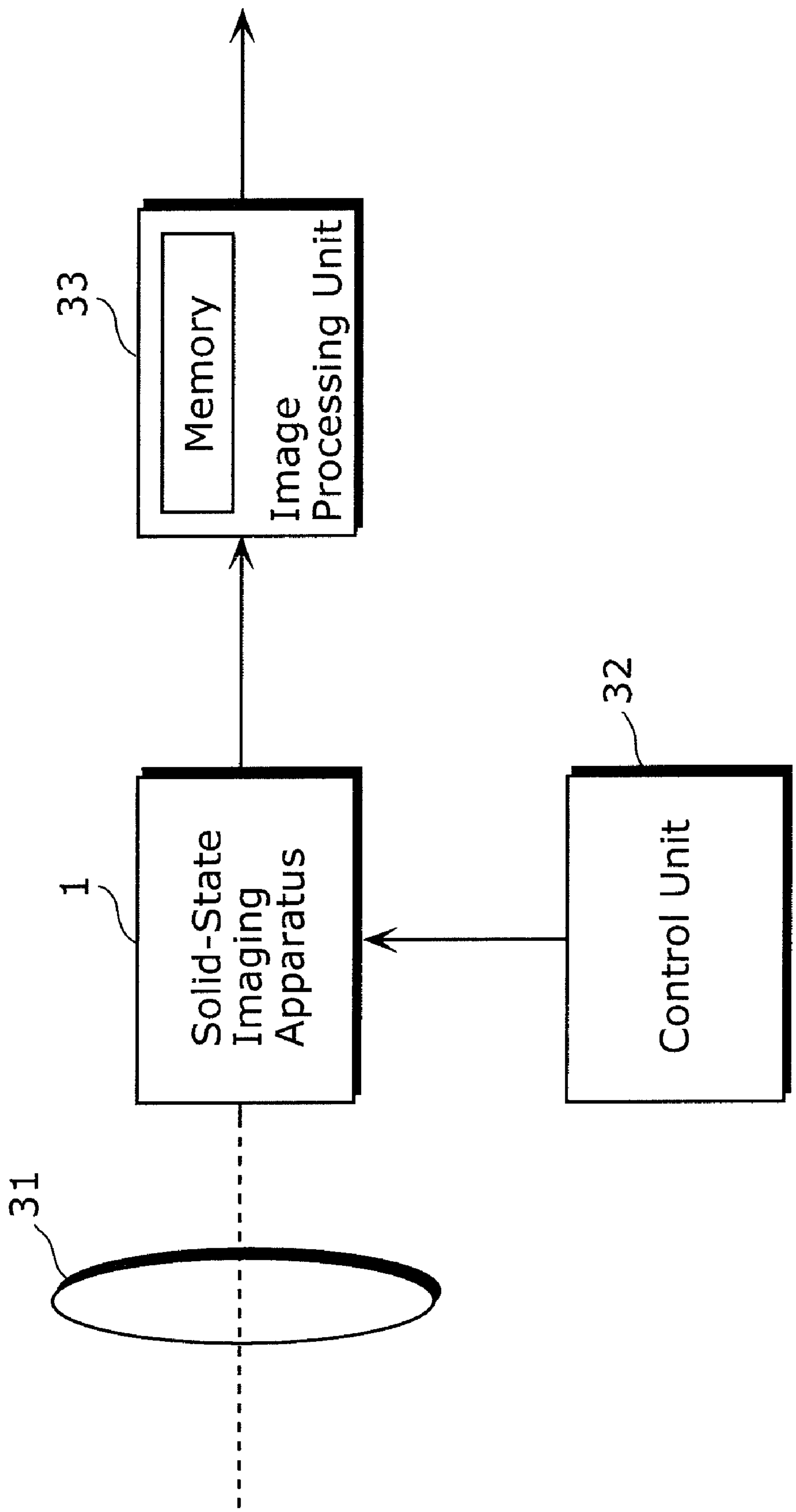
FIG. 4 is a block diagram showing a structure of a camera according to the first embodiment.

FIG. 4 is a schematic block diagram showing a structure of a digital camera having the solid-stage imaging apparatus according to the first embodiment. This digital camera includes an optical system 31, a control unit 32, and an image processing unit 33. The optical system 31 includes a lens for imaging incident light from an object on an imaging area of the solid-stage imaging apparatus (solid-stage imaging apparatus 1). The control unit 32 controls driving of the solid-stage imaging apparatus 1. The image processing unit 33 performs noise reduction processing and various image processing for output signals from the solid-stage imaging apparatus 1.

The image processing unit 33 includes a memory, and reduces noise from the first mixed packet using the second mixed packet, in other words, almost cancel, from the first mixed packet, noise components resulted from smears and dark currents. Thereby, it is possible to improve image quality. More specifically, by subtracting, from the first mixed packet, dummy packets which belong to the same column as signal packets and dummy packets included in the first mixed packet and whose number is the same as the number of the signal packets and dummy packets included in the first mixed packet, it is possible to almost cancel noise components included in the first mixed packet. This is because an amount of the noise components in one signal packet is able to be considered as the same amount of noise components in one dummy packet belonging to the identical column.

Processing performed by the above-structured solid-state imaging apparatus of the first embodiment is described herein.

Figure 5A:
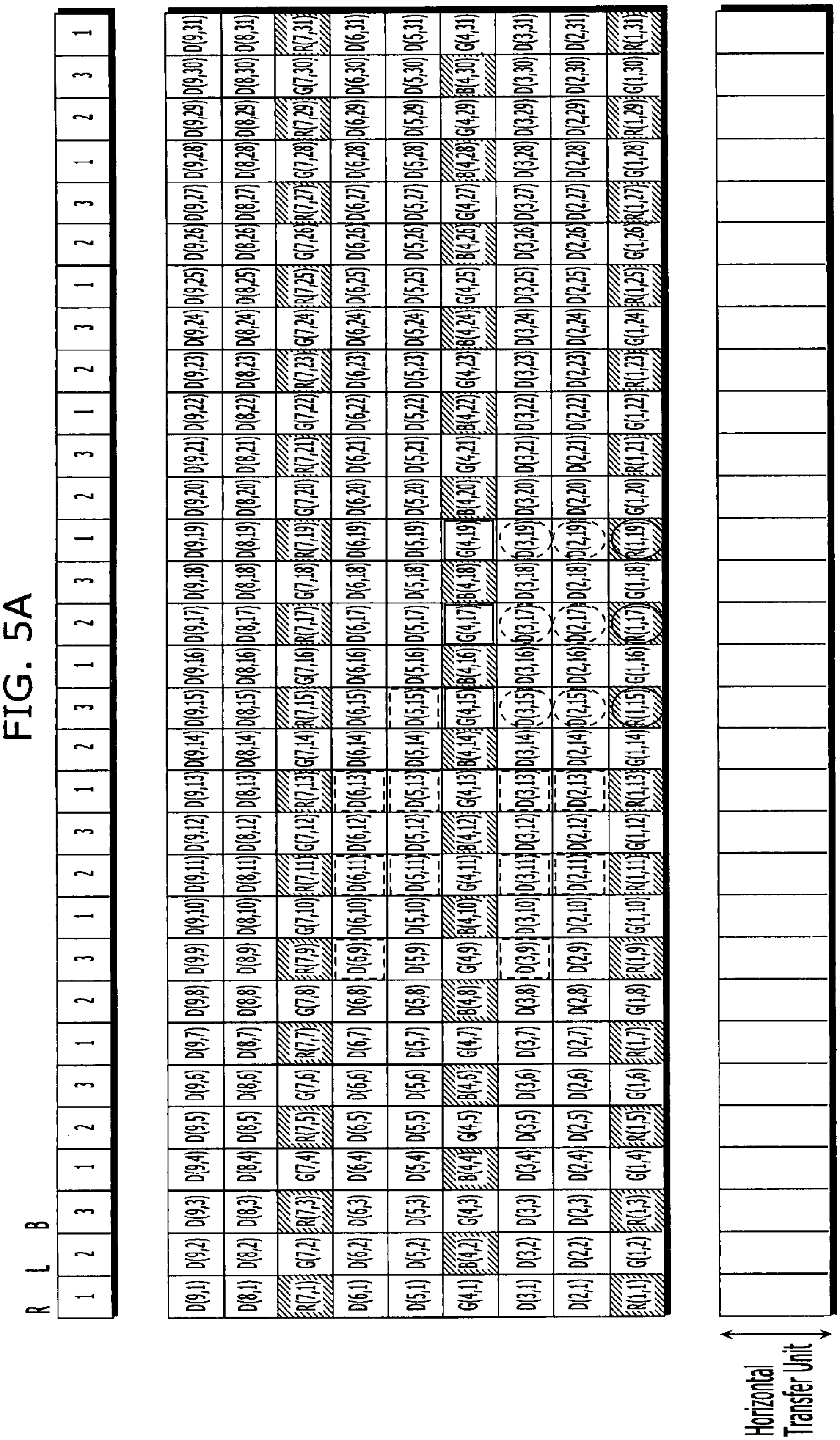
FIGS. 5A to 5O are diagrams for explaining pixel mixing according to the first embodiment.
Figure 5B:
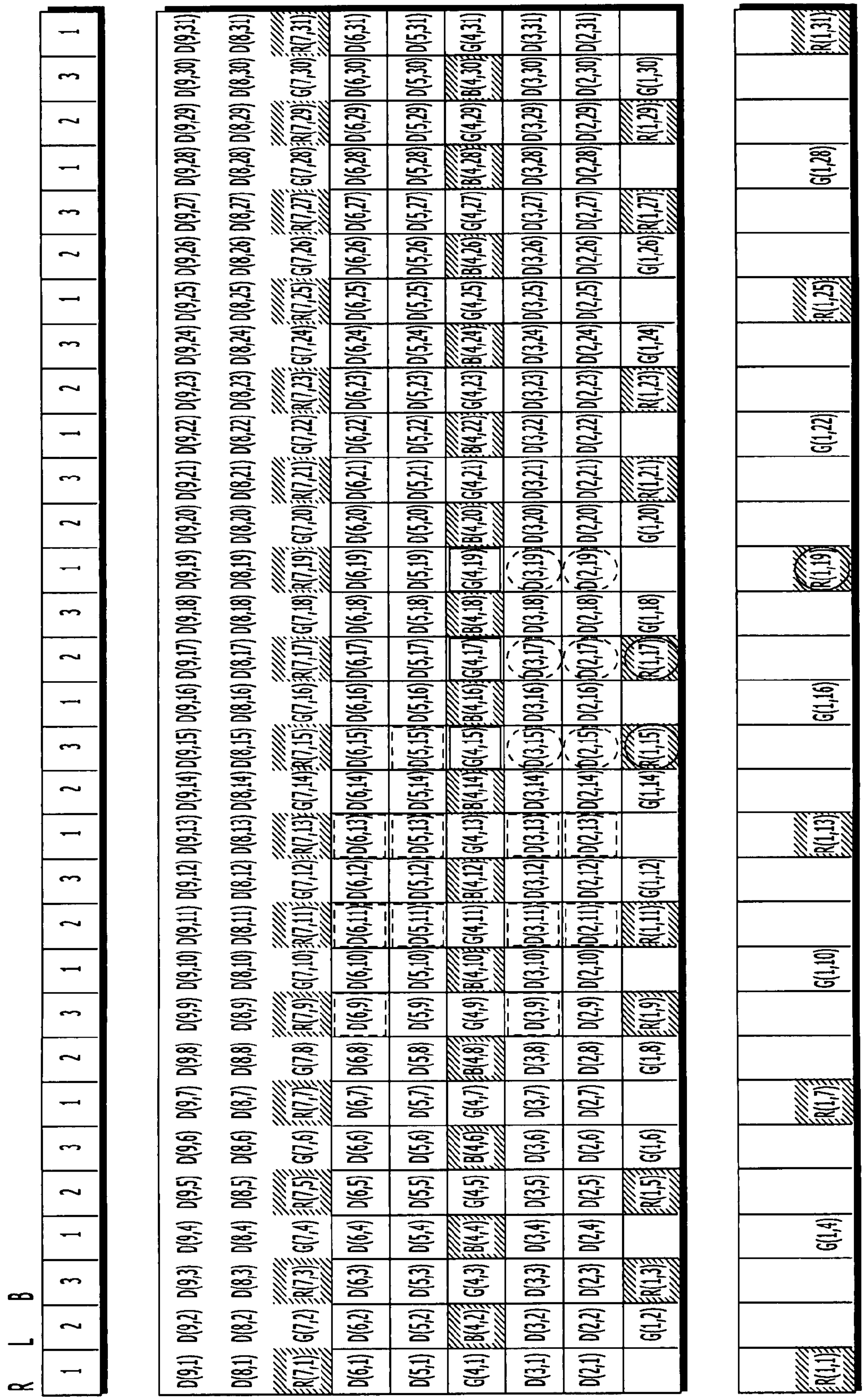
Figure 5C:
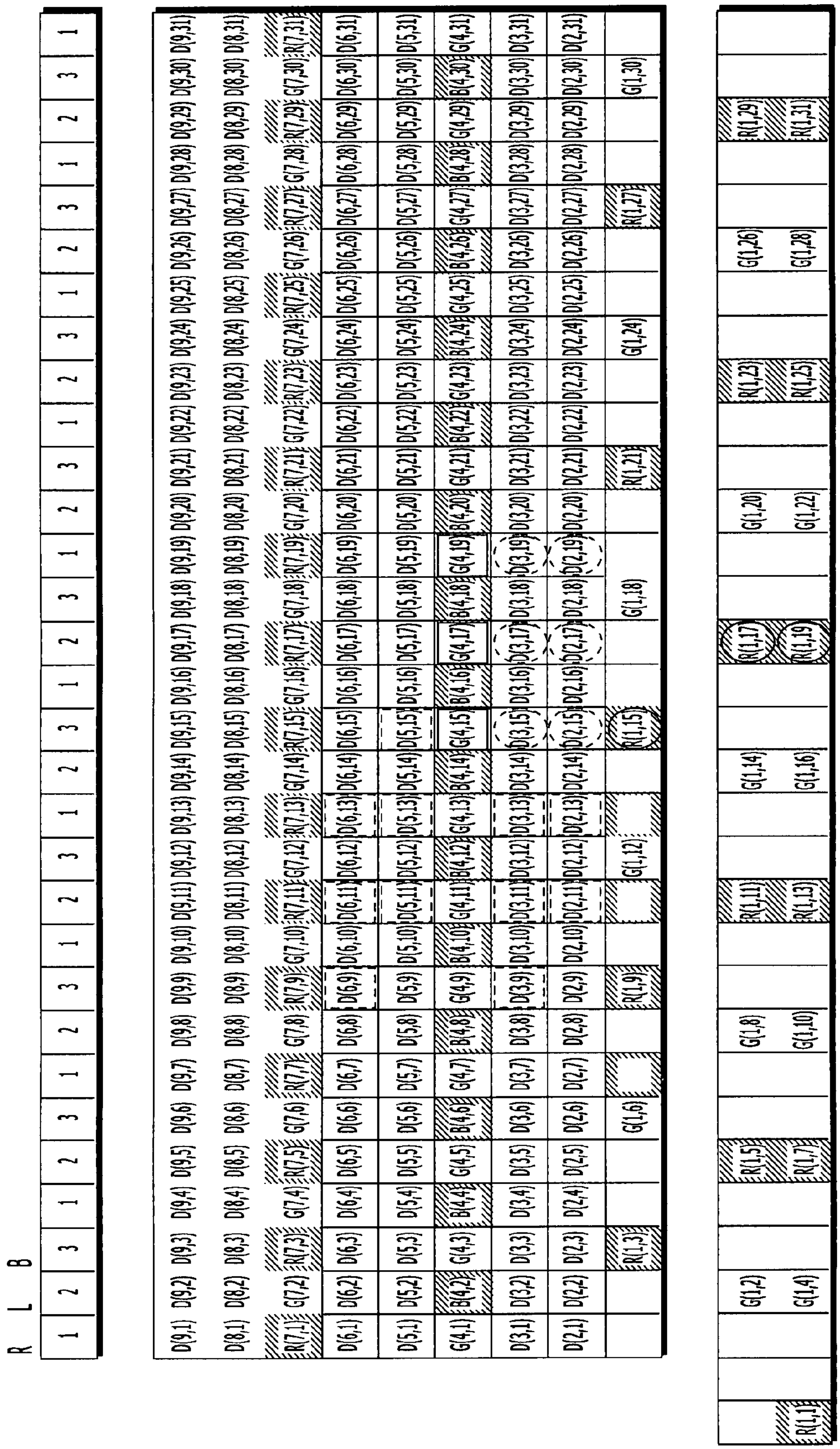
Figure 5D:
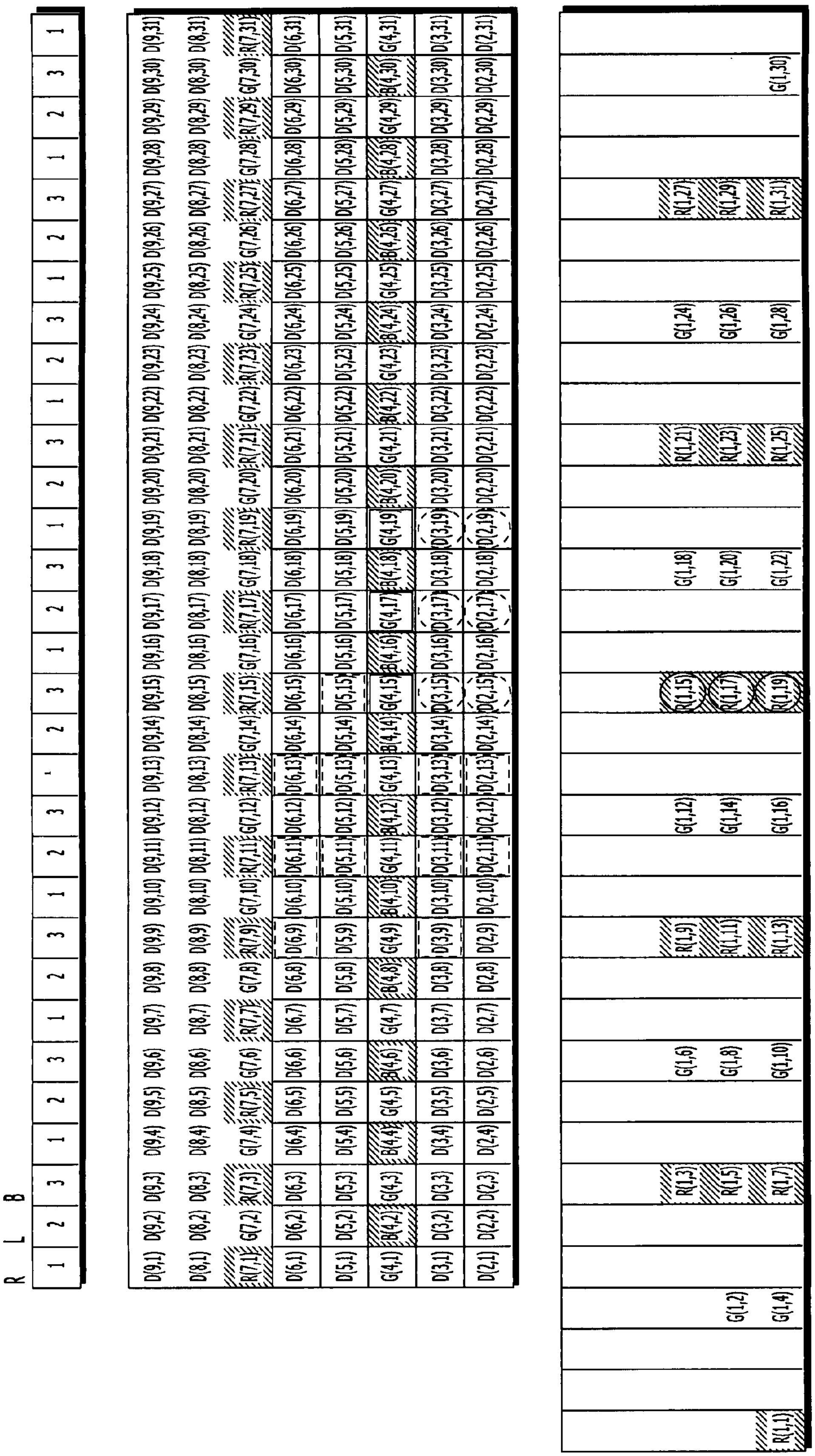
Figure 5E:
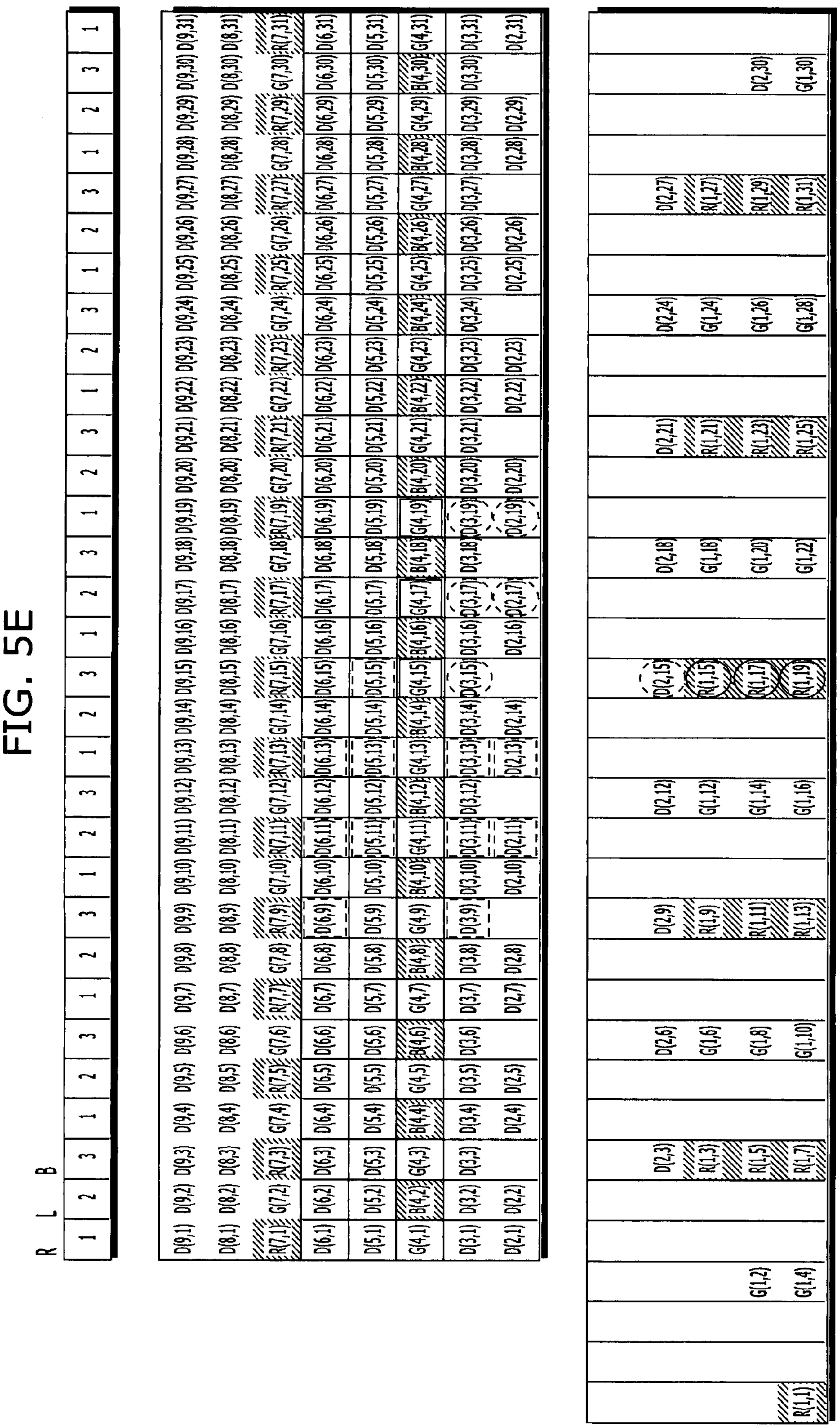
Figure 5F:
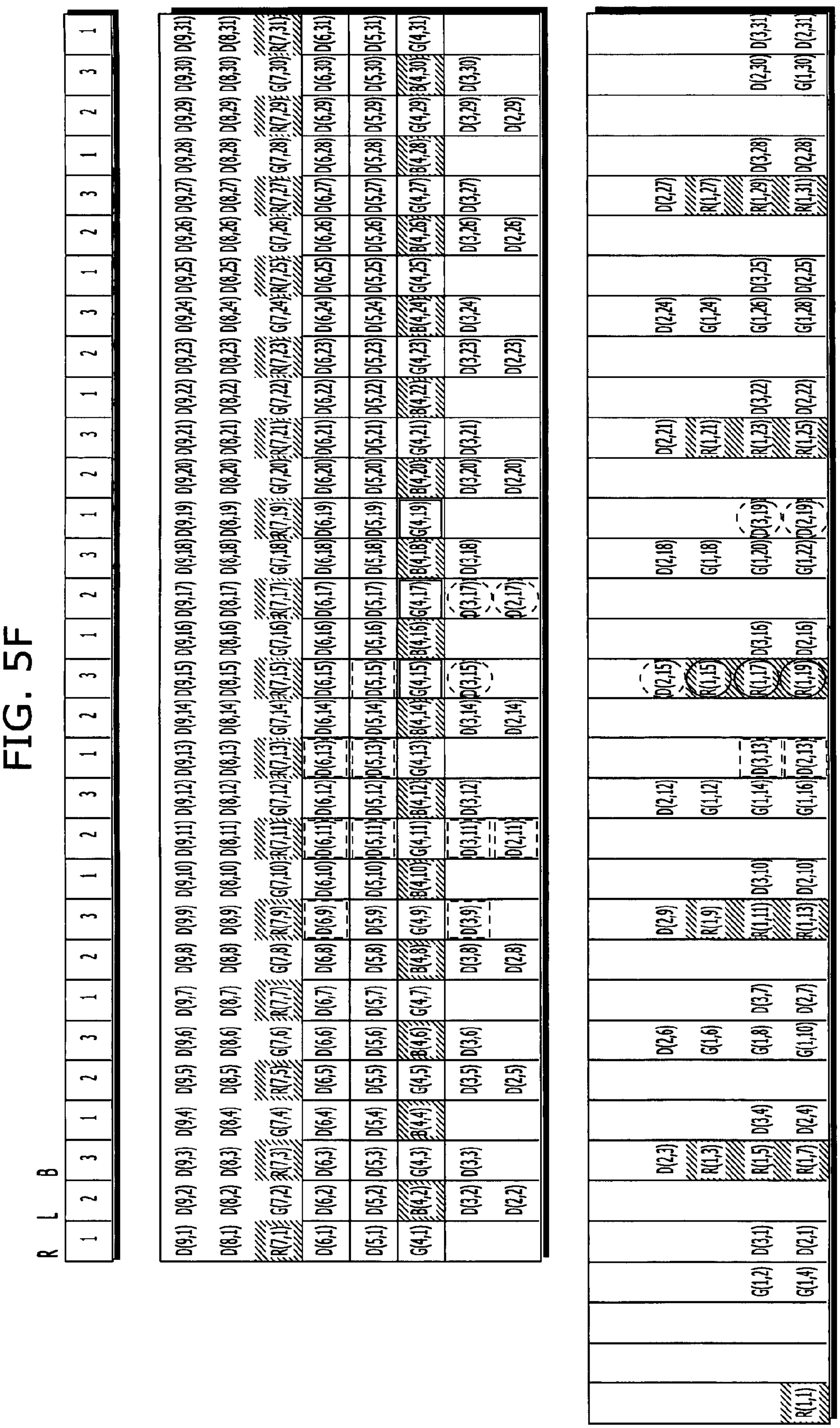
Figure 5G:
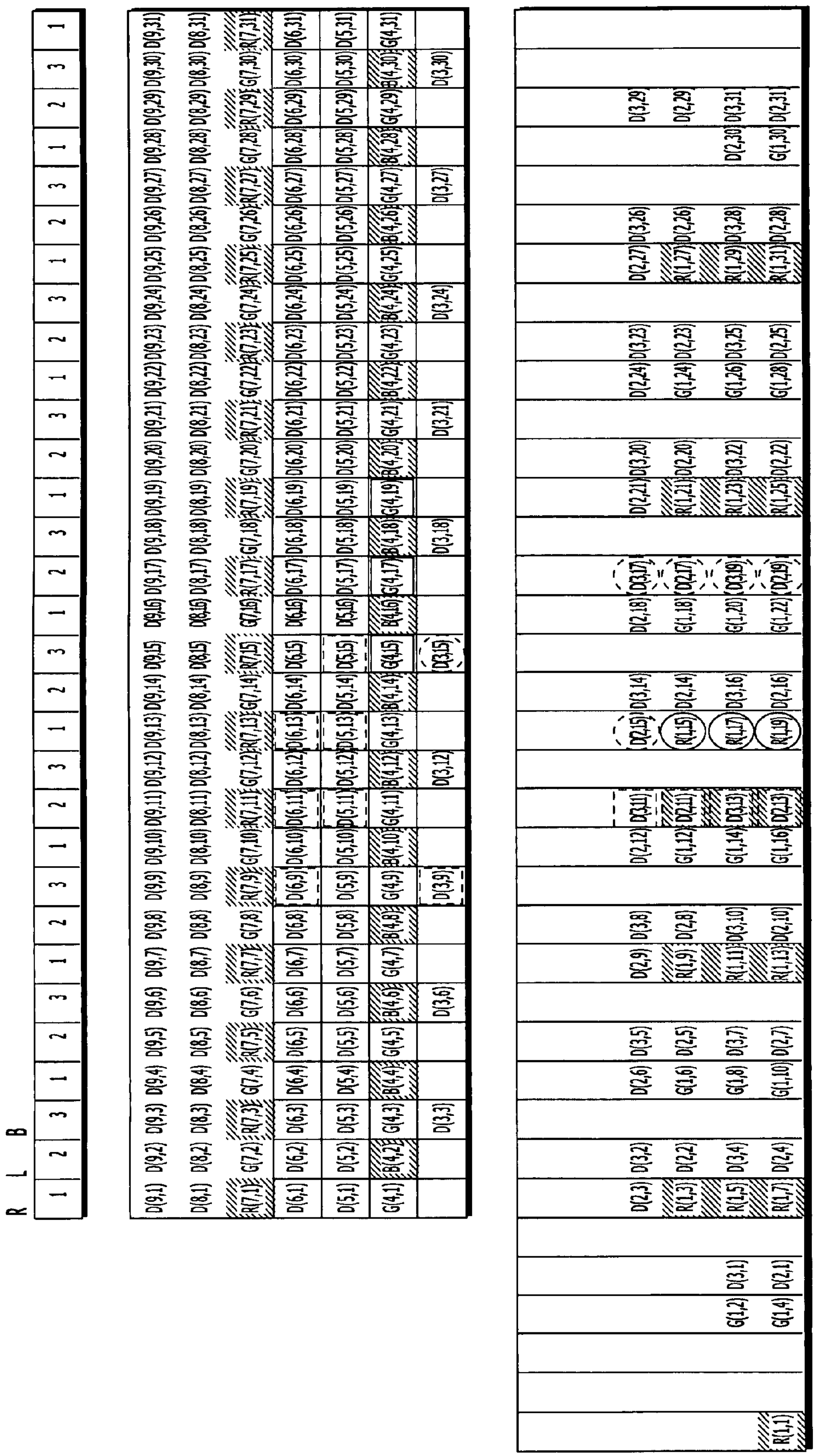
Figure 5H:
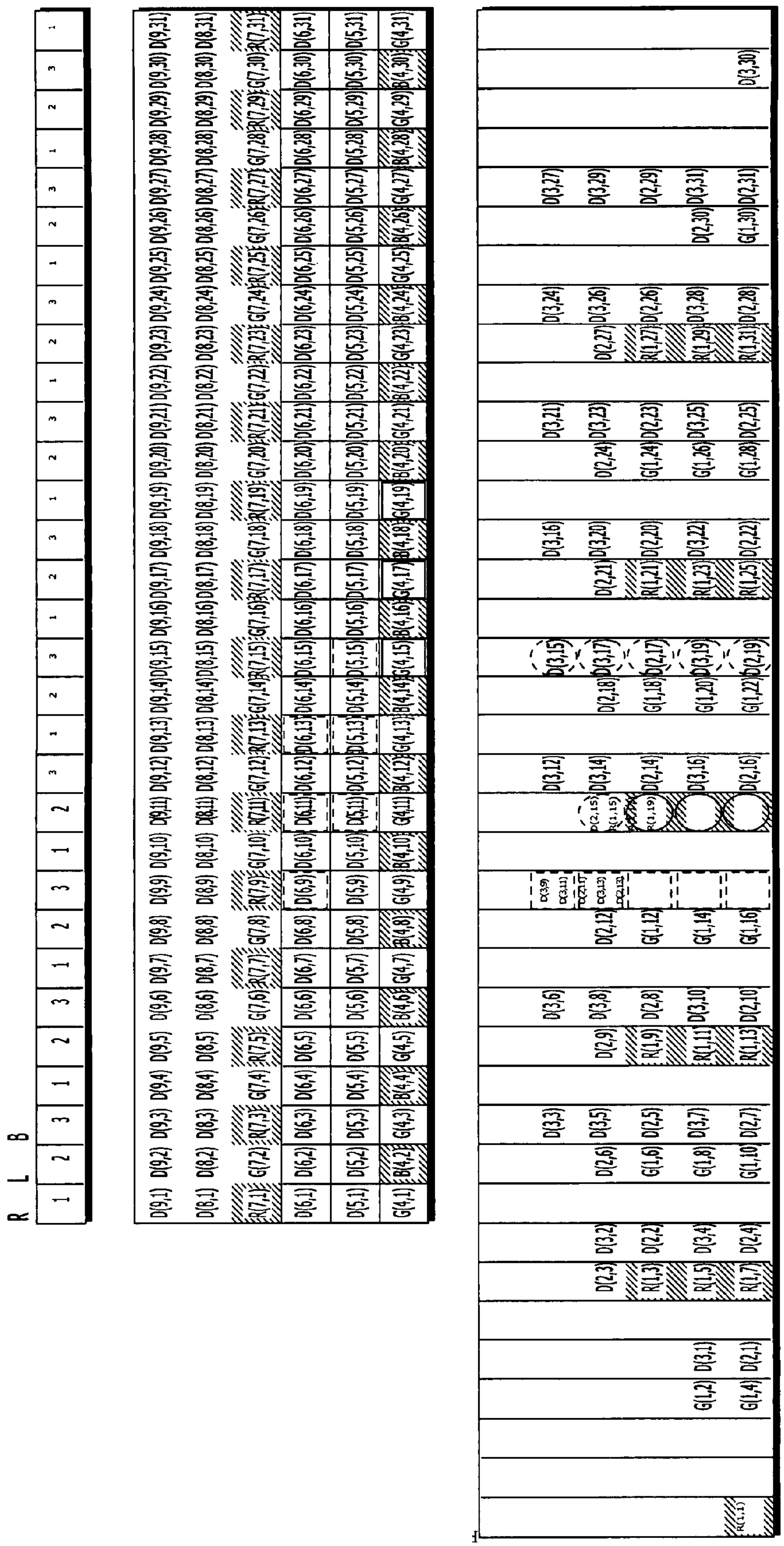
Figure 5I:
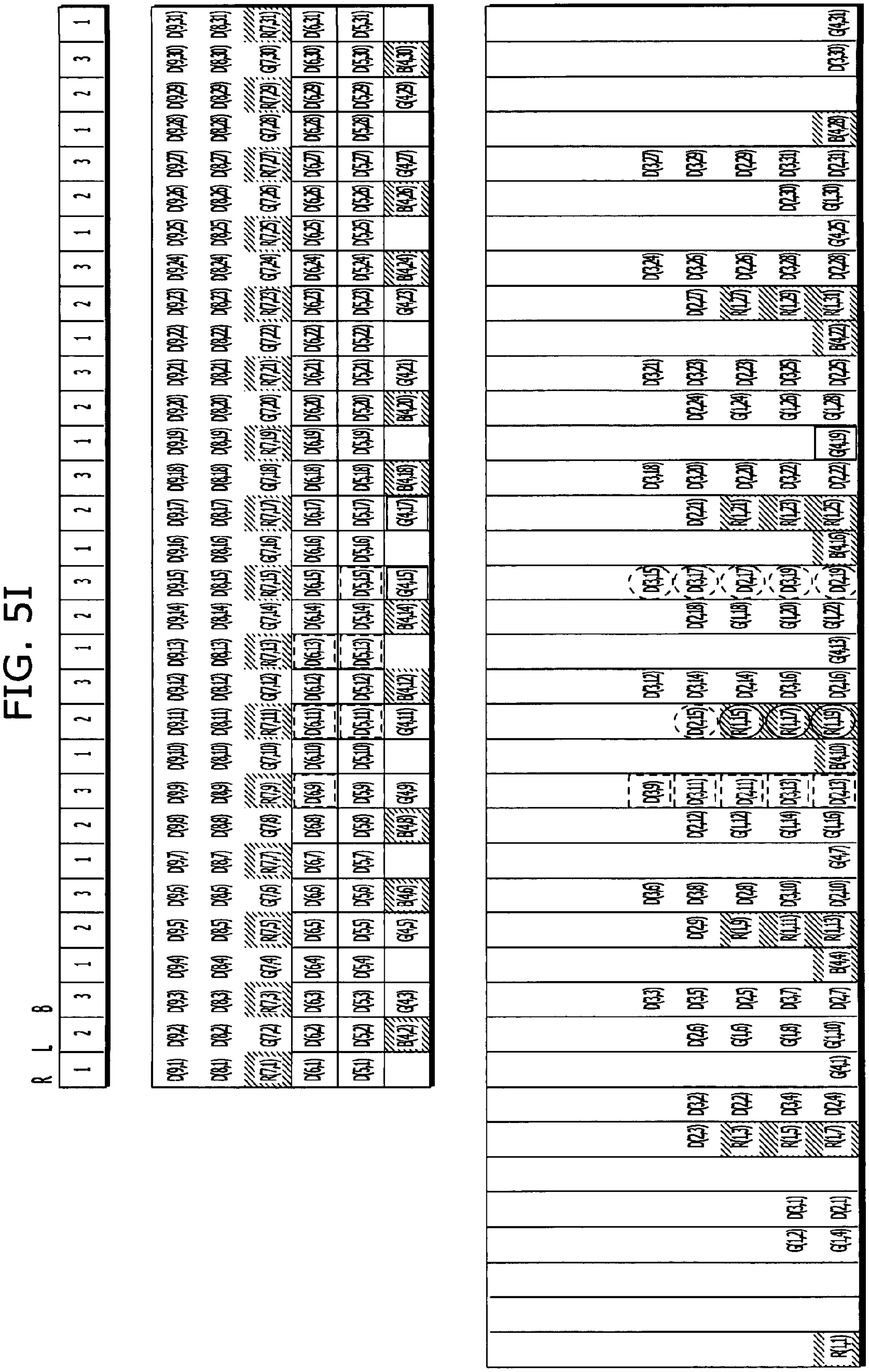
Figure 5J:
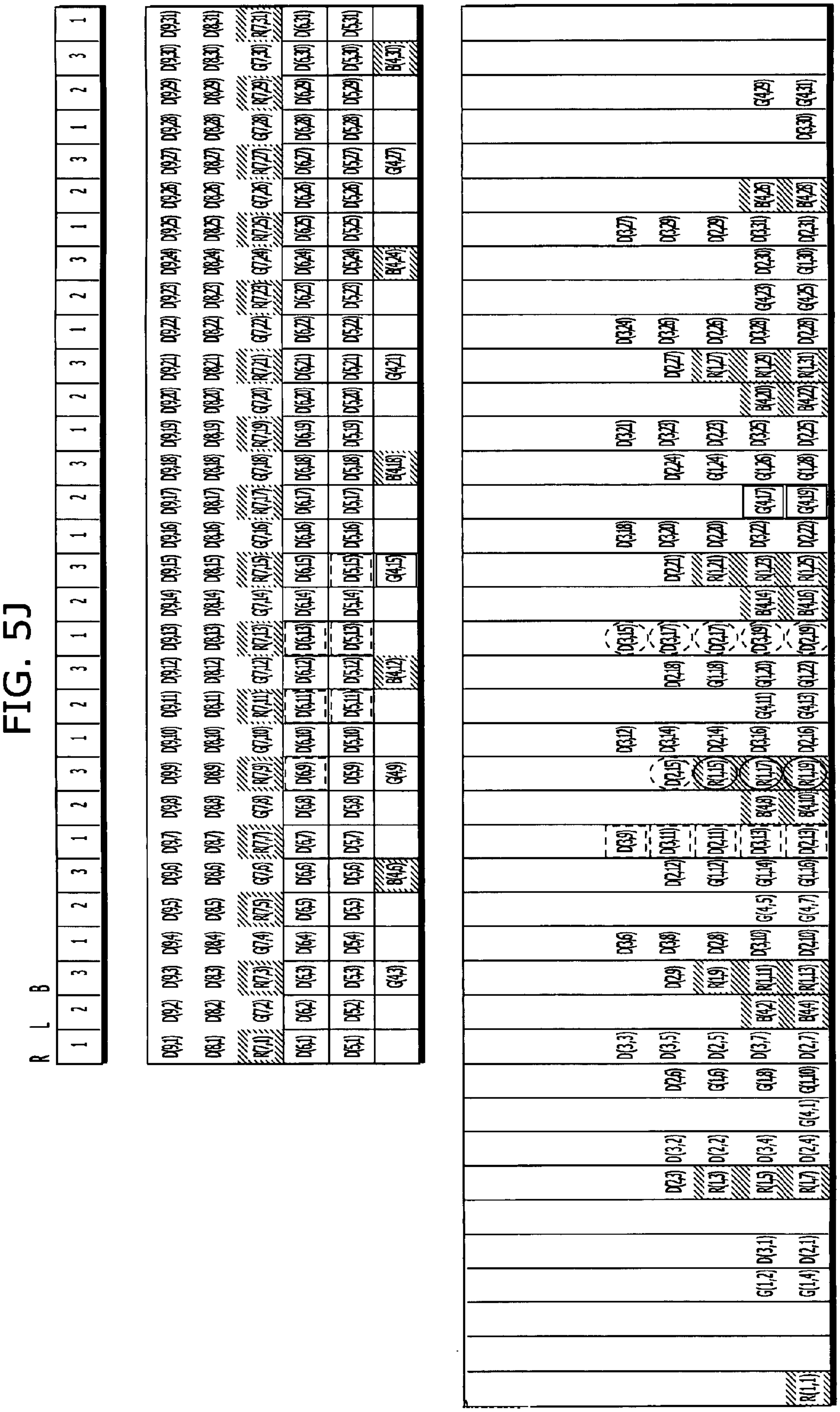
Figure 5K:
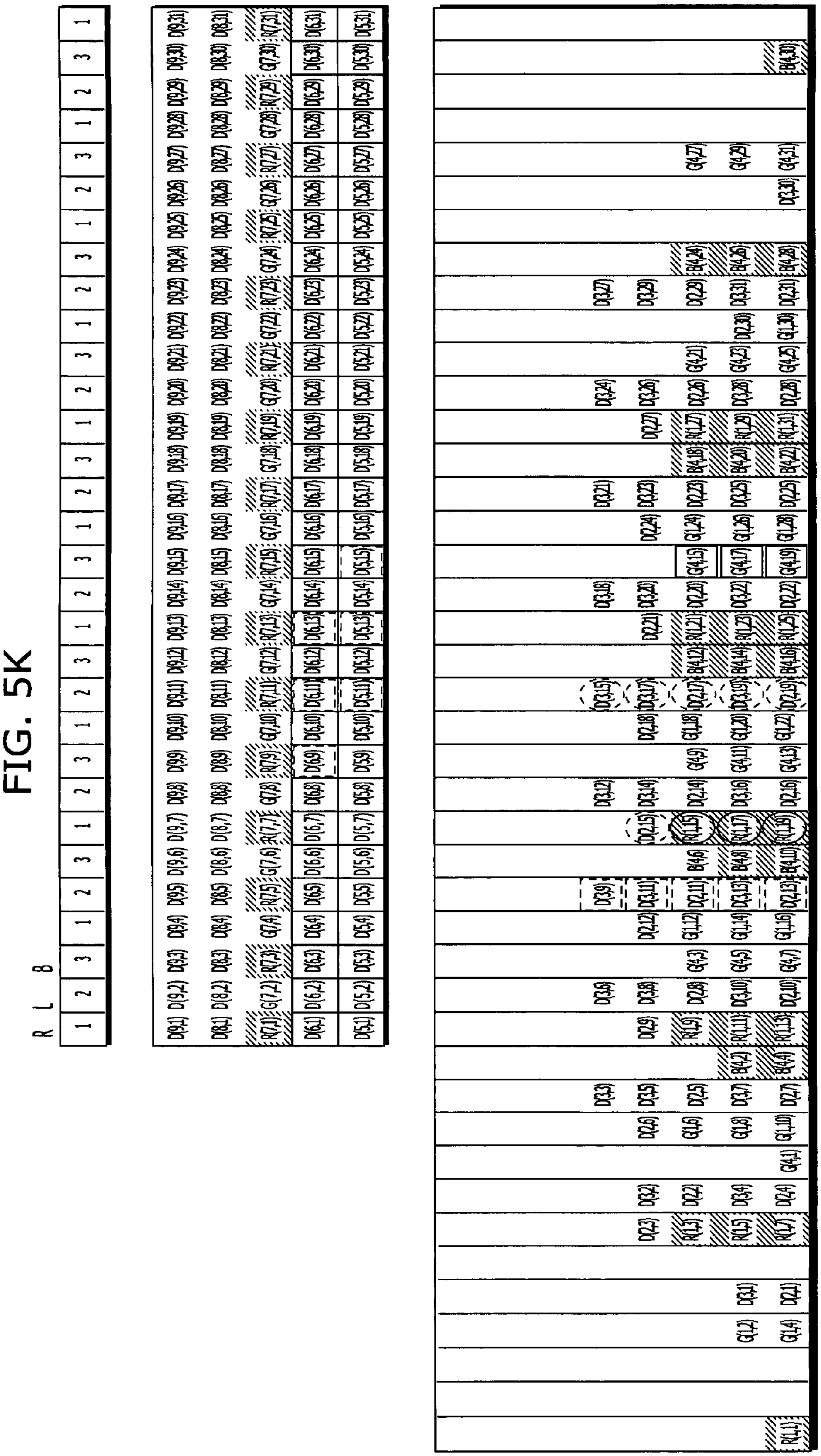
Figure 5L:
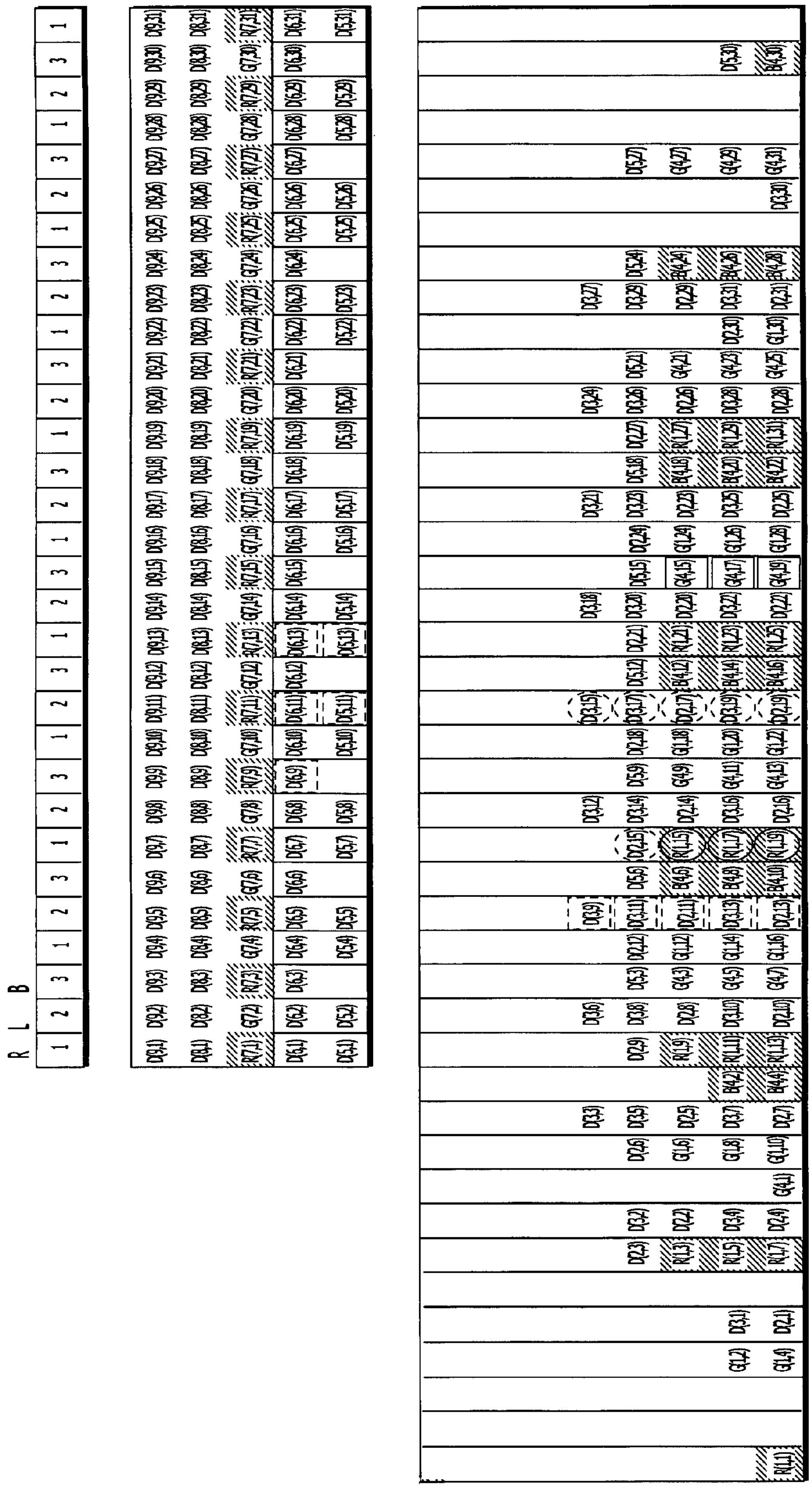
Figure 5M:
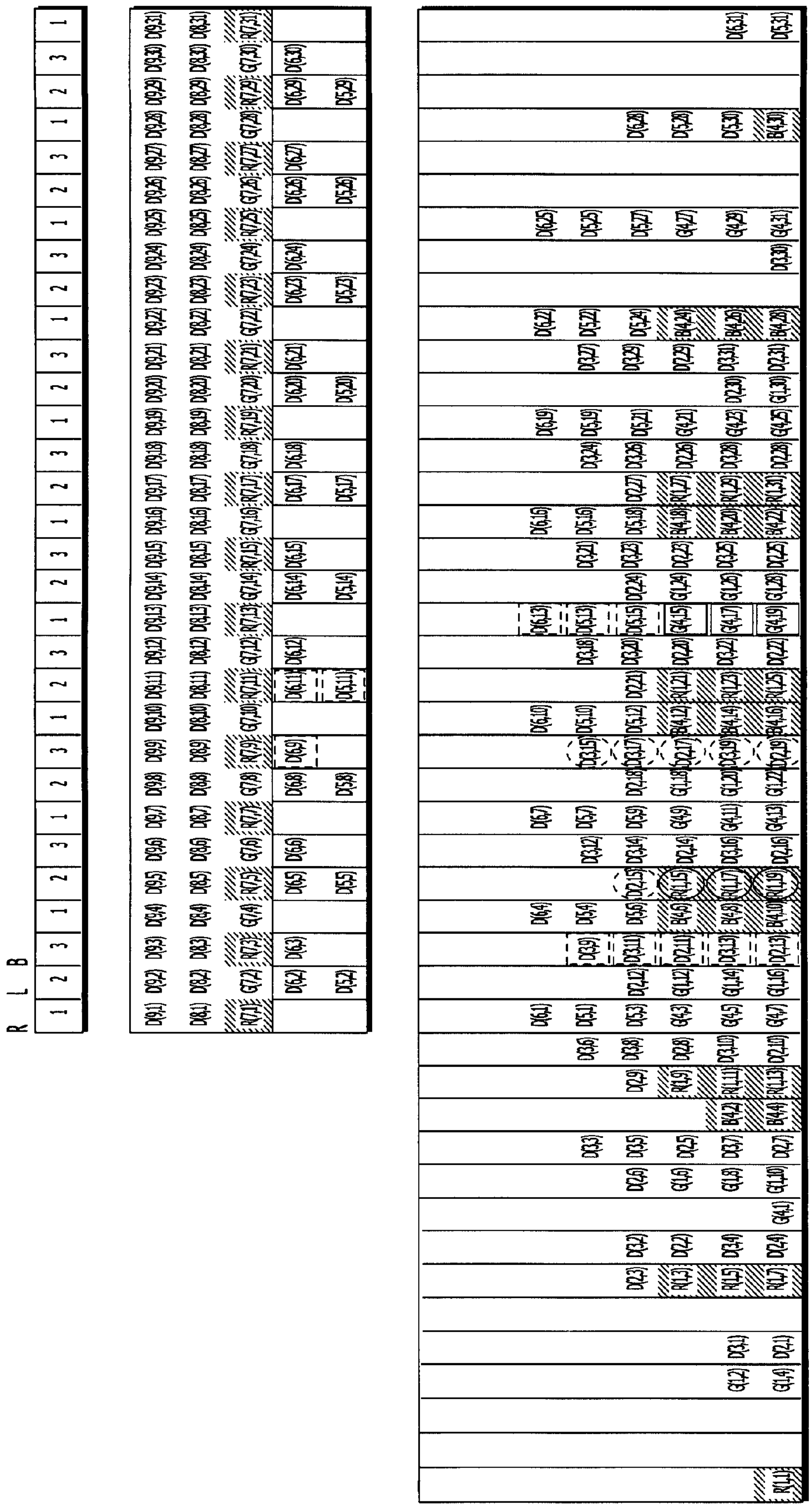
Figure 5N:
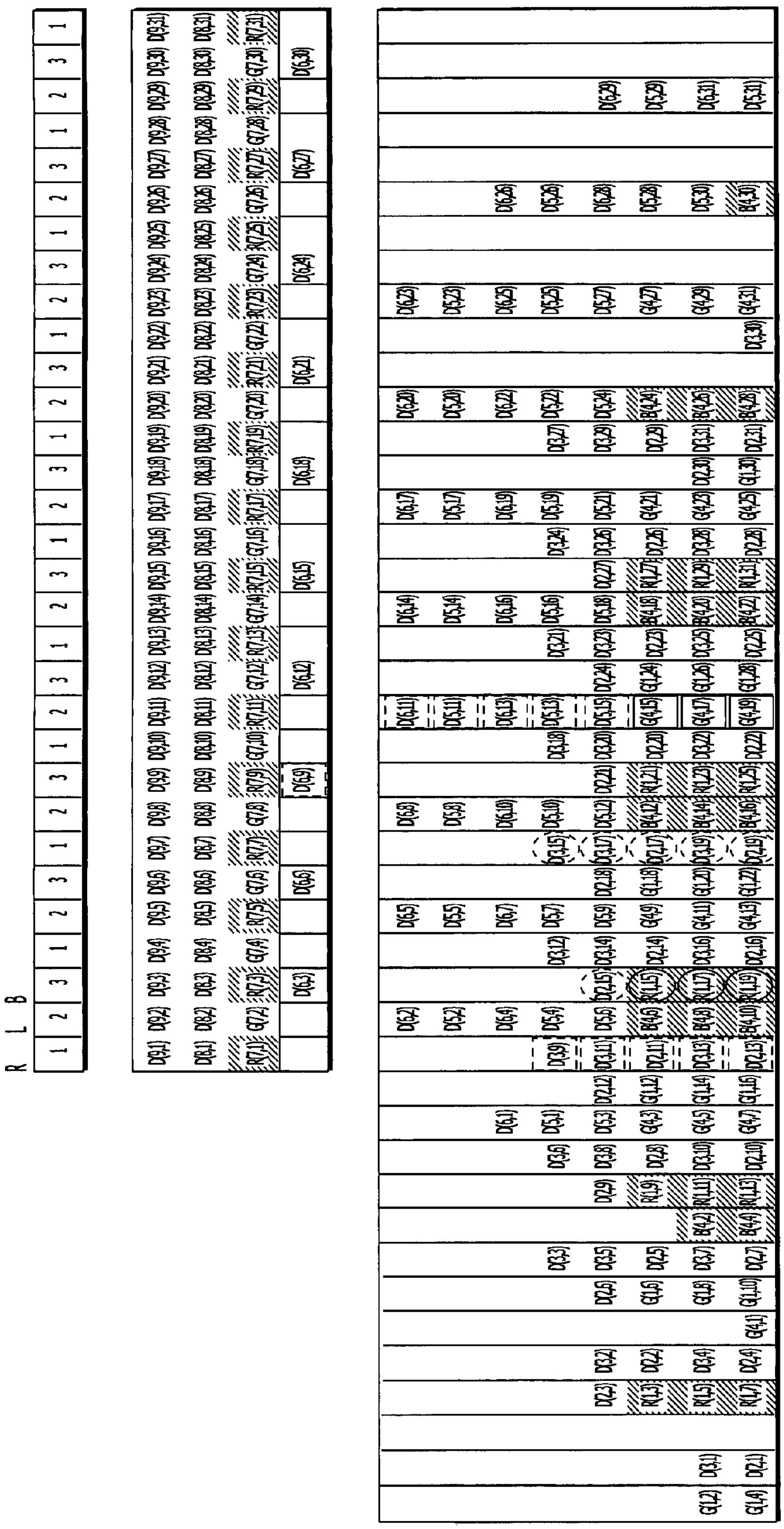

FIGS. 5A to 5N are diagrams showing, as one example, how signal packets and dummy packets are transferred and mixed in the packets-mixing mode. Here, it is assumed that one pixel is selected from vertical three pixels in pixel thinning and that horizontal three pixels are mixed together.

In FIG. 5A, 123123 . . . in a top section represent RLBRLB . . . columns, respectively. In FIG. 5A, only a part of the plurality of vertical transfer units 13 are shown. R (1, 1) represents a signal packet including signal charges representing red color positioned at the first row from bottom and the first column from left. D (9, 1) represents a dummy packet without valid signal charges, positioned at the ninth row from bottom and the first column from left. G and B represent a signal packet of green color and a signal packet of blue color, respectively. Note that FIGS. 5B to 5O show the coordinates of the original transfer packets of FIG. 5A.

Figure 5O:
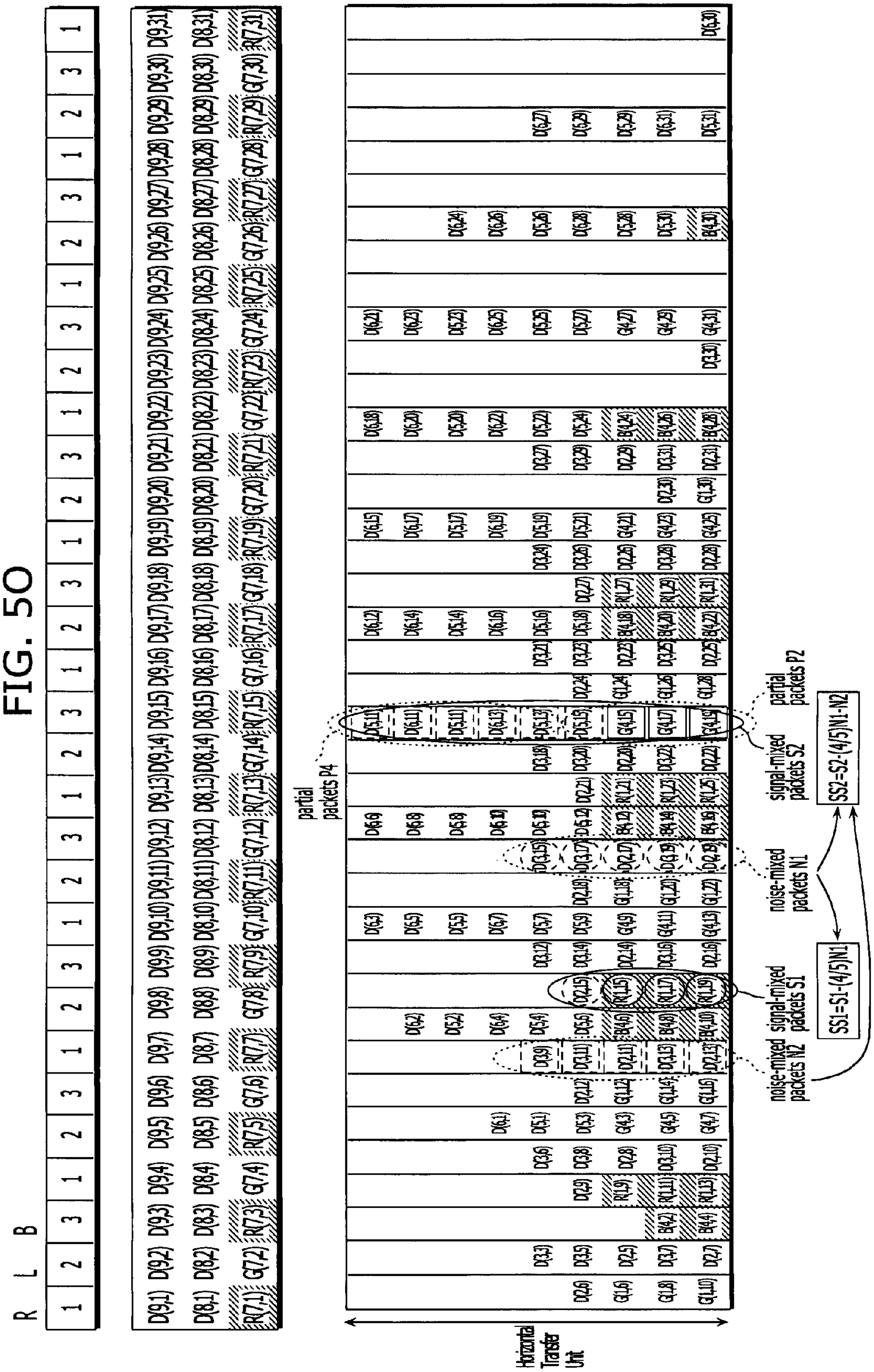

FIG. 5O shows a result of the processing starting from FIG. 5A, where the first mixed packets and the second mixed packets are generated in the horizontal transfer unit 14, by combining the vertical mixing and the horizontal mixing. FIGS. 5B to 5M show mid-steps in the processing.

In the figures, R (1, 15), R (1, 17), R (1, 19), and the like, which are enclosed by solid-line circles, are examples of signal packets which are to be mixed into one first mixed packet. D (2, 15) and the like, which are enclosed by dashed-line circles, are examples of dummy packets which are to be mixed into the first mixed packet or the second mixed packet. Packets enclosed by solid-line rectangles and dashed-line rectangles are the same as the explained as above.

As shown in FIG. 5O, the first mixed packets are classified into the first type and the second type. A first mixed packet S1 in the figures is one example of the first mixed packets of the first type in the horizontal transfer unit 14. A first mixed packet S2 is one example of the first mixed packets of the second type in the horizontal transfer unit 14.

This first mixed packet of the first type includes: i (i=3 in the figures) signal packets belonging to the same row and neighbor columns of the same color; i or less (1 in the figures) dummy packet belonging to the same column as the signal packets.

The first mixed packet of the second type includes: i signal packets belonging to the same row and neighbor columns of the same color; j (j=1, in the figures) dummy packet belonging to the same column as the signal packets; and k (where j+K>i, and in the figures, k=5) dummy packets not belonging to the same column as the signal packets.

Furthermore, second mixed packets N1 and N2 in the figures are examples of the second mixed packets in the horizontal transfer unit 14. The second mixed packet includes dummy packets belonging to the same columns as the signal packets and the dummy packets included in the first mixed packets of the first or second type. For example, the second mixed packet N1 includes dummy packets belonging to the same columns as the signal packets and the dummy packets included in the signal mixed packet S1. In addition, the second mixed packet N1 includes dummy packets belonging to the same columns as a partial packet P2 including the signal packets and one dummy packet included in the signal mixed packet S2. On the other hands, the second mixed packet N2 includes dummy packets belonging to the same columns as a partial packet P1 including a plurality of dummy packets included in the first mixed packet S2.

Noise in the first mixed packet S1 is almost cancelled according to the following equation 1.

$$SS1=S1-(4/5)N1 \quad \text{(equation 1)}$$

Note that SS1 represents a signal level of the first mixed packet S1 after noise reduction, S1 represents a signal level of the first mixed packet S1, and N1 represents a signal level of the second mixed packet N1.

The first mixed packet S1 includes three signal packets and one noise packet. The signal packet includes both of signal components and noise components. This means that the first mixed packet S1 includes signal components of three packets and noise components of four packets.

The second mixed packet N1 includes noise components of five packets. The noise components of five packets are included in noise packets belonging to the same column as the signal packets and the noise packet in the first mixed packet. Therefore, noise components per one packet in the first mixed packet S1 is almost equal to noise components per one packet in the second mixed packet N1. (4/5)N1 in the equation 1 is considered to be almost equal to noise components of four packets in the first mixed packet S1. Therefore, SS1 is able to be considered to be a signal level in which noise components of four packets are almost cancelled from the first mixed packet S1.

Noise in a first mixed packet S2 is almost cancelled according to the following equation 2.

$$SS2=S2-(4/5)N1-N2 \quad \text{(equation 2)}$$

Note that SS2 represents a signal level of the first mixed packet S2 after noise reduction, S2 represents a signal level of the first mixed packet S2, and N1 represents a signal level of the second mixed packet N2.

A partial packet P1 in the first mixed packet S2 and the second mixed packet N2 include noise components of respective five packets belonging to respective same columns. A partial packet P2 in the first mixed packet S2 and the second mixed packet N2 include noise components of four packets and five packets, respectively, belonging to respective same columns. Therefore, SS2 is able to be considered to be a signal level in which noise components of nine packets are almost cancelled from the first mixed packet S2.

Figure 6:
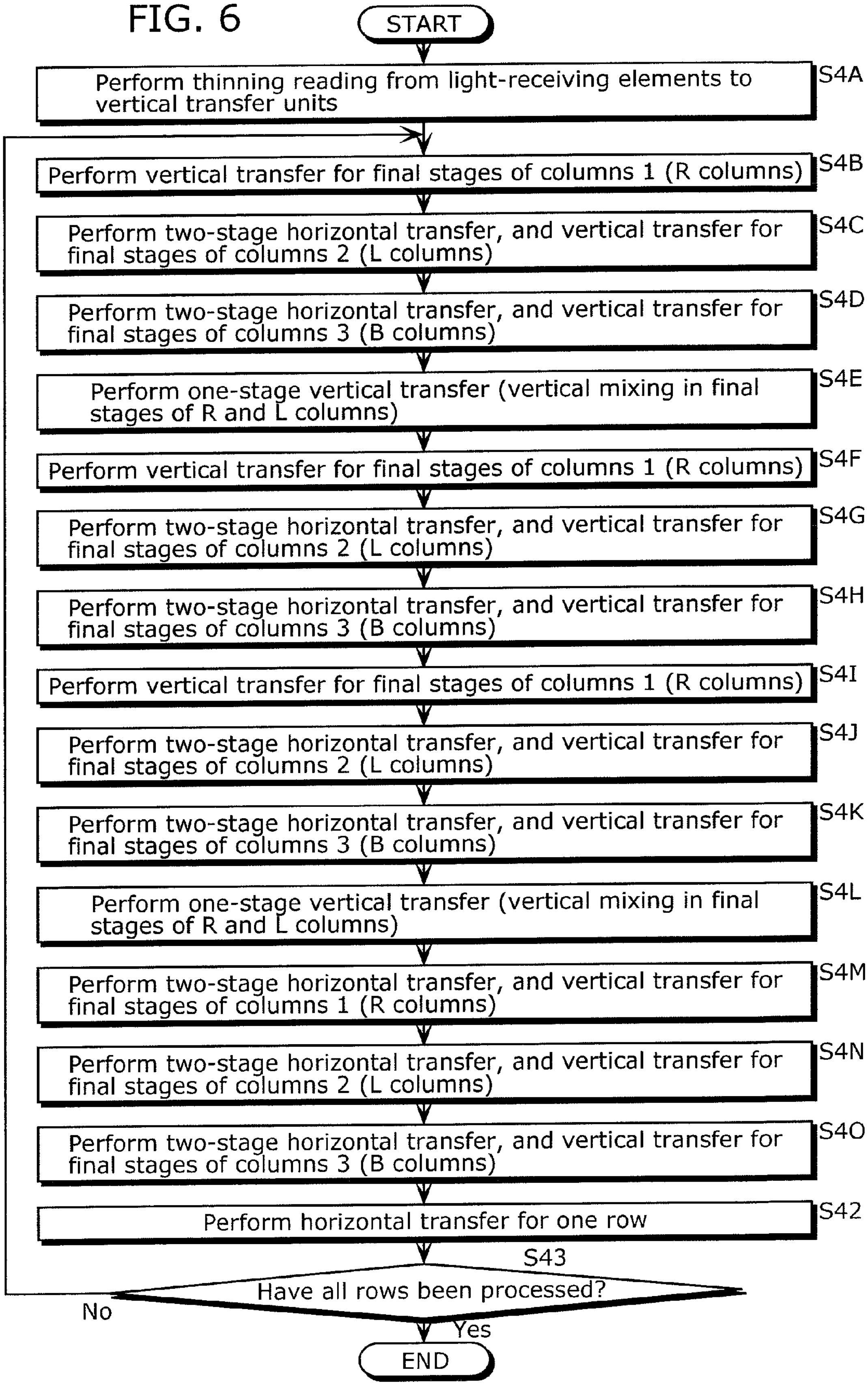
FIG. 6 is a flowchart of driving the pixel mixing according to the first embodiment.

FIG. 6 is a flowchart performed by the timing generation circuit 20 for driving transfer processing of FIGS. 5A to 5O. Note that respective results of the Steps S4A to S4O of FIG. 6 correspond to respective FIG. 5A to FIG. 5O.

At step S4A of FIG. 6, the timing generation circuit 20 drives the vertical transfer units 13 to read signal charges from the light-receiving elements 12, whose number is reduced or thinned (hereinafter, expressed as "perform thinning reading"), to the vertical transfer units 13. The result is shown in FIG. 5A. In FIG. 5A, all stages of the horizontal transfer unit 14 are still empty.

At step S4B, the timing generation circuit 20 drives the vertical transfer units 13 to transfer packets in final stages of the 1st columns (R columns) in a vertical direction. The result is shown in FIG. 5B. In FIG. 5B, signal packets are transferred from the final stages of respective R columns to the horizontal transfer unit 14.

At step S4C, the timing generation circuit 20 drives the horizontal transfer unit 14 to transfer packets by two stages in a horizontal direction (hereinafter, expressed as "perform two-stage horizontal transfer), and then drives the vertical transfer unit 13 to vertically transfer packets in final stages of the 2nd columns (L columns) to the horizontal transfer unit 14. The result is shown in FIG. 5C.

At step S4D, the timing generation circuit 20 drives the horizontal transfer unit 14 to perform two-stage horizontal transfer, and then drives the vertical transfer unit 13 to vertically transfer packets by one stage in a vertical direction (hereinafter, expressed as "perform one-stage vertical transfer") for all columns. The result is shown in FIG. 5D.

At step S4E, the timing generation circuit 20 drives the vertical transfer unit 13 to perform one-stage vertical transfer, including mixing charges in a vertical direction (hereinafter, expressed as "perform vertical mixing") in the final stages of R and L columns. The result is shown in FIG. 5E.

At step S4F, the timing generation circuit 20 drives the vertical transfer units 13 to transfer packets in final stages of the 1st columns (R columns) in a vertical direction. The result is shown in FIG. 5F.

At step S4G, the timing generation circuit 20 drives the horizontal transfer unit 14 to perform two-stage horizontal transfer, and then drives the vertical transfer unit 13 to vertically transfer packets in final stages of the 2nd columns (L columns). The result is shown in FIG. 5G.

At step S4H, the timing generation circuit 20 drives the horizontal transfer unit 14 to perform two-stage horizontal transfer, and then drives the vertical transfer unit 13 to perform one-stage vertical transfer for all columns. The result is shown in FIG. 5H.

At step S4I, the timing generation circuit 20 drives the vertical transfer units 13 to transfer packets in final stages of the 1st columns (R columns) in a vertical direction. The result is shown in FIG. 5I.

At step S4J, the timing generation circuit 20 drives the horizontal transfer unit 14 to perform two-stage horizontal transfer, and then drives the vertical transfer unit 13 to vertically transfer packets in final stages of the 2nd columns (L columns). The result is shown in FIG. 5I.

At step S4K, the timing generation circuit 20 drives the horizontal transfer unit 14 to perform two-stage horizontal transfer, and then drives the vertical transfer unit 13 to perform one-stage vertical transfer for all columns. The result is shown in FIG. 5K.

At step S4L, the timing generation circuit 20 drives the vertical transfer unit 13 to perform one-stage vertical transfer, including vertical mixing in the final stages of R and L columns. The result is shown in FIG. 5L.

At step S4M, the timing generation circuit 20 drives the horizontal transfer unit 14 to perform two-stage horizontal transfer, and then drives the vertical transfer unit 13 to vertically transfer packets in final stages of the 1st columns (R columns). The result is shown in FIG. 5M.

At step S4N, the timing generation circuit 20 drives the horizontal transfer unit 14 to perform two-stage horizontal transfer, and then drives the vertical transfer unit 13 to vertically transfer packets in final stages of the 2nd columns (L columns). The result is shown in FIG. 5N.

At step S4O, the timing generation circuit 20 drives the horizontal transfer unit 14 to perform two-stage horizontal transfer, and then drives the vertical transfer unit 13 to perform one-stage vertical transfer for all columns. The result is shown in FIG. 5O.

Then, at Step S42, the timing generation circuit 20 drives the horizontal transfer unit 14 to sequentially transfer for one row. At step S43, it is determined whether or not there is any signal packet in the vertical transfer unit 13 which has not yet been transferred. If the determination is made that there is no such a signal packet (Yes at S43), then the processing is complete. On the other hand, if there is any such a signal packet (No at S43), then the processing returns to step S4B to repeat the above-explained processing.

Figure 7:
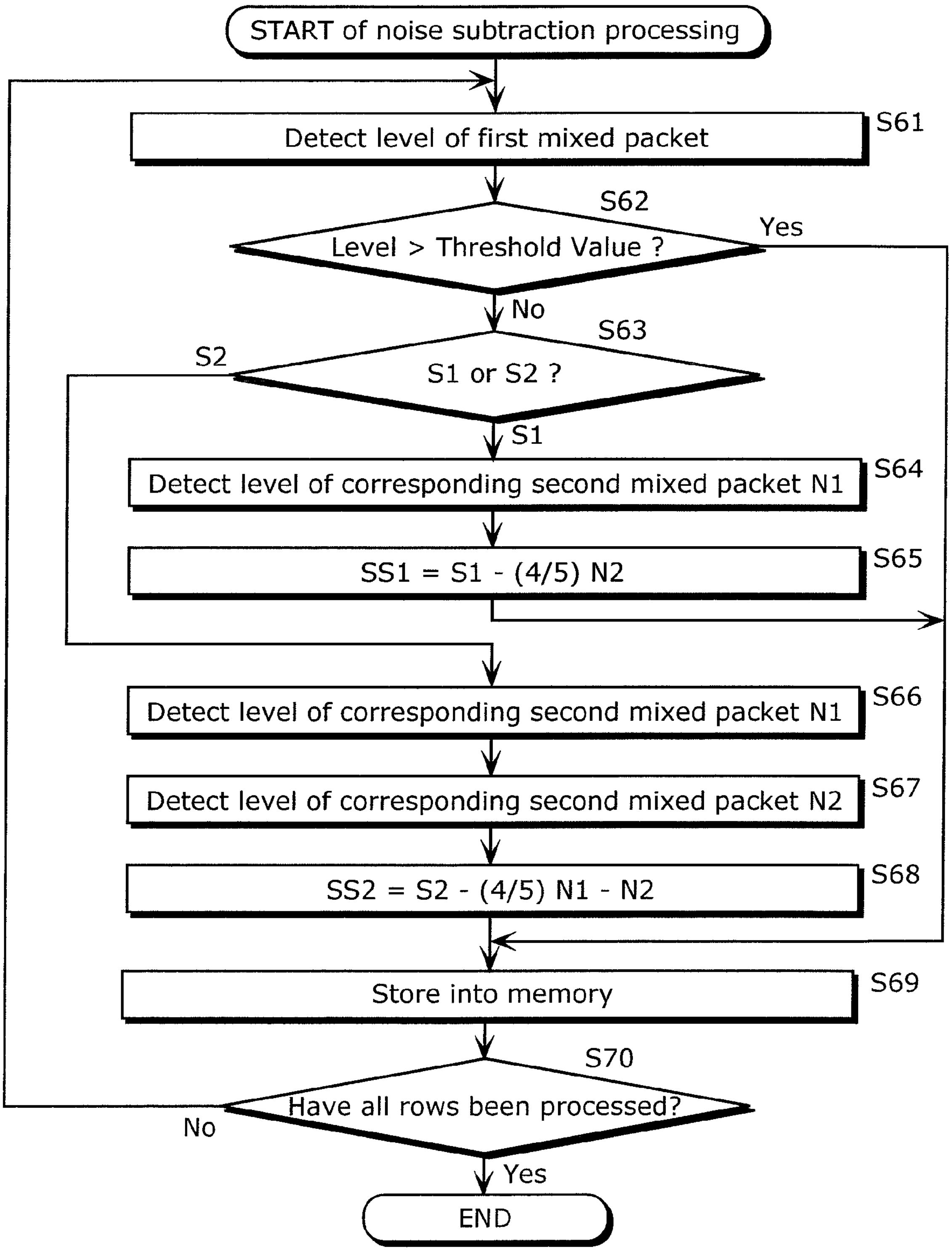
FIG. 7 is a flowchart of noise reduction processing according to the first embodiment.

FIG. 7 is a flowchart of noise reduction processing performed by the image processing unit 33. The noise reduction processing is performed for each of the first mixed packets which are outputted by the sequential transfer for one row at Step S42 of FIG. 6.

Firstly, the image processing unit 33 detects a signal level of the first mixed packet (S61), and then compared the signal level of the first mixed packet to a threshold value (S62). Here, the threshold value may be, for example, a saturated signal amount in the horizontal transfer unit holding the first mixed packet, or a maximum value of input dynamic range in a later stage of the horizontal transfer unit. If the signal level of the first mixed packet is equal or less than the threshold value, then the image processing unit 33 determines whether the first mixed packet is the first type or the second type (S1 or S2) (S63).

If the determination is made that the first mixed packet is the first type, then the image processing unit 33 detects a signal level of the second mixed packet corresponding to the first mixed packet (S64), almost cancels noise components from the first mixed packet according to the equation 1 (S65), and stores the calculated signal level of the first mixed packet whose noise is cancelled into a memory (S69).

$$SS1=S1-(4/5)N1 \quad \text{(equation 1)}$$

If the determination is made that the first mixed packet is the second type, then the image processing unit 33 detects a signal level of the second mixed packet N1 corresponding to the first mixed packet (S66), detects a signal level of the second mixed packet N2 corresponding to the first mixed packet (S67), almost cancels noise components from the first mixed packet according to the equation 2 (S68), and stores the calculated signal level of the first mixed packet whose noise is cancelled into the memory (S69).

$$SS2=S2-(4/5)N1-N2 \quad \text{(equation 2)}$$

On the other hands, if the signal level of the first mixed packet exceeds the threshold value, then the image processing unit 33 stores the signal level of the first mixed packet into the memory, without the noise reduction (S69).

As described above, in the solid-state imaging apparatus according to the first embodiment, it is possible to generated the first mixed packet and the second mixed packet in the horizontal transfer unit, and cancel noise components, which are resulted from smears and dark currents, from the first mixed packet by the noise reduction processing using the second mixed packet. As a result, it is possible to prevent smear aliasing, thereby improving image quality.

Furthermore, it is possible to prevent image quality deterioration due to the noise reduction processing in the case where a signal level of the first mixed packet exceeds a threshold value.

More specifically, when a signal level of the first mixed packet (first type and second type) exceeds a threshold value, for example when the signal level exceeds linearity of voltage conversion characteristics in the electronic charge detection unit 15, the signal level of the first mixed packet does not reach a signal level corresponding to incident light intensity although noise components such as smear in the second mixed packet is increased depending on incident light intensity, so that a signal level of the second mixed packet is relatively increased. Therefore, if the noise reduction processing is performed in the above situation, signals are extremely reduced, thereby resulting in image quality deterioration.

Therefore, the noise reduction processing is performed only when characteristics of output of the first mixed packet are kept in linearity, so that the noise reduction processing is achieved without image quality deterioration due to the extreme reduction or the like.

Note that a plurality of light-receiving elements may include optical black pixels, and that the image processing unit 33 may perform pre-processing prior to the noise reduction processing so that the solid-state imaging apparatus can subtract a signal level of the optical black pixels from the second mixed packet. As the pre-processing, a signal level of optical black pixels is subtracted from the second mixed packet, it is possible to further improve accuracy of the noise reduction processing.

Second Embodiment

The following describes a solid-state imaging apparatus according to the second embodiment. In the solid-state imaging apparatus according to the second embodiment, relativity between a column of the first mixed packet and a column of the second mixed packet is improved, so that a ratio of noise components in the first mixed packet to noise components in the second mixed packet becomes integral multiple, thereby improving accuracy of the noise reduction processing. At the same time, the following describes the solid-state imaging apparatus according to the second embodiment which can reduce noise appearing as vertical lines due to transfer deterioration of the vertical transfer unit. The transfer deterioration occurs when transfer channels in the vertical transfer units or readout gates from the light-receiving elements have defective.

Block diagrams showing a structure of the solid-state imaging apparatus according to the second embodiment and a structure of electrodes of the solid-state imaging apparatus may be the same as the FIGS. 2 and 3 for the first embodiment. Hereinafter, the same aspects as the first embodiment are not explained again in the second embodiment, and difference between the first and second embodiments is mainly described.

FIGS. 8A to 8L are diagrams showing, as one example, how signal packets and dummy packets are transferred and mixed in the packets-mixing mode.

Figure 8C:
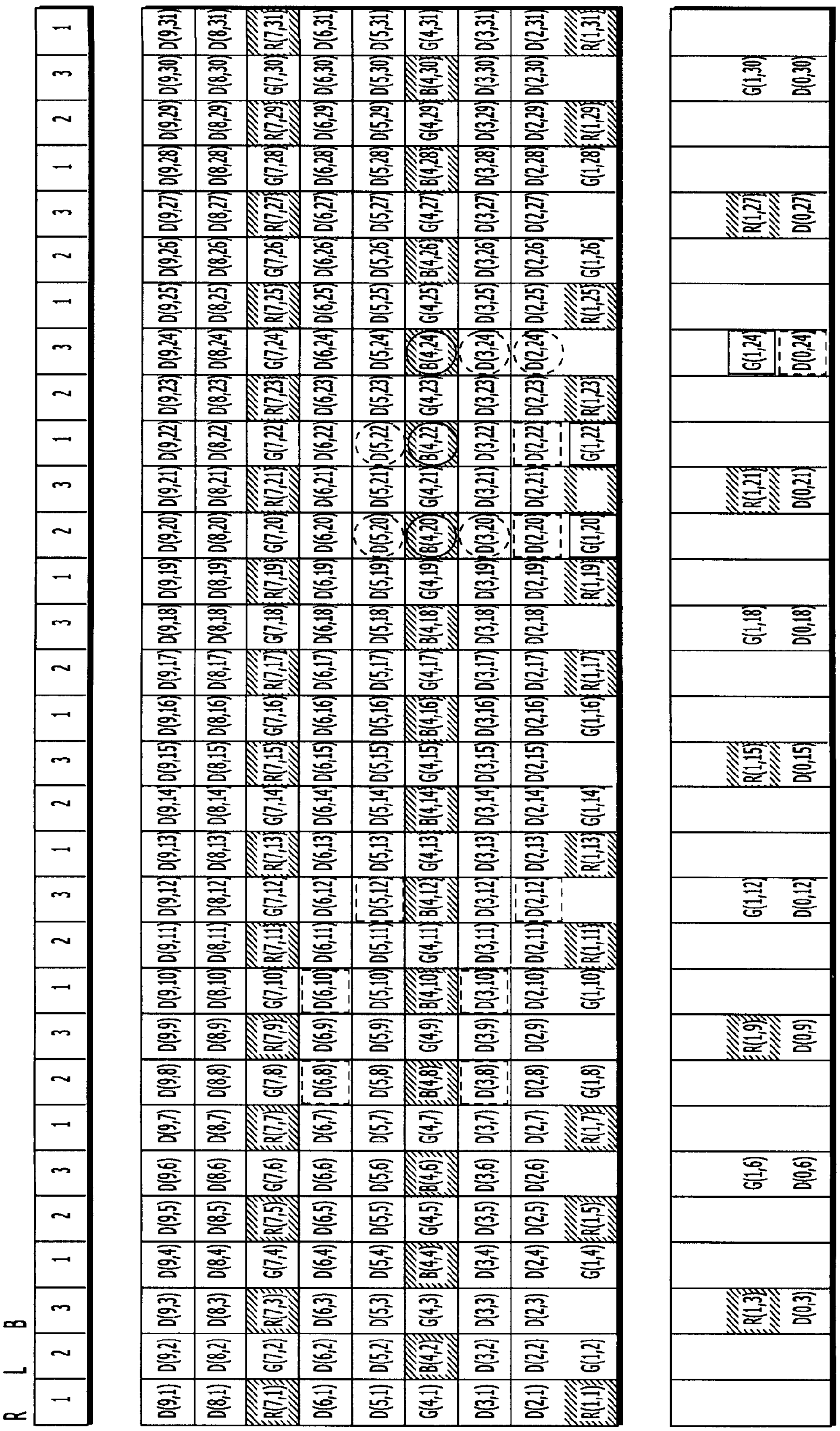

In FIG. 8A, like FIG. 5A, 123123 . . . in a top section represent RLBRLB . . . columns of the vertical transfer units, respectively. Note that FIGS. 8B to 8L show the coordinates of the original transfer packets of FIG. 8A.

Figure 8D:
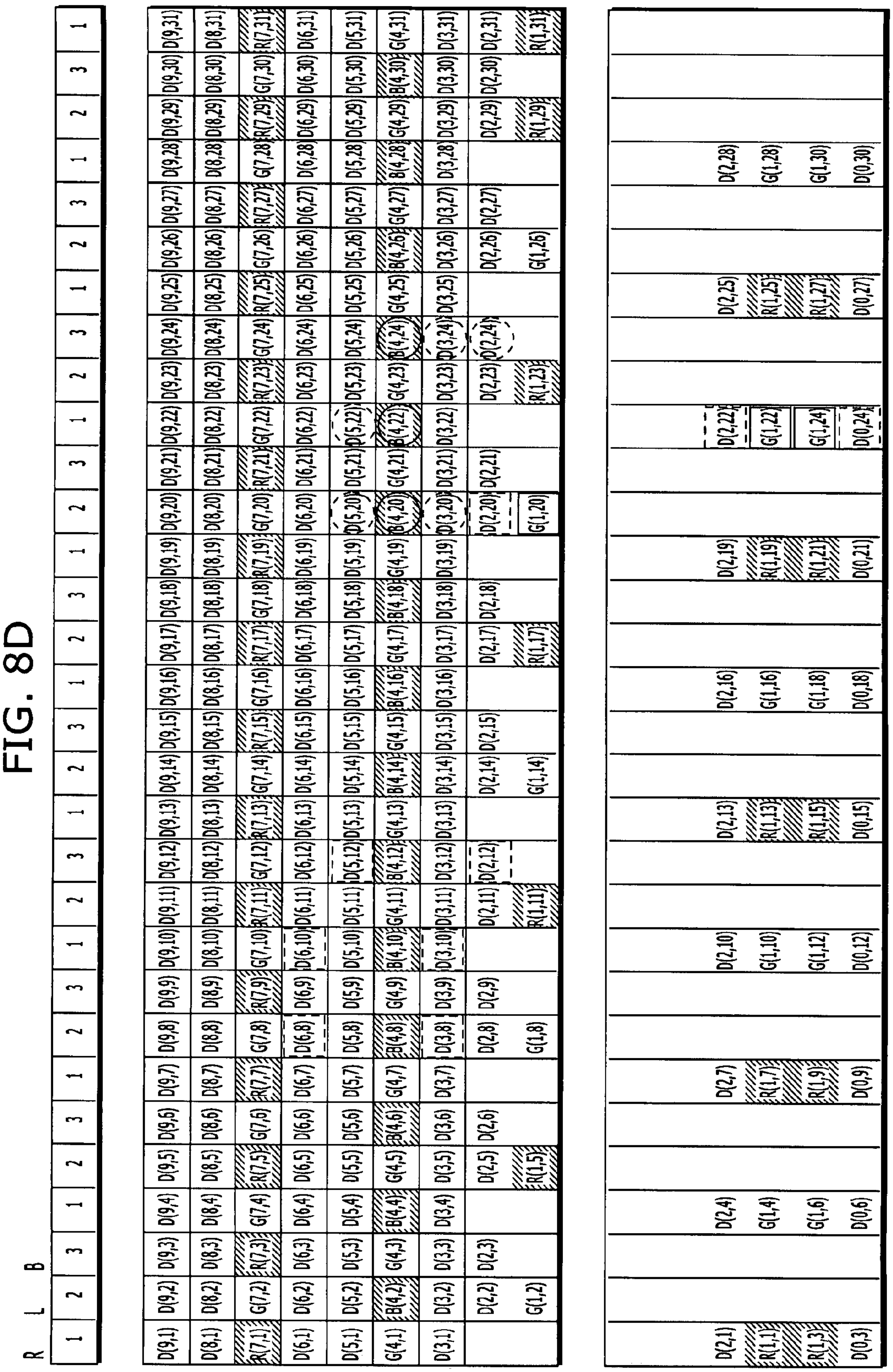
Figure 8E:
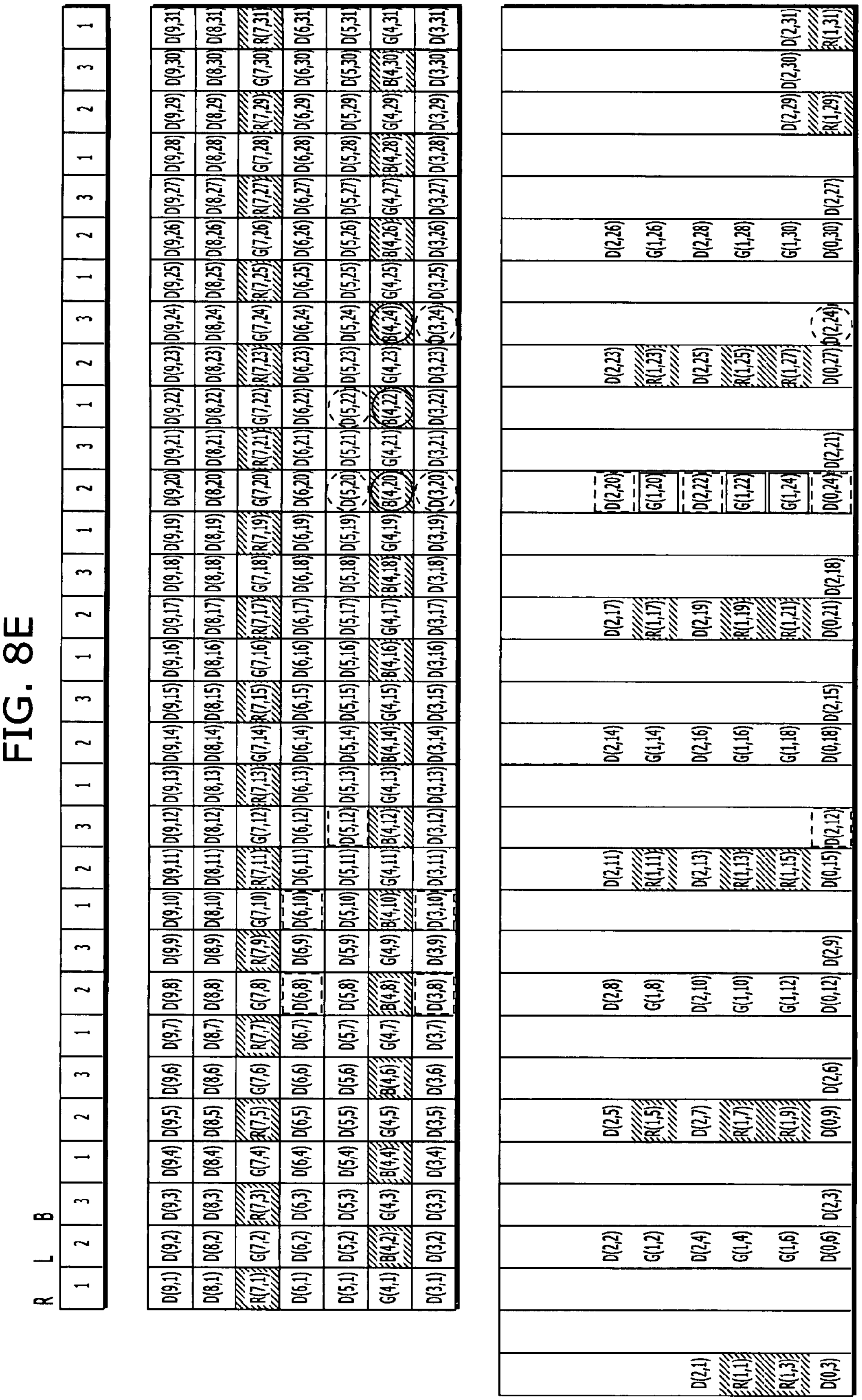
Figure 8F:
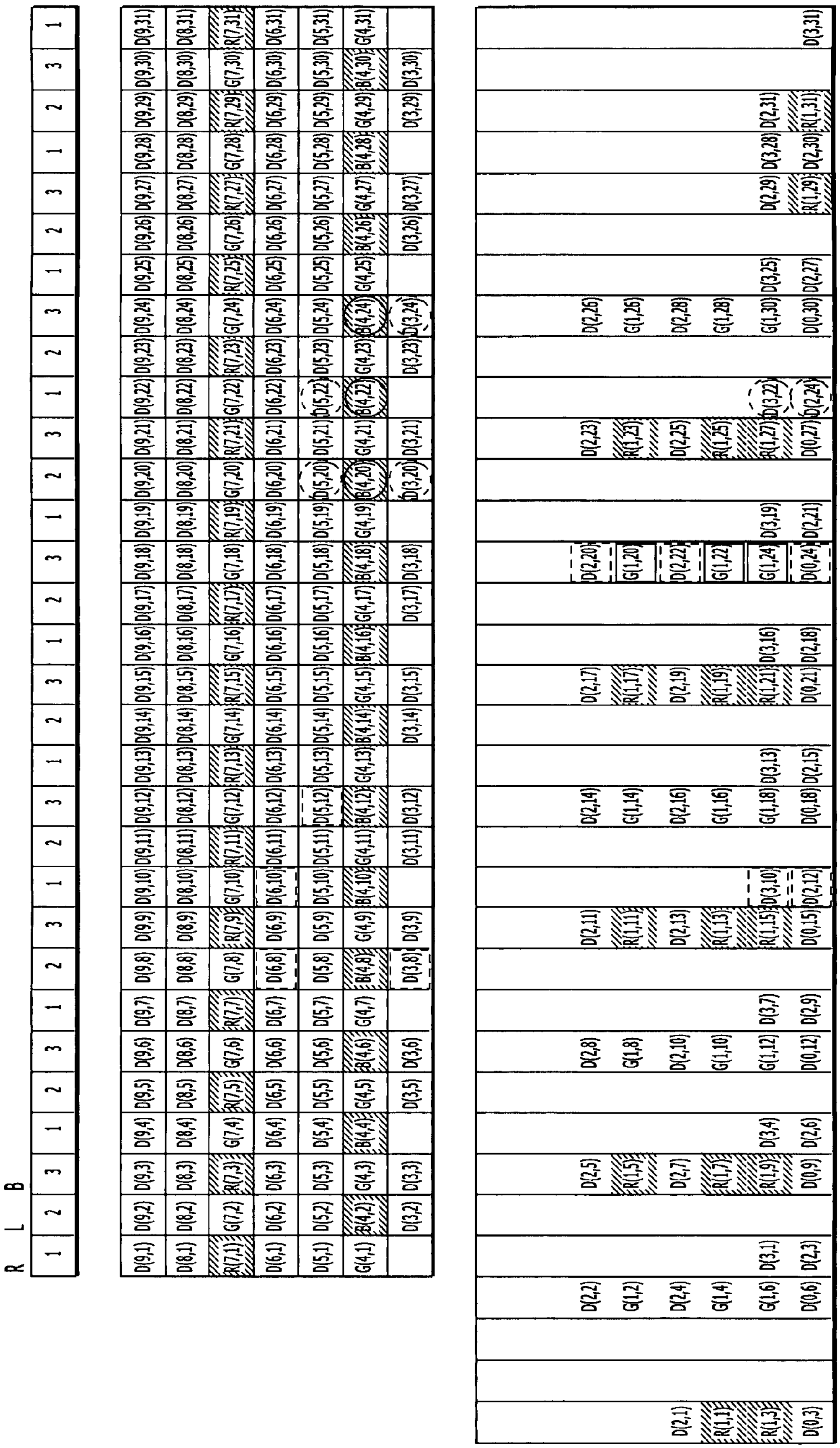
Figure 8G:
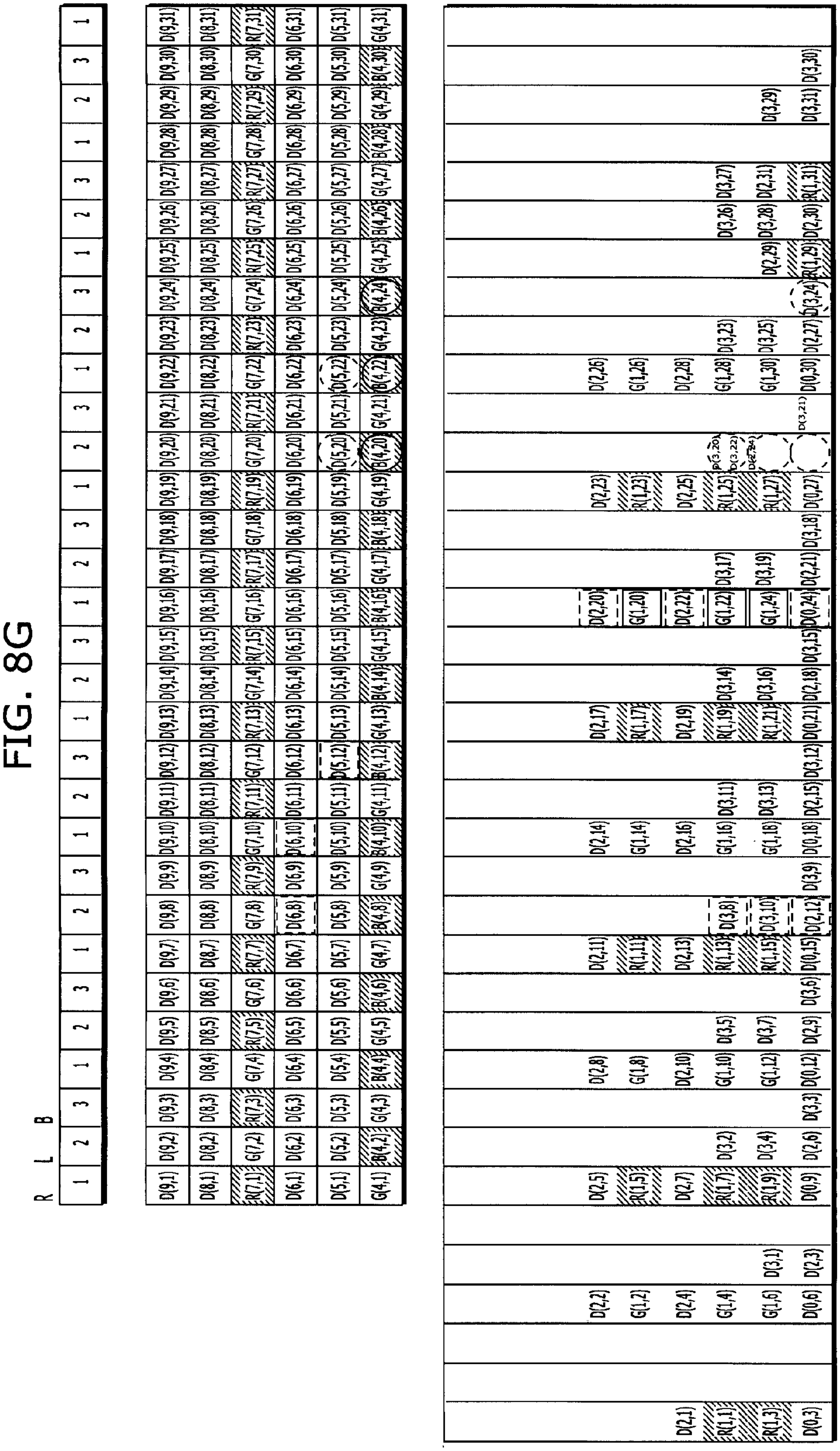
Figure 8H:
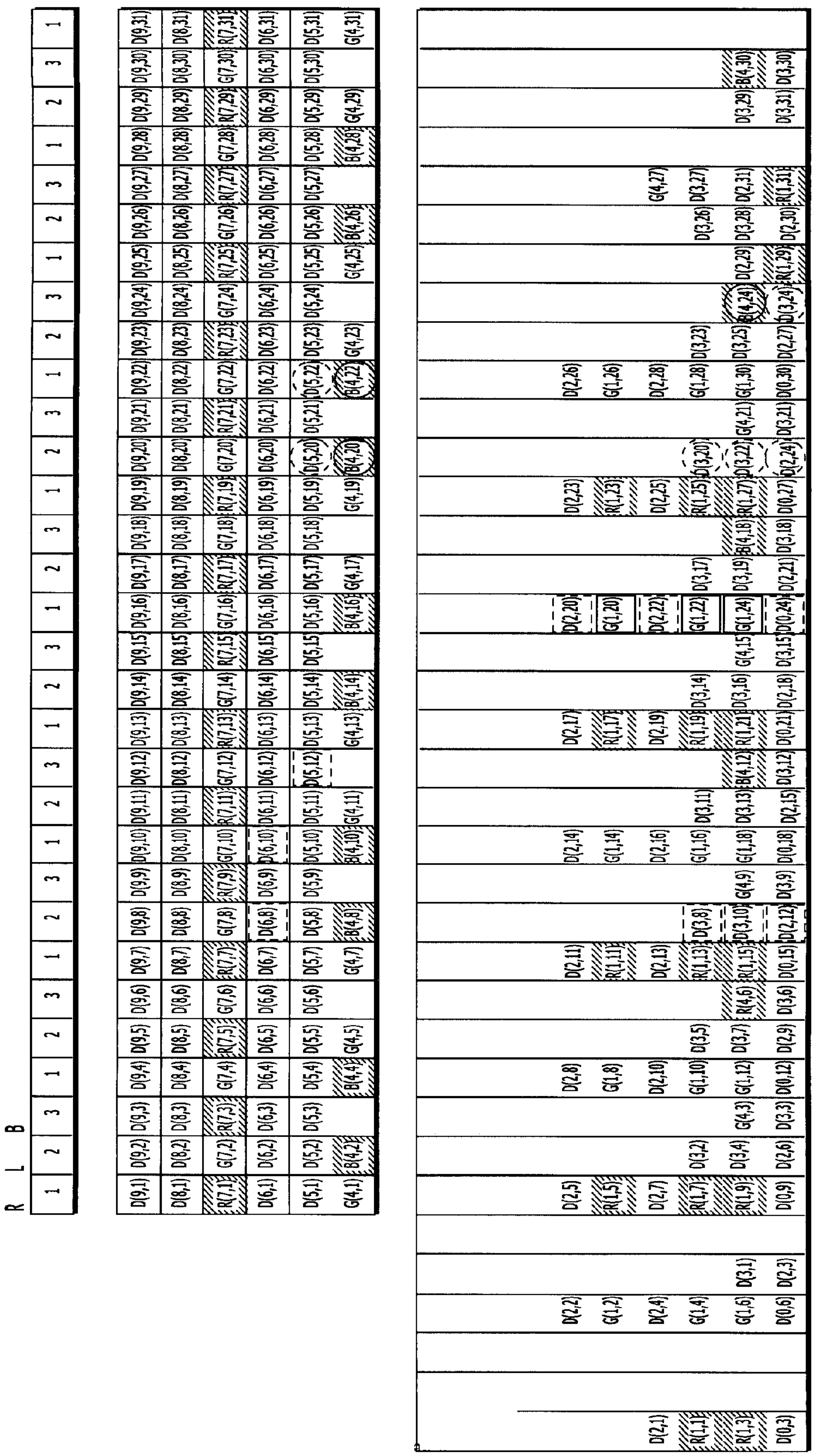
Figure 8I:
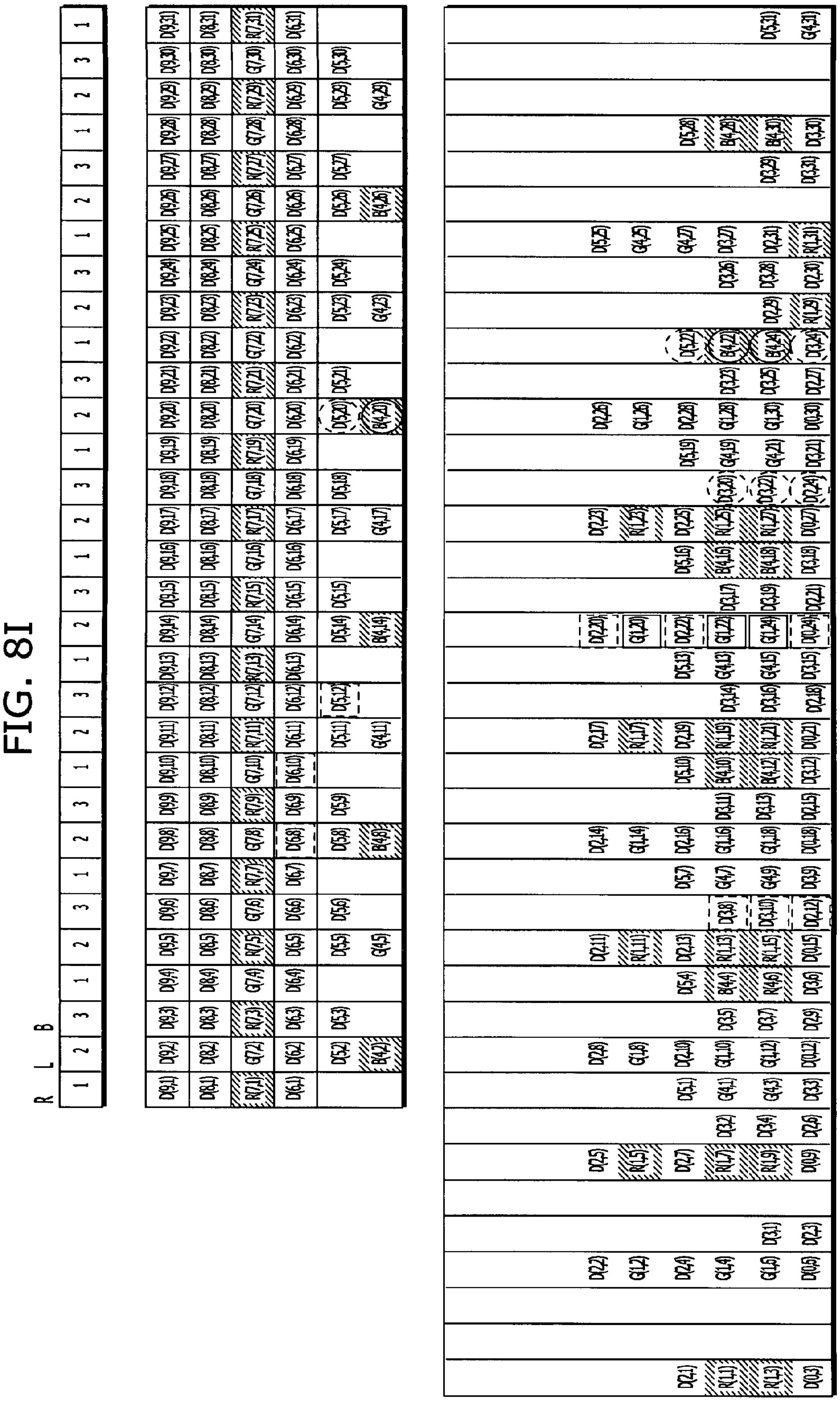
Figure 8J:
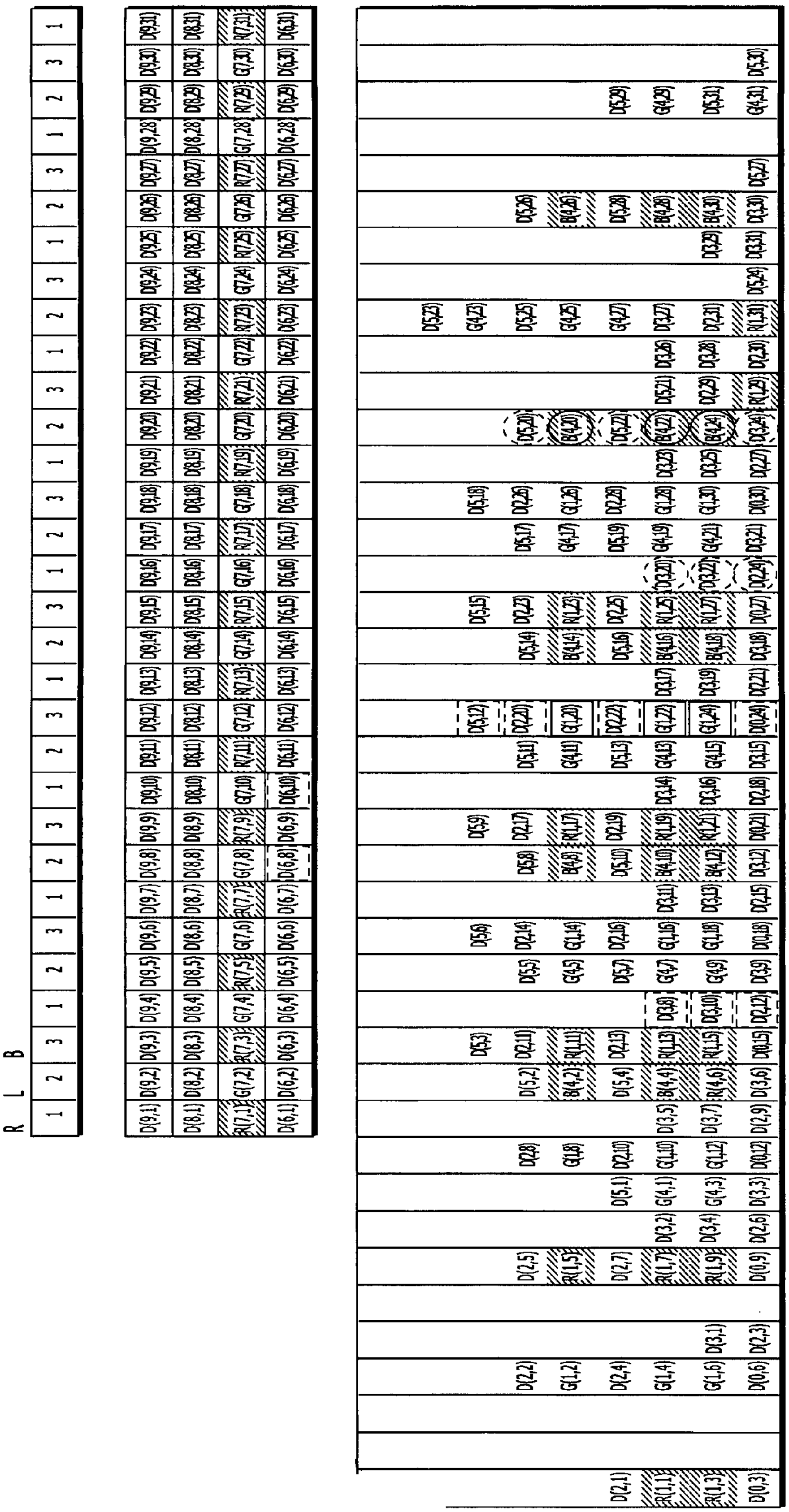
Figure 8K:
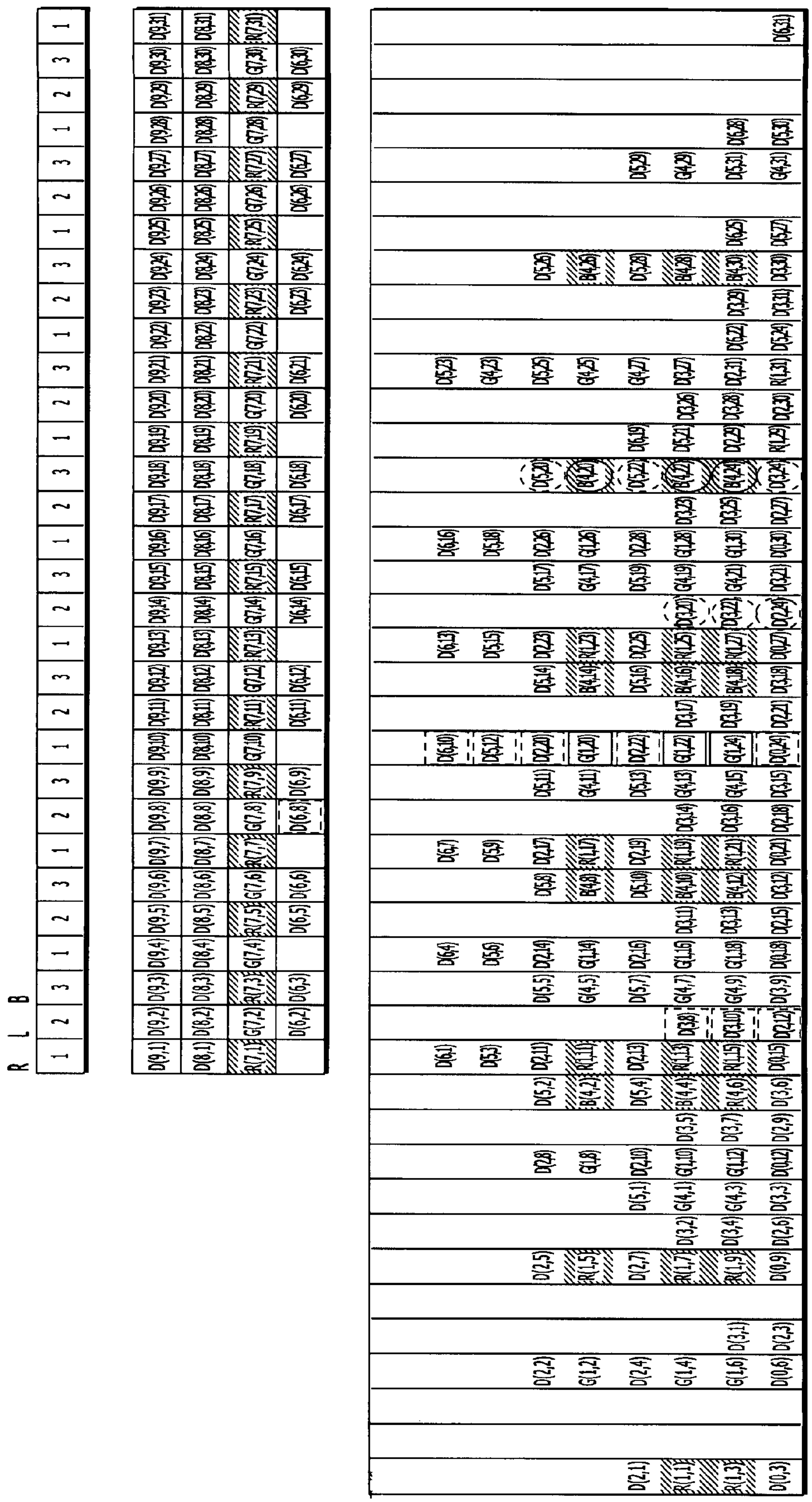
Figure 8L:
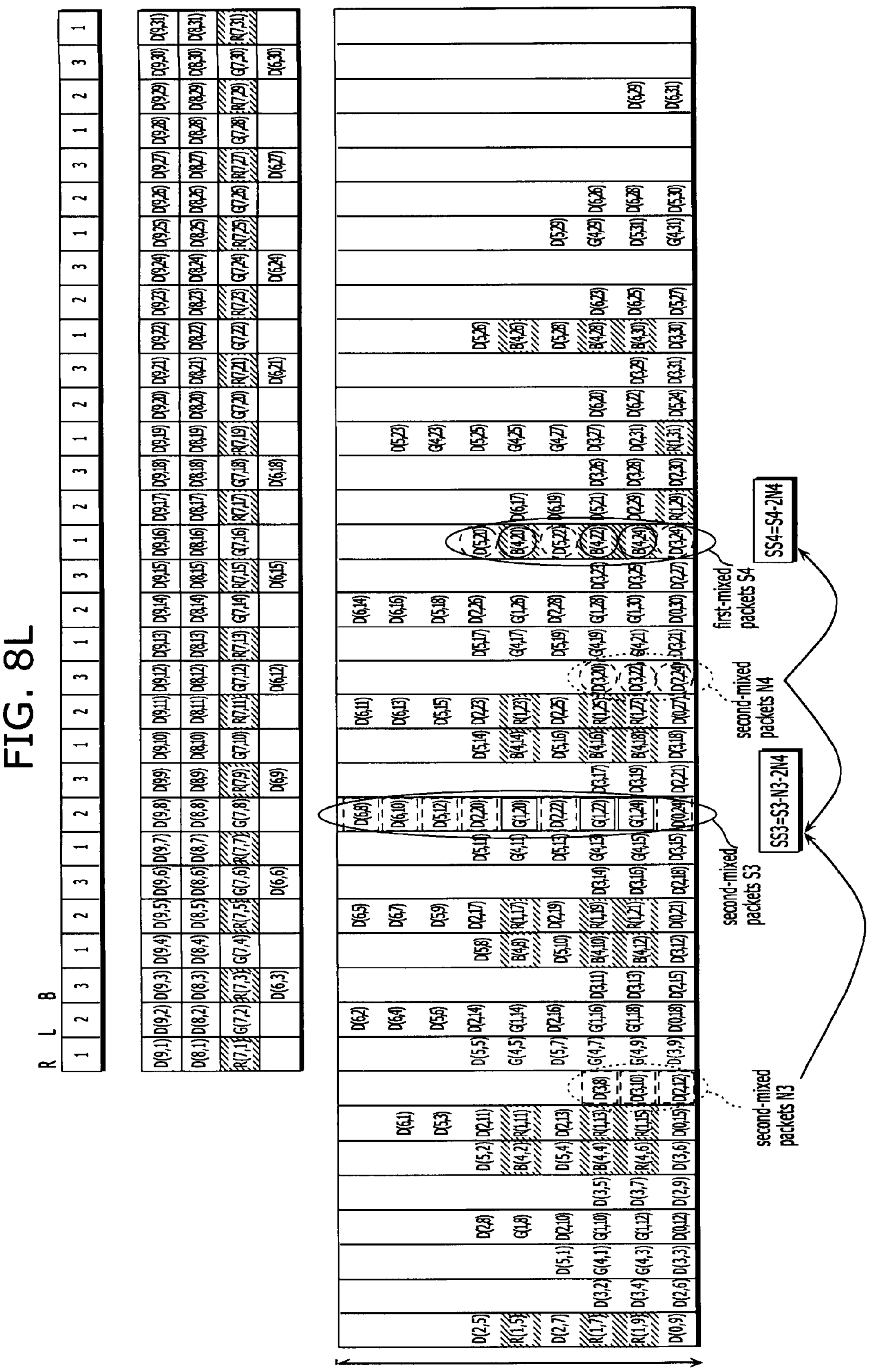

FIG. 8L shows a result of the processing starting from FIG. 8A, where the first mixed packets and the second mixed packets are generated in the horizontal transfer unit 14, by combining the vertical mixing and the horizontal mixing. FIGS. 8B to 8K show mid-steps in the processing. In the figures, solid-line circles and solid-line rectangles show signal packets, and dashed-line circles and dashed-line rectangles show dummy packets.

A first mixed packet S4 in FIG. 8L is one example of the first mixed packets of the first type in the horizontal transfer unit 14. A first mixed packet S3 is one example of the first mixed packets of the second type in the horizontal transfer unit 14. Furthermore, second mixed packets N3 and N4 in FIG. 8L are examples of the second mixed packets in the horizontal transfer unit 14.

Noise in the first mixed packet S4 is almost cancelled according to the following equation 3.

$$SS4=S4-2N4 \qquad \text{(equation 3)}$$

Noise in the first mixed packet S3 is almost cancelled according to the following equation 4.

$$SS3=S3-N3-2N4 \qquad \text{(equation 4)}$$

In this noise reduction processing, relativity between a column of the first mixed packet and a column of the second mixed packet is improved, so that noise components in the first mixed packet become just integral multiple of noise components in the second mixed packet. Thereby, accuracy of the noise reduction processing is improved.

Moreover, the 1st and 2nd columns always have backup of dummy packets. In other words, each signal packet has one dummy packet belonging to the same column. Therefore, vertical line noise rarely occurs in the 1st and 2nd columns. More specifically, regarding the first and second mixed packets in the 1st and 2nd columns, the noise reduction processing can almost prevent vertical line noise which occurs when transfer channels in the vertical transfer units or readout gates from the light-receiving elements have defective.

Figure 9:
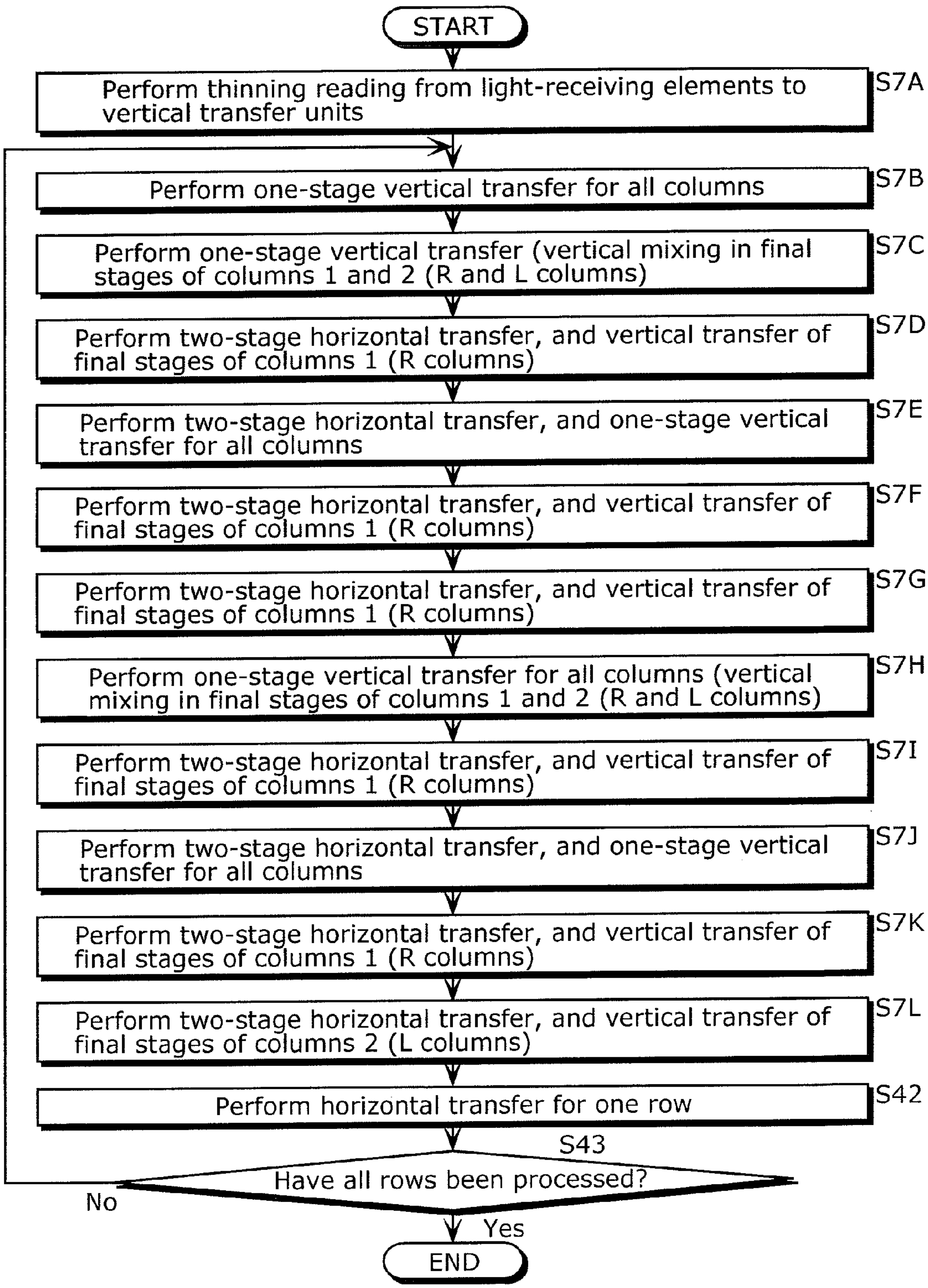
FIG. 9 is a flowchart of driving the pixel mixing according to the second embodiment.

FIG. 9 is a flowchart performed by the timing generation circuit 20 for driving transfer processing of FIGS. 8A to 8L. Steps S7A to S7L correspond to FIGS. 8A to 8L, respectively.

At Step 7A of FIG. 9, the timing generation circuit 20 drives vertical transfer units 13 to perform thinning reading from the light-receiving elements 12 to the vertical transfer units 13. FIG. 8A is a result of the below-described series of processing performed by the timing generation circuit 20, completing horizontal transfer driving for one row. Immediately after readout from the light-receiving elements to the vertical transfer unit 13, in other words, at an initial state, dummy packets exist in the same row and columns except (0, 3) and (0, 6), but this is only for the initial state. Therefore, the above situation is considered as an initial stage of the repeating processing, as shown in FIG. 8A. In FIG. 8A, all stages of the horizontal transfer unit 14 are still empty. Dummy packets such as D(0, 3) and D (0, 6) corresponding to the 0th row are dummy signals which are remained after a previous series of vertical transfer driving.

At step S7B, the timing generation circuit 20 drives the vertical transfer units 13 to perform one-stage vertical transfer for all columns. The result is shown in FIG. 8B.

At step S7C, the timing generation circuit 20 drives the vertical transfer unit 13 to perform one-stage vertical transfer, including vertical mixing in the final stages of the 1st and 2nd columns (R and L columns). The result is shown in FIG. 8C.

At step S7D, the timing generation circuit 20 drives the horizontal transfer unit 14 to perform two-stage horizontal transfer, and then drives the vertical transfer unit 13 to vertically transfer packets in final stages of the 1st columns (R columns). The result is shown in FIG. 8D.

At step S7E, the timing generation circuit 20 drives the horizontal transfer unit 14 to perform two-stage horizontal transfer, and then drives the vertical transfer unit 13 to perform one-stage vertical transfer for all columns. The result is shown in FIG. 8E. Here, packets in the 2nd (L) and 3rd (B) columns are transferred at the same time.

At step S7F, the timing generation circuit 20 drives the horizontal transfer unit 14 to perform two-stage horizontal transfer, and then drives the vertical transfer unit 13 to vertically transfer packets in final stages of the 1st columns (R columns). The result is shown in FIG. 8F.

At step S7G, the timing generation circuit 20 drives the horizontal transfer unit 14 to perform two-stage horizontal transfer, and then drives the vertical transfer unit 13 to perform one-stage vertical transfer for all columns. The result is shown in FIG. 8G. Here, packets in the 2nd (L) and 3rd (B) columns are transferred at the same time.

At step S7H, the timing generation circuit 20 drives the vertical transfer unit 13 to perform one-stage vertical transfer, including vertical mixing in the final stages of the 1st and 2nd columns (R and L columns). The result is shown in FIG. 8H.

At step S7I, the timing generation circuit 20 drives the horizontal transfer unit 14 to perform two-stage horizontal transfer, and then drives the vertical transfer unit 13 to vertically transfer packets in final stages of the 1st columns (R columns). The result is shown in FIG. 8I.

At step S7J, the timing generation circuit 20 drives the horizontal transfer unit 14 to perform two-stage horizontal transfer, and then drives the vertical transfer unit 13 to perform one-stage vertical transfer for all columns. The result is shown in FIG. 8J. Here, packets in the 2nd (L) and 3rd (B) columns are transferred at the same time.

At step S7K, the timing generation circuit 20 drives the horizontal transfer unit 14 to perform two-stage horizontal transfer, and then drives the vertical transfer unit 13 to vertically transfer packets in final stages of the 1st columns (R columns). The result is shown in FIG. 8K.

At step S7L, the timing generation circuit 20 drives the horizontal transfer unit 14 to perform two-stage horizontal transfer, and then drives the vertical transfer unit 13 to vertically transfer packets in final stages of the 2nd columns (L columns). The result is shown in FIG. 8L. Here, dummy packets such as D(6, 3) and D(6, 6) in the 3rd columns (B columns) are not transferred to the horizontal transfer unit but still held in the vertical transfer units. These dummy packets will be transferred to the horizontal transfer unit in a next series of vertical transfer. Therefore, in the second embodiment, in a series of the vertical transfer driving, the 1st columns (R columns) and 2nd (L columns) transfer signal packets in a vertical direction and then transfer dummy packets of two rows, but the 3rd columns (B columns) firstly transfer dummy packets vertically and then transfer signal packets and then dummy packets vertically.

Then, at Step S42, the timing generation circuit 20 drives the horizontal transfer unit 14 to sequentially transfer for one row. At step S43, it is determined whether or not there is any signal packet in the vertical transfer unit 13 which has not yet been transferred. If the determination is made that there is no such a signal packet (Yes at S43), then the processing is complete. On the other hand, if there is any such a signal packet (No at S43), then the processing returns to step S7B to repeat the above-explained processing.

Note that Step S3B may be driven in the same manner as Step S3C, thereby simplifying kinds of driving setting, so that a structure of the driving unit is simplified and that the setting becomes easy.

Note also that, in the second embodiment, at Steps S7E, S7G, S7J, packets of two rows are simultaneously transferred to reduce the number the Steps. Thereby, it is possible to increase a frame rate. As above, an order of vertically transferring the signal packets and the dummy packets is different depending on the columns, which makes it possible to reduce the number of Steps.

During a horizontal transfer period for one row at Step S42, the image processing unit 33 performs the noise reduction processing.

Figure 10:
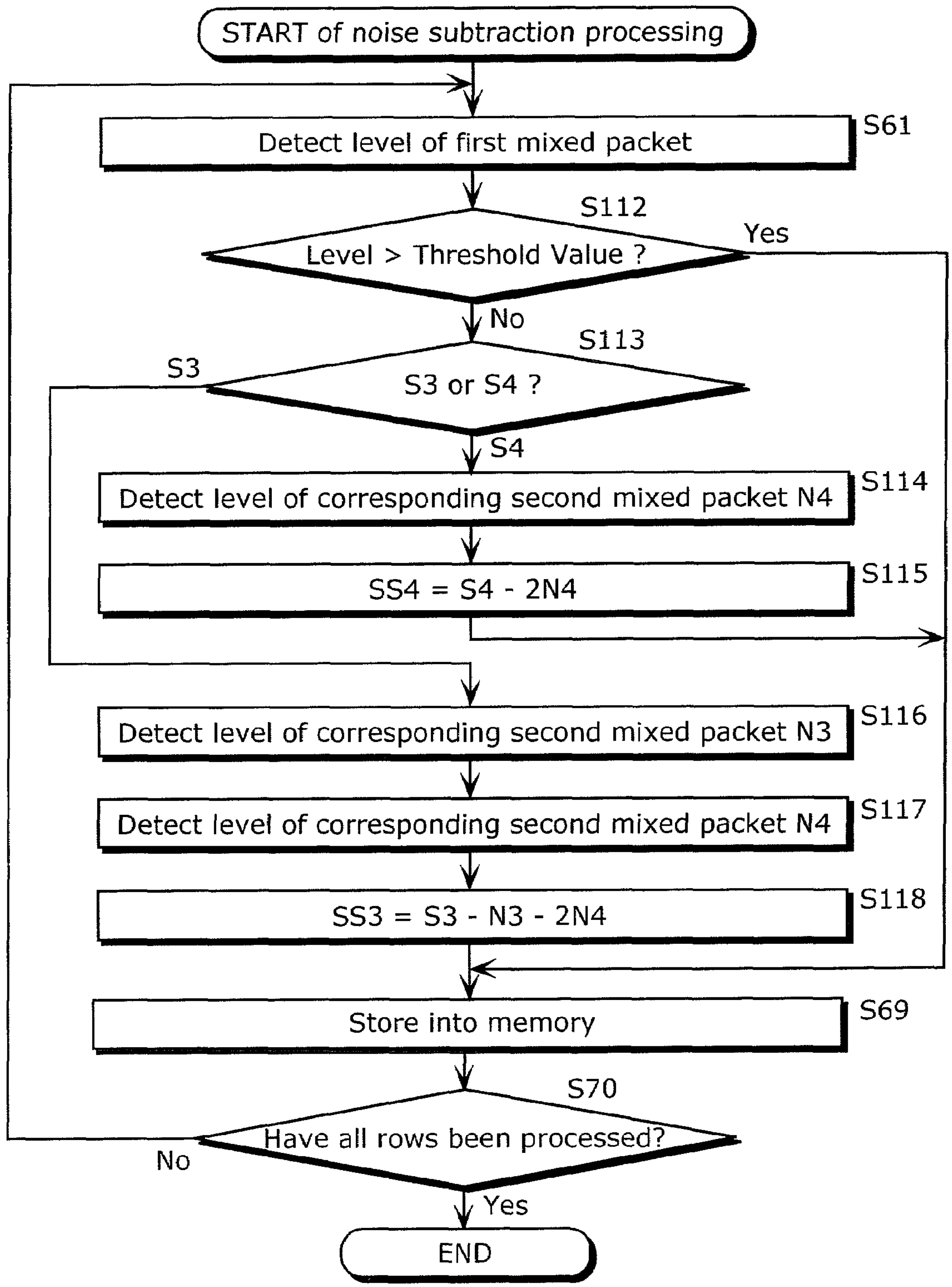
FIG. 10 is a flowchart of noise reduction processing according to the second embodiment.

FIG. 10 is a flowchart of noise reduction processing performed by the image processing unit 33. The noise reduction processing is performed for each of the first mixed packets which are outputted by the sequential transfer for one row at Step S42 of FIG. 9. Processing of FIG. 10 is the almost same as the processing of FIG. 7, but the processing of FIG. 10 mainly differs form the processing of FIG. 7 in that the calculation of Steps S65 and S68 are replaced to calculation of Steps S115 and S118. Hereinafter, the same steps are not explained again, but the difference is mainly described.

At Step S115, the image processing 33 almost cancels noise components from the first mixed packet according to the equation 3.

$$SS4=S4-2N4 \quad \text{(equation 3)}$$

In addition, at Step S118, the image processing 33 almost cancels noise components from the first mixed packet according to the equation 4.

$$SS3=S3-N3-2N4 \quad \text{(equation 4)}$$

In the noise reduction processing, noise components in the first mixed packet become just integral multiple of noise components in the second mixed packet, which makes it possible to improve accuracy of the noise reduction processing.

As described above, in the solid-state imaging apparatus according to the second embodiment, relativity between a column of the first mixed packet and a column of the second mixed packet is improved, so that noise components in the first mixed packet become just integral multiple of noise components in the second mixed packet. Thereby, it is possible to improve accuracy of the noise reduction.

Furthermore, in the 1st and 2nd columns, each signal packet has one dummy packet belonging to the same column. Therefore, regarding the first and second mixed packets in the 1st and 2nd columns, the noise reduction processing can significantly reduce the vertical line noise which occurs when transfer channels in the vertical transfer units or readout gates from the light-receiving elements have defective.

Third Embodiment

The solid-state imaging apparatus according to the third embodiment has holding units in final stages of the vertical transfer units in M columns, as well as N columns, in each of the column group. Each of the holding units can mix, hold, and vertically transfer charges of signal packets and dummy packets, without depending on vertical transfer from upstream in the same column. In short, vertical final stages of all columns have respective electrode structure which can perform transfer independently. Therefore, since vertical mixing become possible in vertical final stages of all columns, flexibility of transfer driven by the driving unit (timing generation circuit 20) is increased. Thereby, it is possible to match the dummy packets in the second mixed packet with a column of the signal packets in the first mixed packet. As a result, it is possible to improve accuracy in the noise reduction.

In the third embodiment, the timing generation circuit 20 drive to transfer signal packets and dummy packets alternately from vertical final stage to a part of stages of the horizontal transfer unit, thereby generating first mixed packet of the first type. Furthermore, the timing generation circuit 20 drives to transfer signal packets and dummy packets alternately, and transfer dummy packets for multiple time, from vertical final stages to another part of stages of the horizontal transfer unit, thereby generating first mixed packet of the second type.

Block diagrams showing a structure of the solid-state imaging apparatus according to the third embodiment may be the same as the FIG. 2 for the first embodiment. Hereinafter, the same aspects as the first embodiment are not explained again in the third embodiment, and difference between the first and third embodiments is mainly described.

Figure 11:
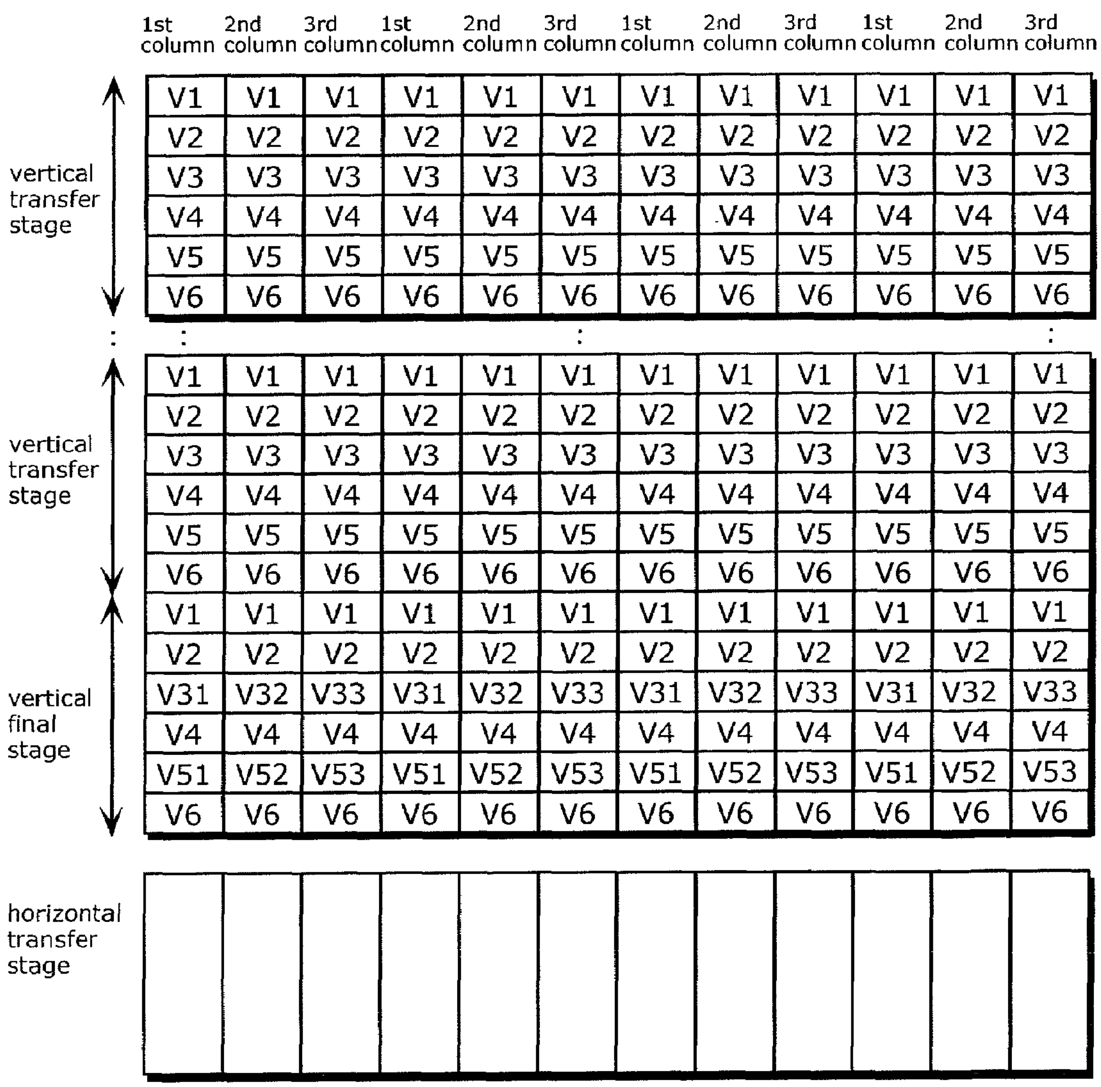
FIG. 11 is a block diagram showing another example of a structure of electrodes in the solid-state imaging apparatus according to the third embodiment.

FIG. 11 is a block diagram showing another example of a structure of electrodes in the solid-state imaging apparatus according to the third embodiment. The structure of FIG. 11 differs from the structure of FIG. 3 in that the electrodes V3 and V5 in a final stage of each of the 3rd columns (B columns) are replaced to electrodes V33 and V35. The electrodes V33 and V35 are provided with transfer signals different from signals provided to the electrodes V3 and V5 in the upstream of the same column. Thereby, the final stage of each of the 3rd columns can mix, hold, and vertically transfer signals of signal packets and dummy packets, without depending on vertical transfer in the upstream of the same column.

Figure 12E:
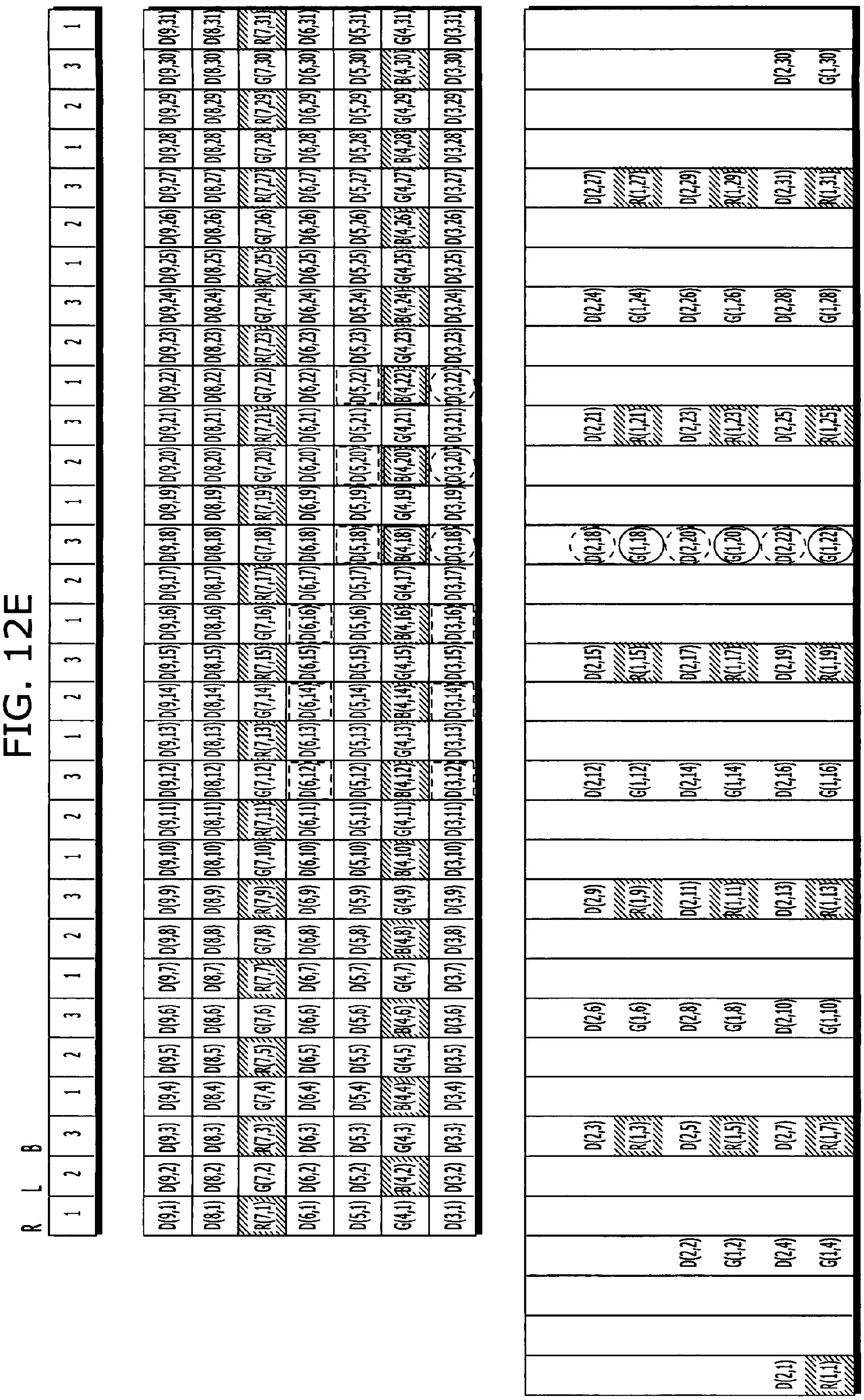
FIGS. 12A to 12O are diagrams for explaining pixel mixing according to the third embodiment.
Figure 12G:
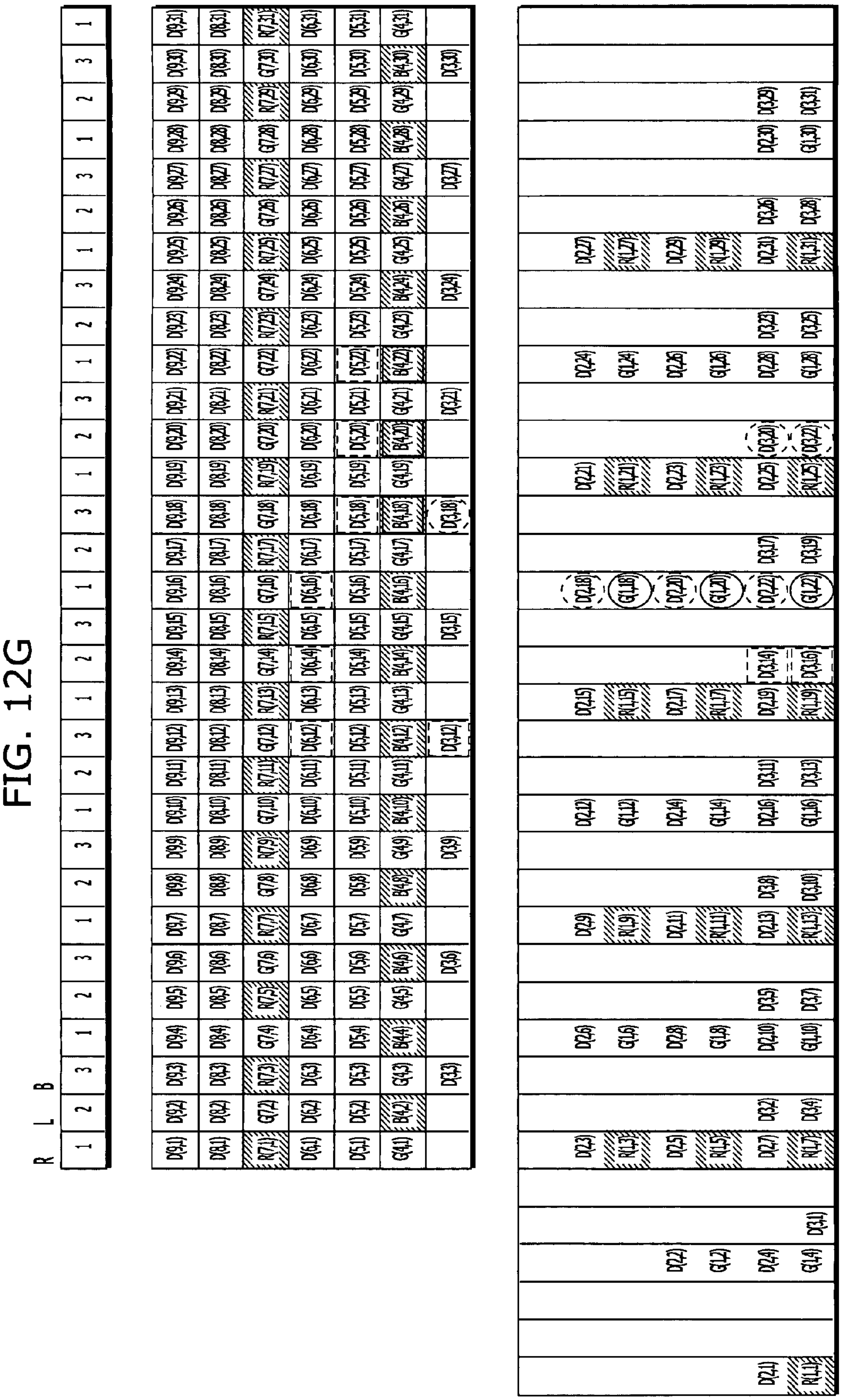
Figure 12H:
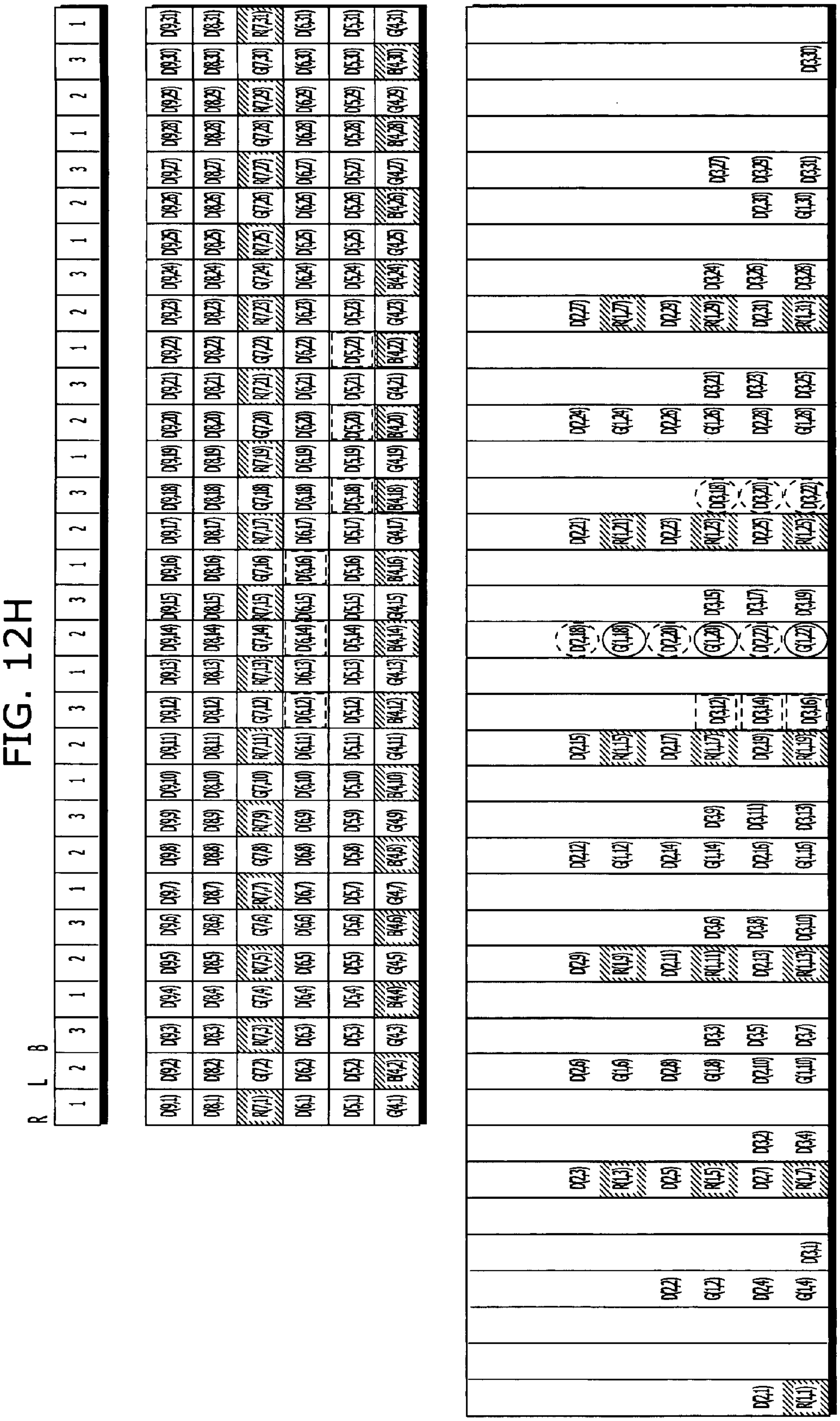
Figure 12I:
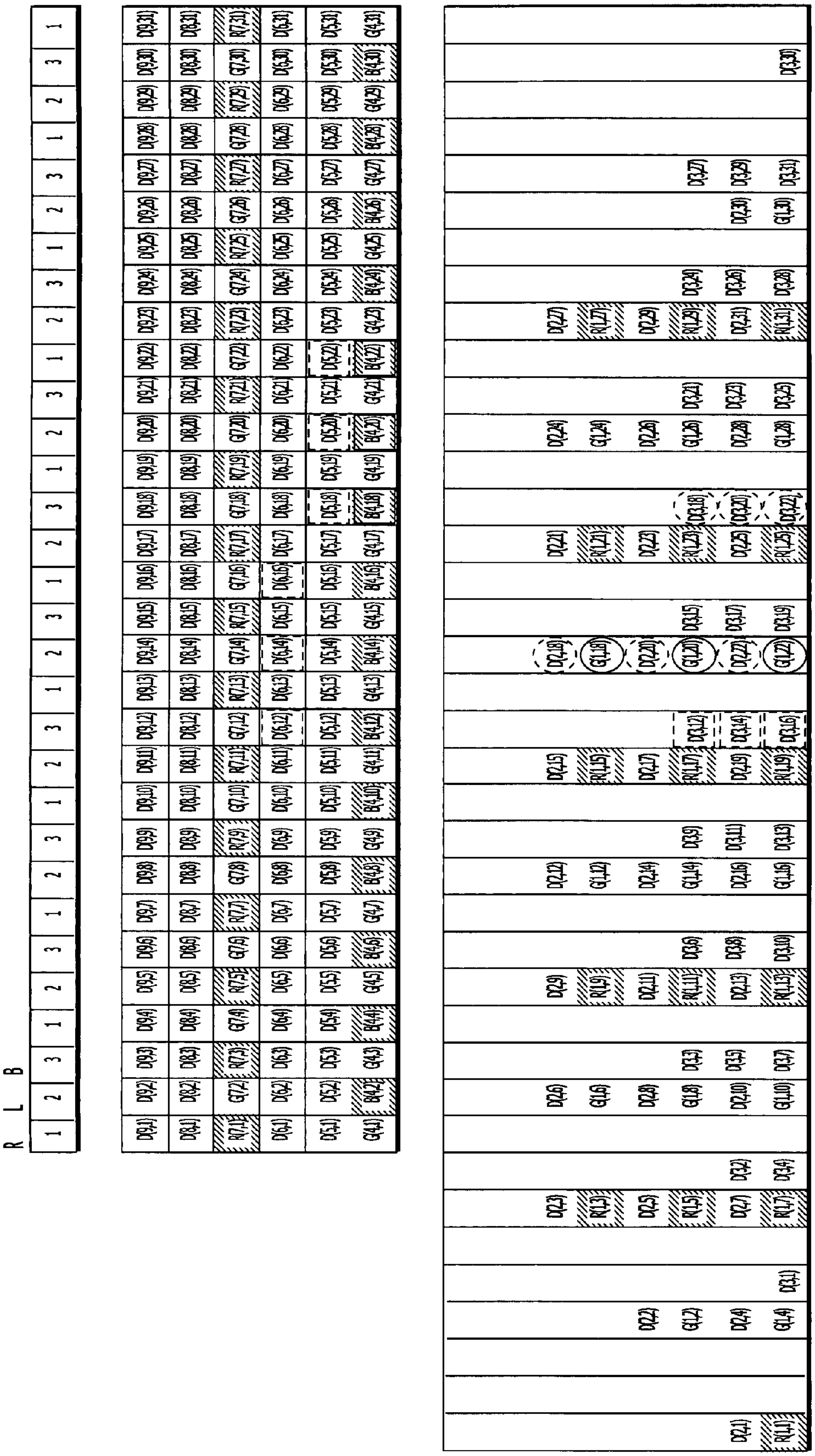
Figure 12J:
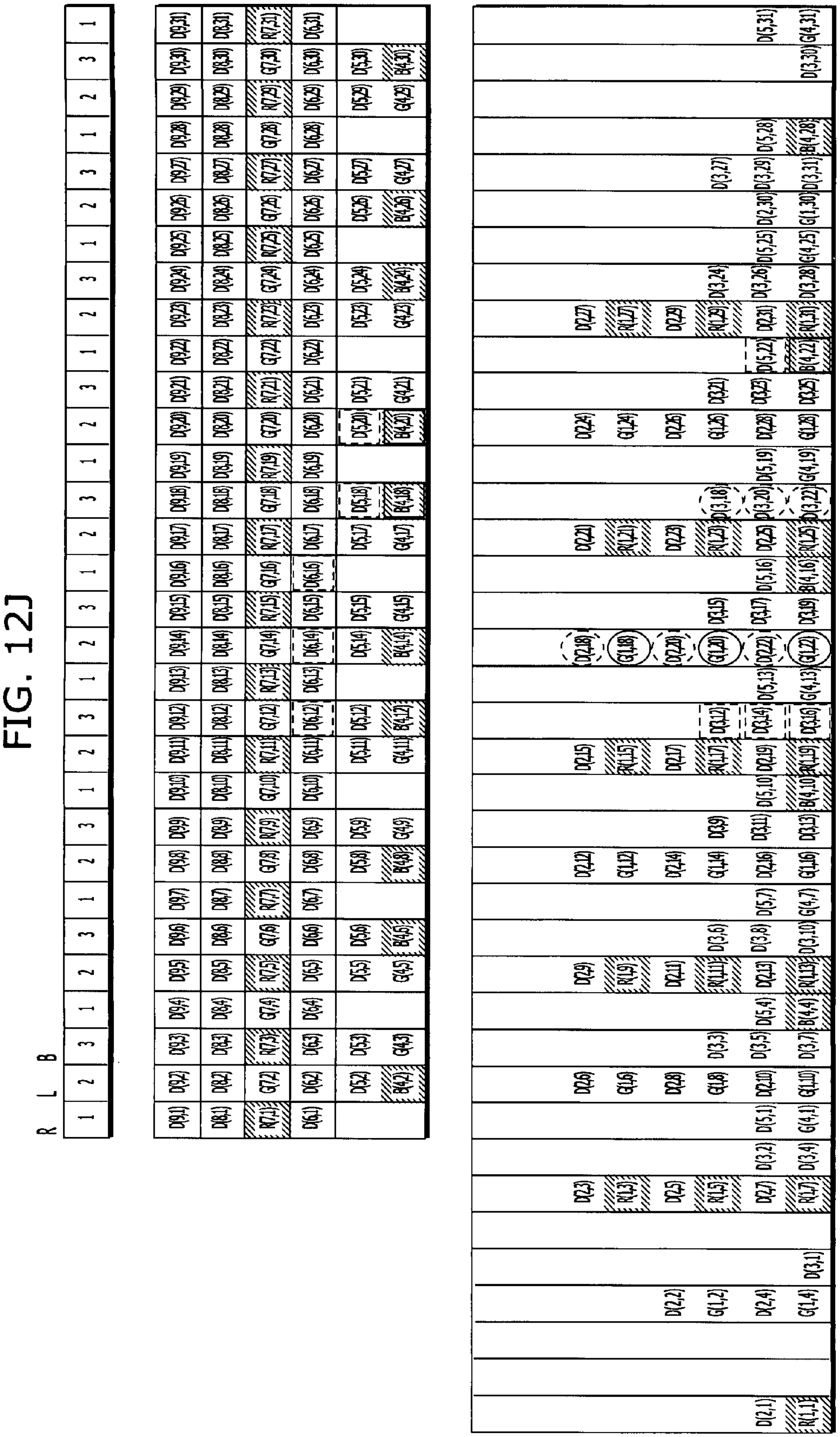
Figure 12K:
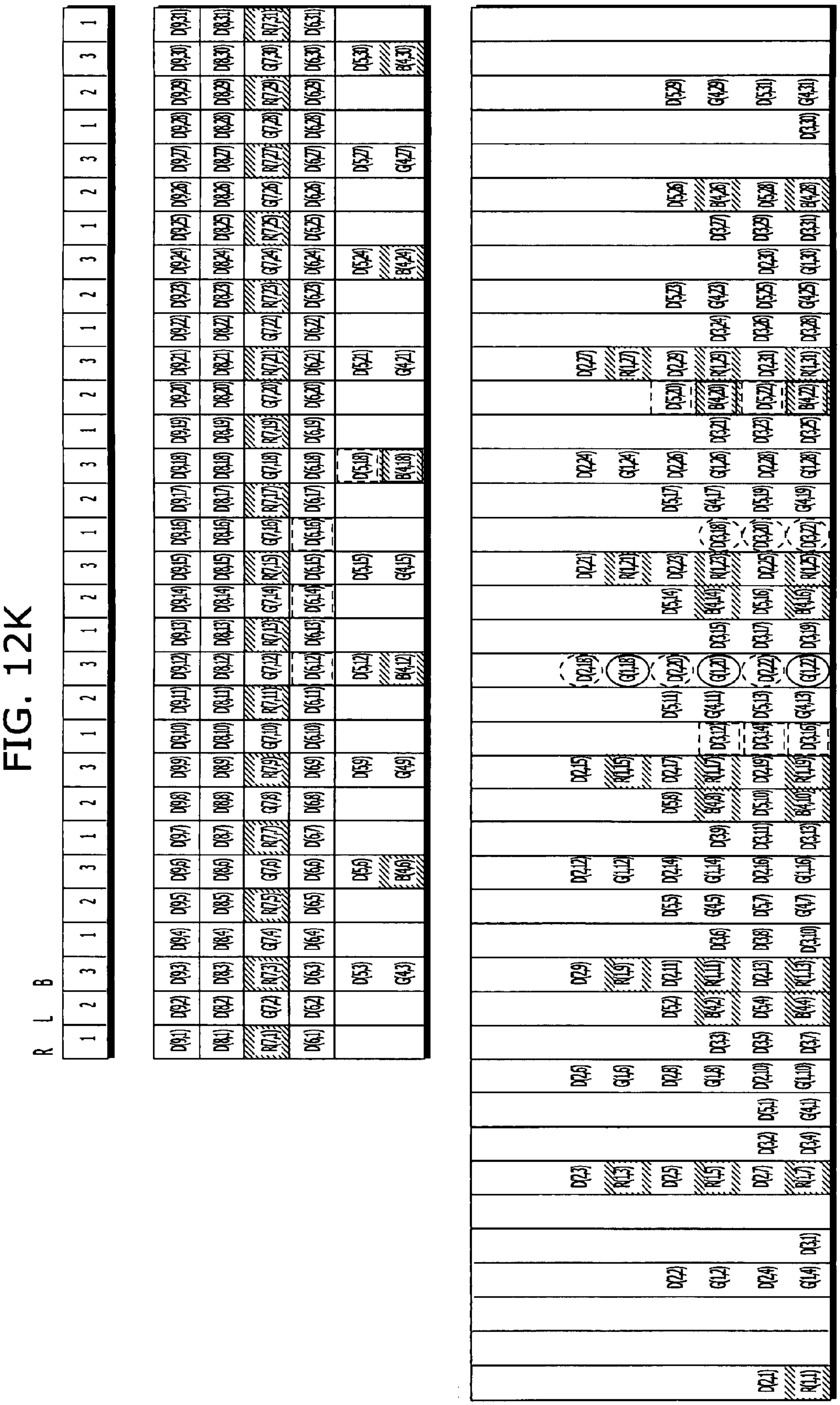
Figure 12L:
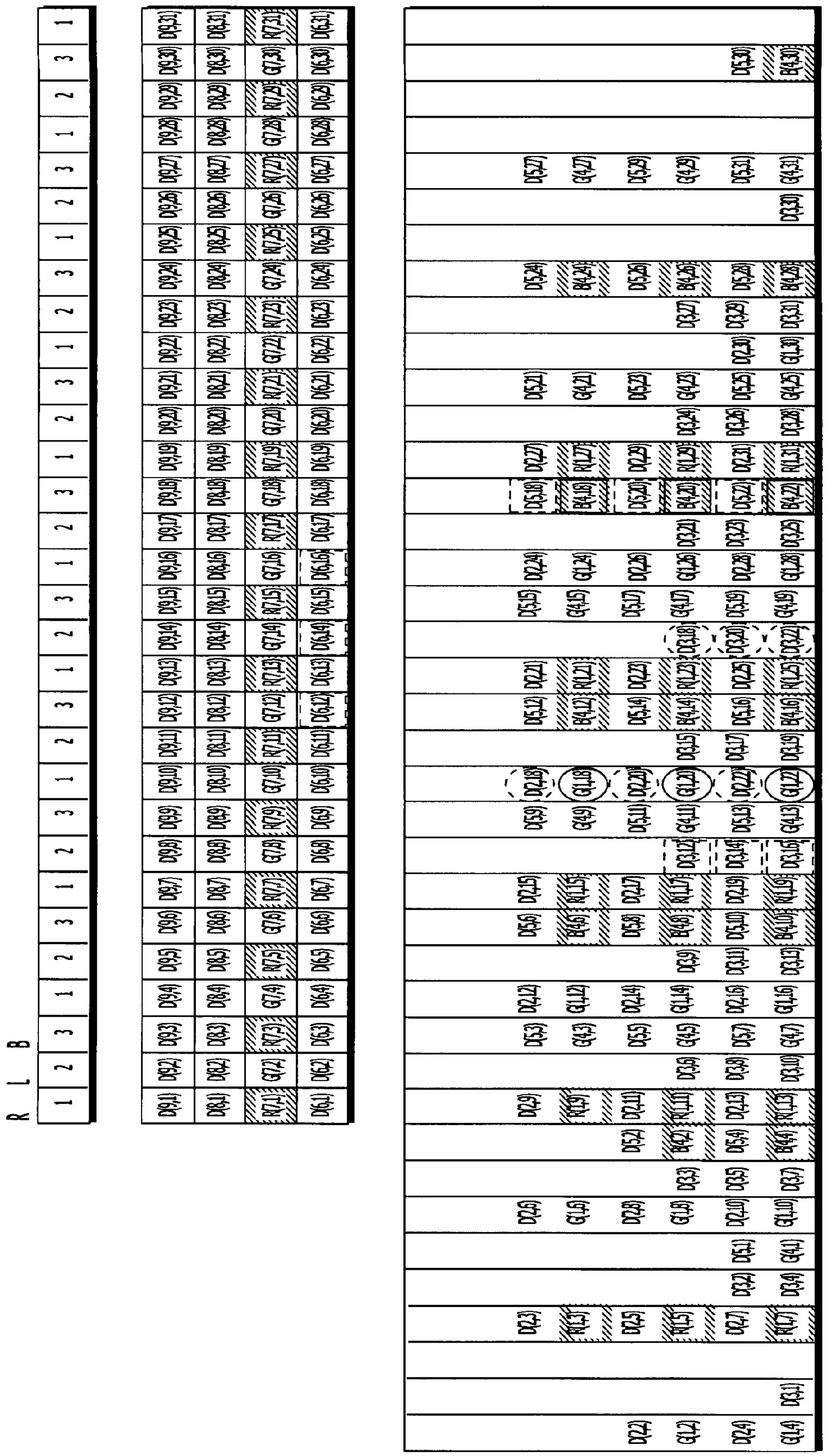
Figure 12M:
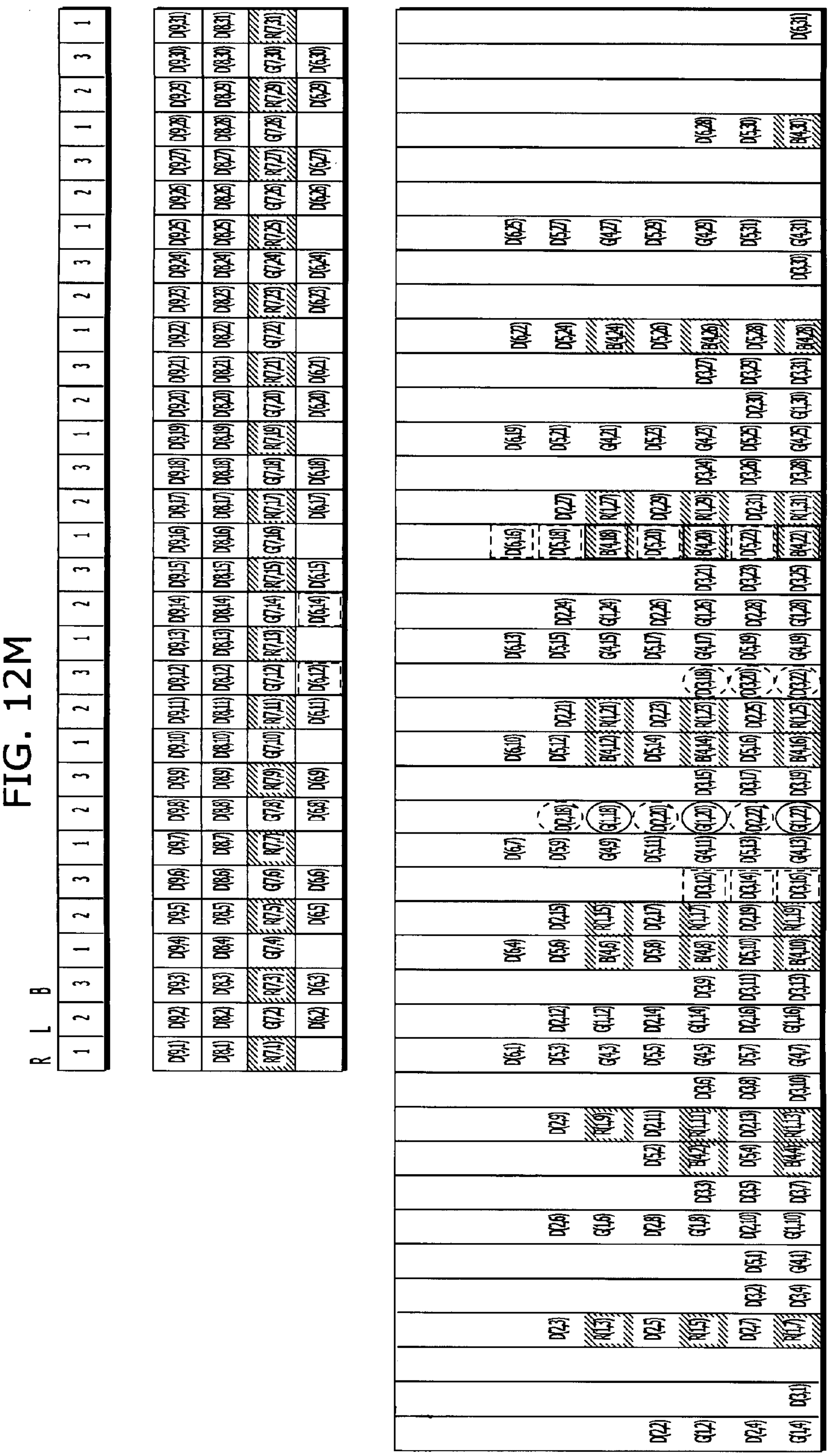
Figure 12N:
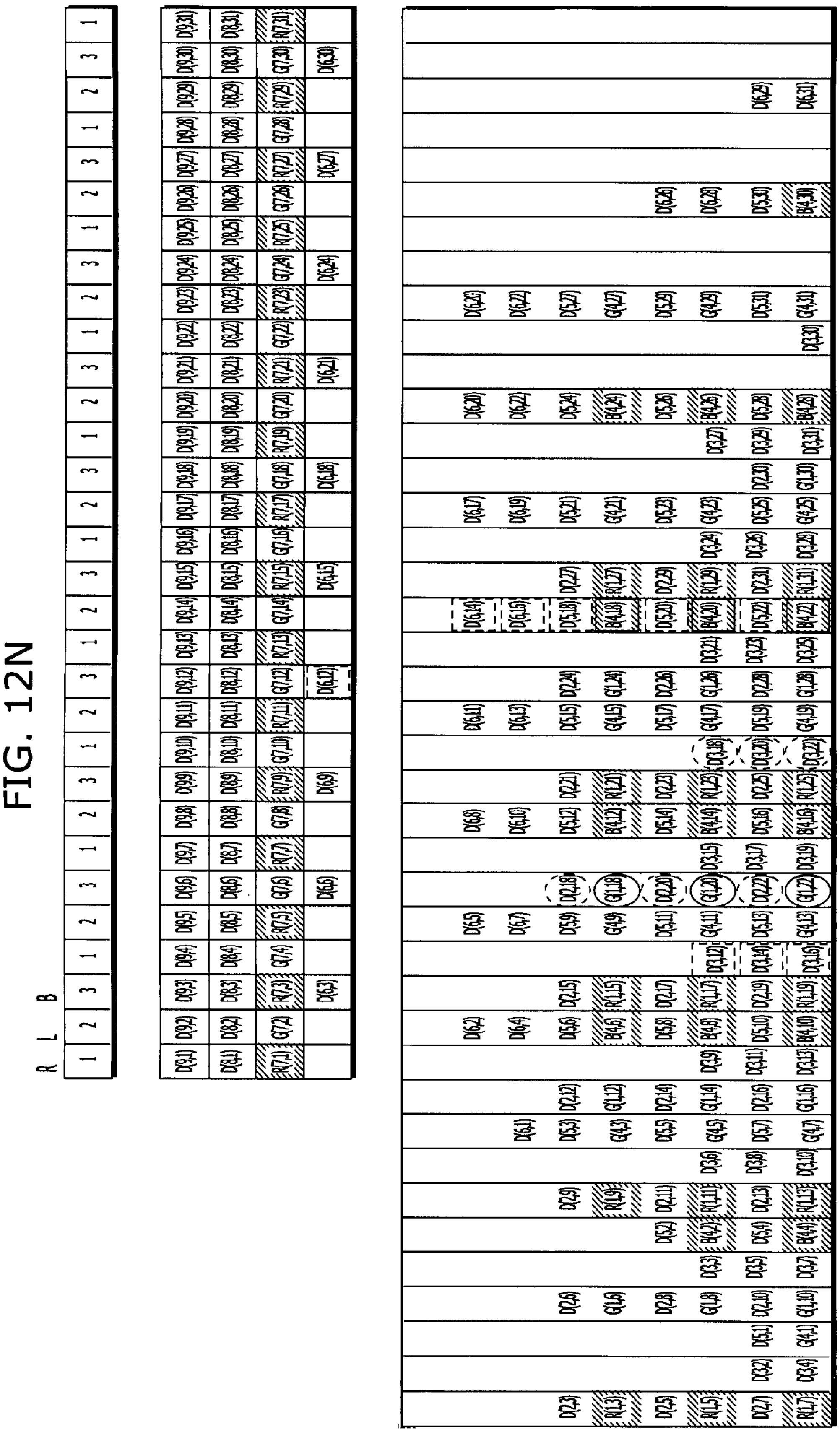
Figure 12O:
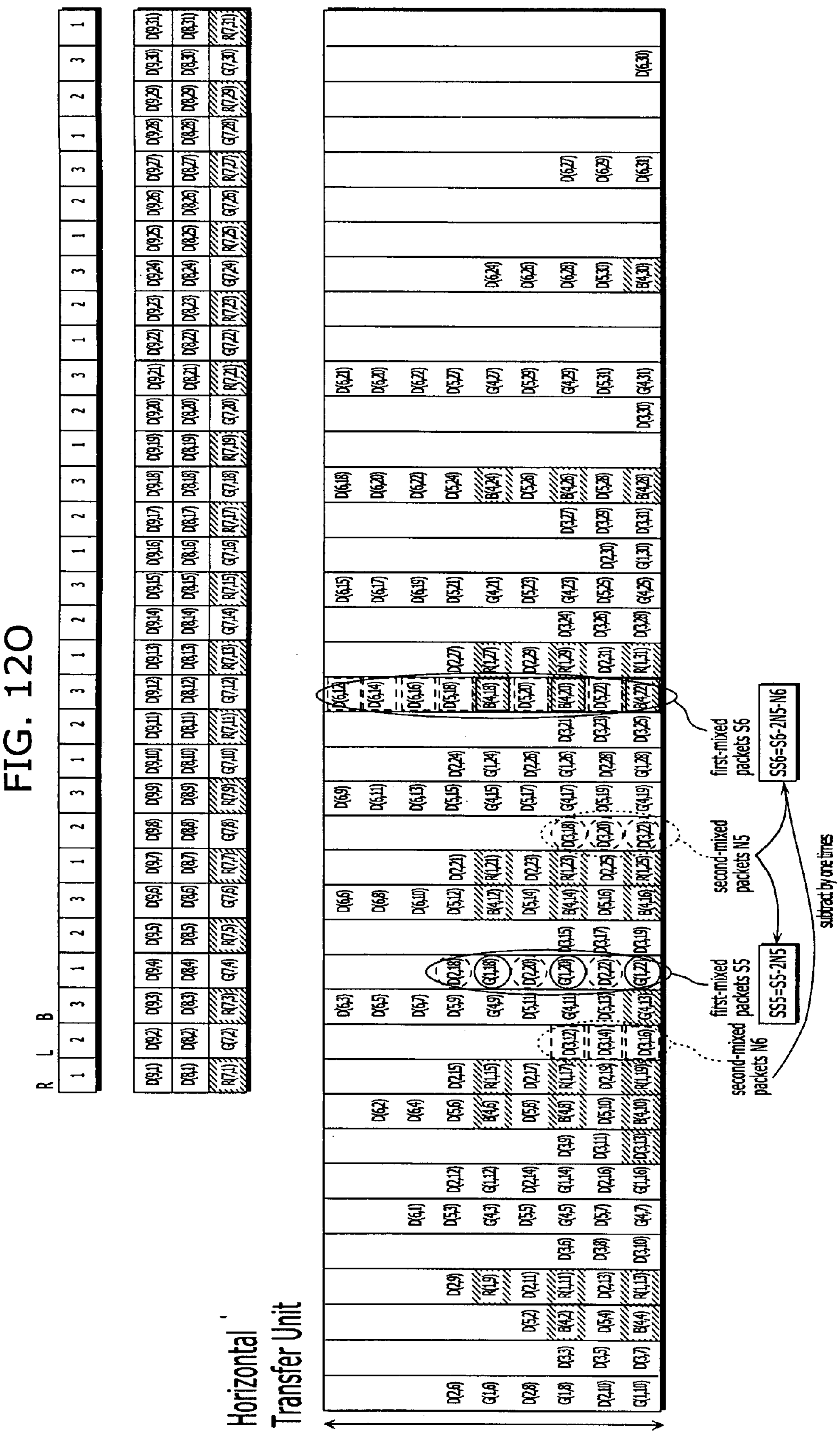

FIGS. 12A to 12O are diagrams showing, as one example, how signal packets and dummy packets are transferred and mixed in the packets-mixing mode.

FIG. 12O shows a result of the processing starting from FIG. 12A, where the first mixed packets and the second mixed packets are generated in the horizontal transfer unit 14, by combining the vertical mixing and the horizontal mixing. FIGS. 12B to 12N show mid-steps in the processing. In the figures, solid-line circles and solid-line rectangles show signal packets, and dashed-line circles and dashed-line rectangles show dummy packets.

A first mixed packet S5 in FIG. 12O is one example of the first mixed packets of the first type in the horizontal transfer unit 14. A first mixed packet S6 is one example of the first mixed packets of the second type in the horizontal transfer unit 14. Furthermore, second mixed packets N5 and N6 in FIG. 12O are examples of the second mixed packets in the horizontal transfer unit 14.

Noise in the first mixed packet S5 is almost cancelled according to the following equation 5.

$$SS5=S5-2N5 \quad \text{(equation 5)}$$

Noise in the first mixed packet S6 is almost cancelled according to the following equation 6.

$$SS6=S6-2N5-N6 \quad \text{(equation 6)}$$

In this noise reduction processing, relativity between a column of the first mixed packet and a column of the second mixed packet is improved, so that noise components in the first mixed packet become just integral multiple of noise components in the second mixed packet. Thereby, accuracy of the noise reduction processing is improved.

Moreover, all columns of the 1st, 2nd, and 3rd columns always have backup of dummy packets. In other words, each signal packet has one dummy packet belonging to the same column. Therefore, vertical line noise rarely occurs in all columns of the 1st, 2nd, and 3rd columns. More specifically, regarding the first and second mixed packets in all columns, the noise reduction processing can almost prevent the vertical line noise which occurs when transfer channels in the vertical transfer units or readout gates from the light-receiving elements have defective.

Figure 13:
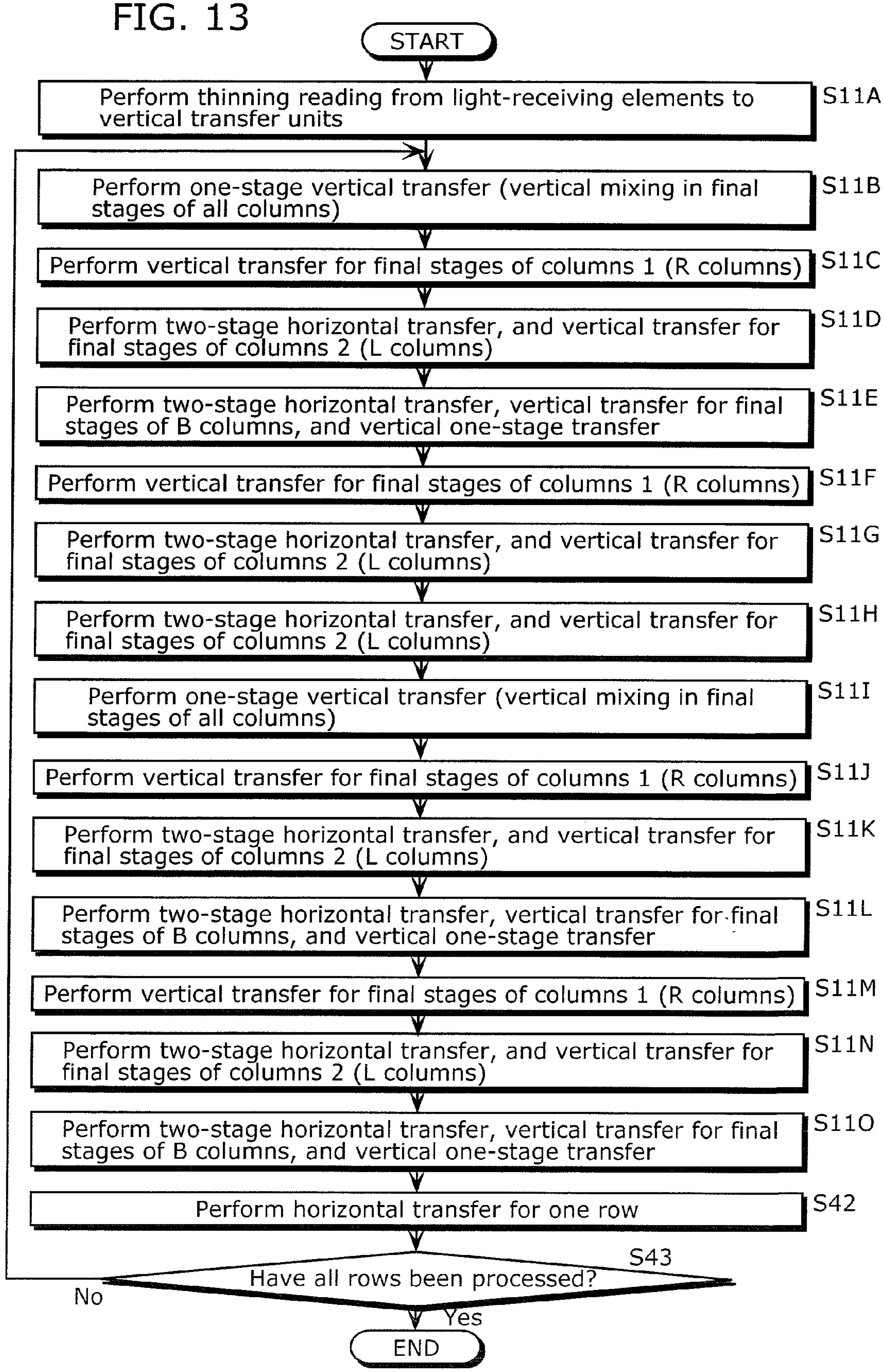
FIG. 13 is a flowchart of driving the pixel mixing according to the third embodiment.

FIG. 13 is a flowchart performed by the timing generation circuit 20 for driving transfer processing of FIGS. 12A to 12O. Steps S11A to S110 correspond to FIGS. 12A to 12O, respectively.

At step S11A of FIG. 13, the timing generation circuit 20 drives the vertical transfer units 13 to perform thinning reading from the light-receiving elements 12 to the vertical transfer units 13. The result is shown in FIG. 12A. In FIG. 12A, all stages of the horizontal transfer unit 14 are still empty.

At step S11B, the timing generation circuit 20 drives the vertical transfer unit 13 to perform one-stage vertical transfer, including vertical mixing in the final stages of all columns. The result is shown in FIG. 12B.

At step S11C, the timing generation circuit 20 drives the vertical transfer units 13 to transfer packets in final stages of the 1st columns (R columns) in a vertical direction. The result is shown in FIG. 12C.

At step S11D, the timing generation circuit 20 drives the horizontal transfer unit 14 to perform two-stage horizontal transfer, and then drives the vertical transfer unit 13 to vertically transfer packets in final stages of the 2nd columns (L columns). The result is shown in FIG. 12D.

At step S11E, the timing generation circuit 20 drives the horizontal transfer unit 14 to perform two-stage horizontal transfer, and then drives the vertical transfer unit 13 to perform one-stage vertical transfer for final stage of B columns. The result is shown in FIG. 12E.

At step S11F, the timing generation circuit 20 drives the vertical transfer unit 13 to vertically transfer packets in final stages of the 1st columns (R columns). The result is shown in FIG. 12F.

At step S11G, the timing generation circuit 20 drives the horizontal transfer unit 14 to perform two-stage horizontal transfer, and then drives the vertical transfer unit 13 to vertically transfer packets in final stages of the 2nd columns (L columns). The result is shown in FIG. 12G.

At step S11H, the timing generation circuit 20 drives the horizontal transfer unit 14 to perform two-stage horizontal transfer, and then drives the vertical transfer unit 13 to perform one-stage vertical transfer for final stages of the 1st columns (R columns). The result is shown in FIG. 12H.

At step S11I, the timing generation circuit 20 drives the vertical transfer unit 13 to perform one-stage vertical transfer, including vertical mixing in the final stages of all columns. The result is shown in FIG. 12I.

At step S11J, the timing generation circuit 20 drives the vertical transfer unit 13 to vertically transfer packets in final stages of the 1st columns (R columns). The result is shown in FIG. 12J.

At step S11K, the timing generation circuit 20 drives the horizontal transfer unit 14 to perform two-stage horizontal transfer, and then drives the vertical transfer unit 13 to vertically transfer packets in final stages of the 2nd columns (L columns). The result is shown in FIG. 12K.

At step S11L, the timing generation circuit 20 drives the horizontal transfer unit 14 to perform two-stage horizontal transfer, and then drives the vertical transfer unit 13 to perform one-stage vertical transfer for final stages of the 3rd columns (B columns). The result is shown in FIG. 12L.

At step S11M, the timing generation circuit 20 drives the vertical transfer unit 13 to vertically transfer packets in final stages of the 1st columns (R columns). The result is shown in FIG. 12M.

At step S11N, the timing generation circuit 20 drives the horizontal transfer unit 14 to perform two-stage horizontal transfer, and then drives the vertical transfer unit 13 to vertically transfer packets in final stages of the 2nd columns (L columns). The result is shown in FIG. 12N.

At step S11O, the timing generation circuit 20 drives the horizontal transfer unit 14 to perform two-stage horizontal transfer, and then drives the vertical transfer unit 13 to perform one-stage vertical transfer for final stages of the 3rd columns (B columns). The result is shown in FIG. 12O.

Then, at Step S42, the timing generation circuit 20 drives the horizontal transfer unit 14 to sequentially transfer for one row. At step S43, it is determined whether or not there is any signal packet in the vertical transfer unit 13 which has not yet been transferred. If the determination is made that there is no such a signal packet (Yes at S43), then the processing is complete. On the other hand, if there is any such a signal packet (No at S43), then the processing returns to step S11B to repeat the above-explained processing.

Figure 14:
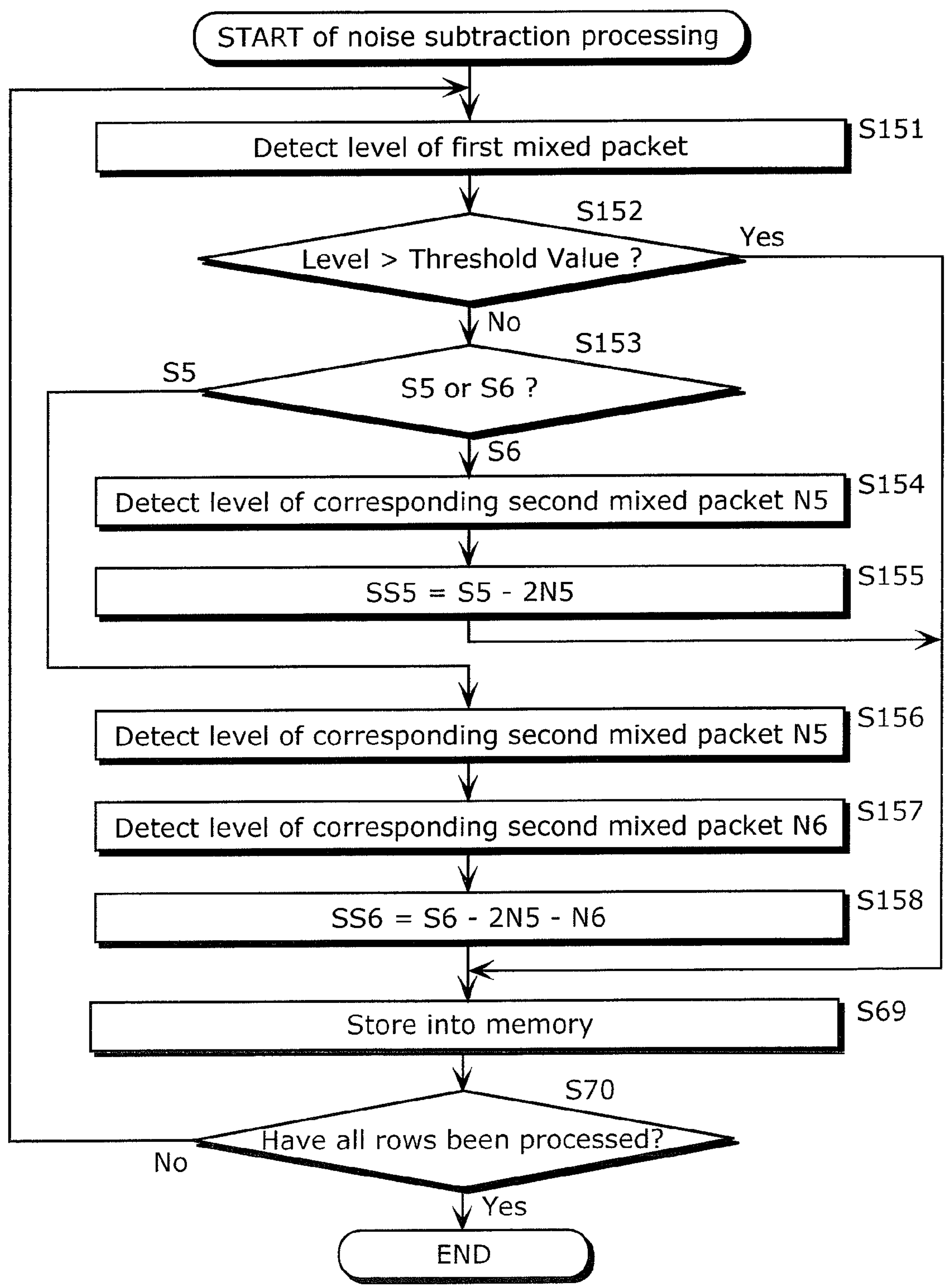
FIG. 14 is a flowchart of noise reduction processing according to the third embodiment.

During a horizontal transfer period for one row at Step S42, the image processing unit 33 performs the noise reduction processing. FIG. 14 is a flowchart of noise reduction processing performed by the image processing unit 33. The noise reduction processing of FIG. 14 is the almost same as the processing of FIGS. 7 and 9. The following describes mainly the difference between the processing of FIG. 14 and the processing of FIGS. 7 and 9.

At Step S155, the image processing 33 almost cancels noise components from the first mixed packet according to the equation 5.

$$SS5=S5-2N5 \qquad \text{(equation 5)}$$

In addition, at Step S158, the image processing 33 almost cancels noise components from the first mixed packet according to the equation 6.

$$SS6=S6-2N5-N6 \qquad \text{(equation 6)}$$

In the noise reduction processing, noise components in the first mixed packet become just integral multiple of noise components in the second mixed packet, which makes it possible to improve accuracy of the noise reduction processing.

As described above, in the solid-state imaging apparatus according to the third embodiment, relativity between a column of the first mixed packet and a column of the second mixed packet is improved, so that noise components in the first mixed packet become just integral multiple of noise components in the second mixed packet. Thereby, it is possible to improve accuracy of the noise reduction.

Furthermore, in all columns, each signal packet has one dummy packet belonging to the same column. Therefore, regarding the first and second mixed packets in all columns, the noise reduction processing can significantly reduce the vertical line noise which occurs when transfer channels in the vertical transfer units or readout gates from the light-receiving elements have defective.

Fourth Embodiment

In the solid-state imaging apparatus according to the fourth embodiment, final stages of the vertical transfer units 13 do not have any independent transfer electrodes, but have hold units, as the above described holding units. Each of the hold units is formed between the horizontal transfer unit and each of the vertical transfer units in N columns except M columns in the column group each including N columns. The hold units hold and transfer signal charges independently in every N other columns.

Figure 15:
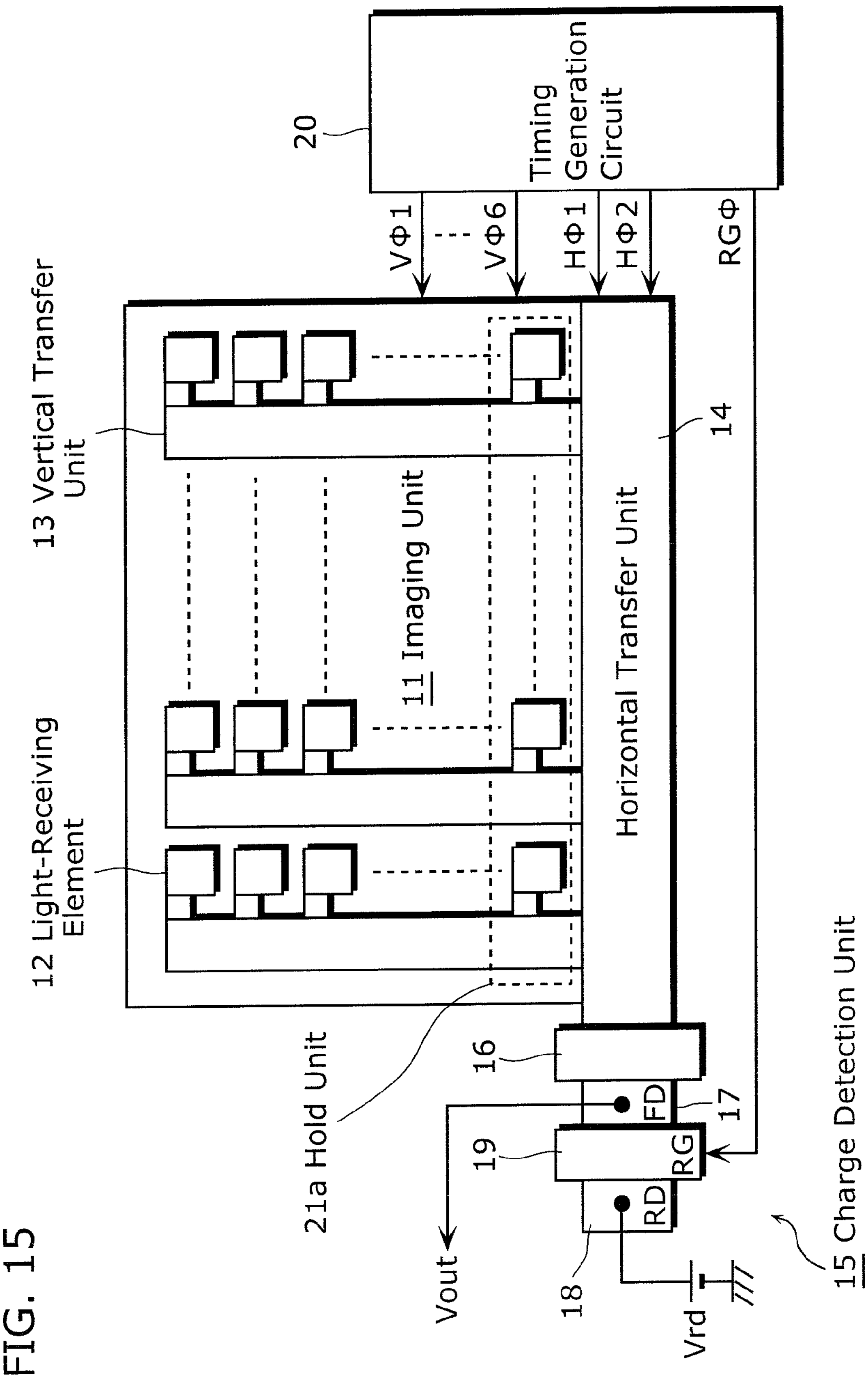
FIG. 15 is a block diagram showing a structure of a solid-state imaging apparatus according to the fourth embodiment of the present invention.

FIG. 15 is a block diagram showing a structure of the solid-state imaging apparatus according to the fourth embodiment of the present invention. The structure of FIG. 15 differs from the structure of FIG. 2 in that final stages 21 in all of the vertical transfer units 13 do not have independent transfer electrodes, and that a plurality of hold units 21*a* are added. Hereinafter, the same aspects as the first embodiment are not explained again in the fourth embodiment, and difference between the first and fourth embodiments is mainly described.

Each of the hold units 21*a* is formed between the horizontal transfer unit 14 and each of the vertical transfer units 13 in N columns except M columns in the column group each including N columns. The hold units 21 hold and transfer signal charges independently in every N other columns. The hold units 21*a* have the almost same functions as the final stages 21 of FIG. 2.

The timing generation circuit 20 drives a plurality of the hold units 21*a*, as well as a plurality of the vertical transfer units 13 and the horizontal transfer unit 14. More specifically, the timing generation circuit 20 performs driving so that the hold units perform vertical transfer to the horizontal transfer, generating the first mixed packets and the second mixed packets in the horizontal transfer unit.

Figure 16:
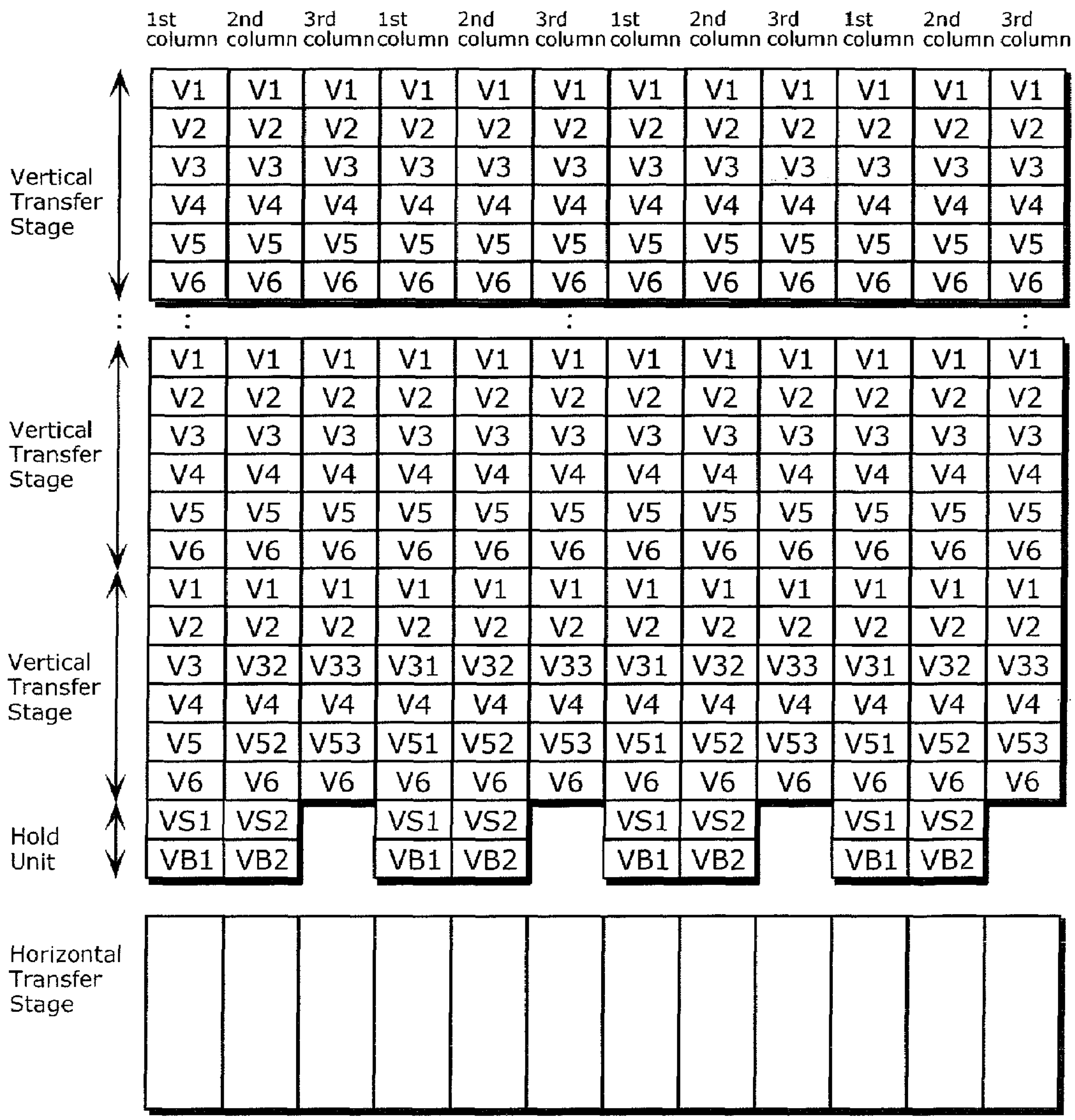
FIG. 16 is a block diagram showing another example of a structure of electrodes in the solid-state imaging apparatus according to the fourth embodiment.

FIG. 16 is a block diagram showing an example of a structure of electrodes in the solid-state imaging apparatus according to the fourth embodiment. The structure of FIG. 16 differs from the structure of FIG. 3 in that the six electrodes (six phases) on the final stage 21 of the vertical transfer unit 13 are replaced to electrodes VS1 and VB2 on the hold unit 21*a*. Hereinafter, the same aspects as the first embodiment are not explained again in the fourth embodiment, and difference between the first and fourth embodiments is mainly described.

The electrode VS1 is a storage electrode which is provided with driving signals for controlling to or not to hold signal charges in the hold unit. The electrode VB2 is a barrier electrode which is provided with driving signals for controlling to or not to transfer signal charges from the hold unit to the horizontal transfer unit 14.

Moreover, a camera having the solid-stage imaging apparatus according to the fourth embodiment is the same as the camera of FIG. 4. Details of the camera are not explained again herein.

Processing performed by the above-structured solid-state imaging apparatus of the fourth embodiment is described herein.

FIGS. 17A to 17M are diagrams showing, as one example, how signal packets and dummy packets are transferred and mixed in the packets-mixing mode.

Figure 17A:
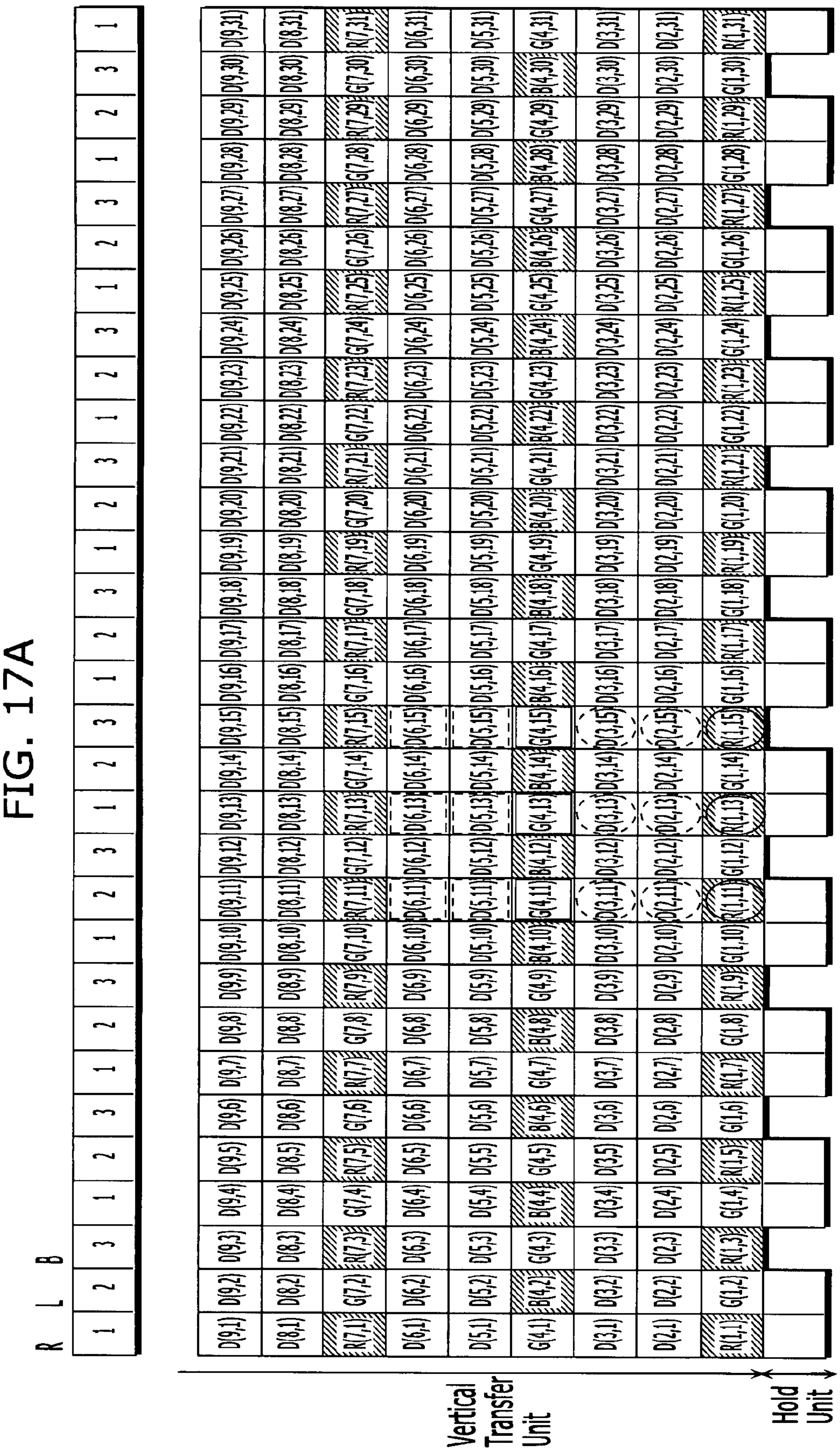
FIGS. 17A to 17M are diagrams for explaining pixel mixing according to the fourth embodiment.
Figure 17B:
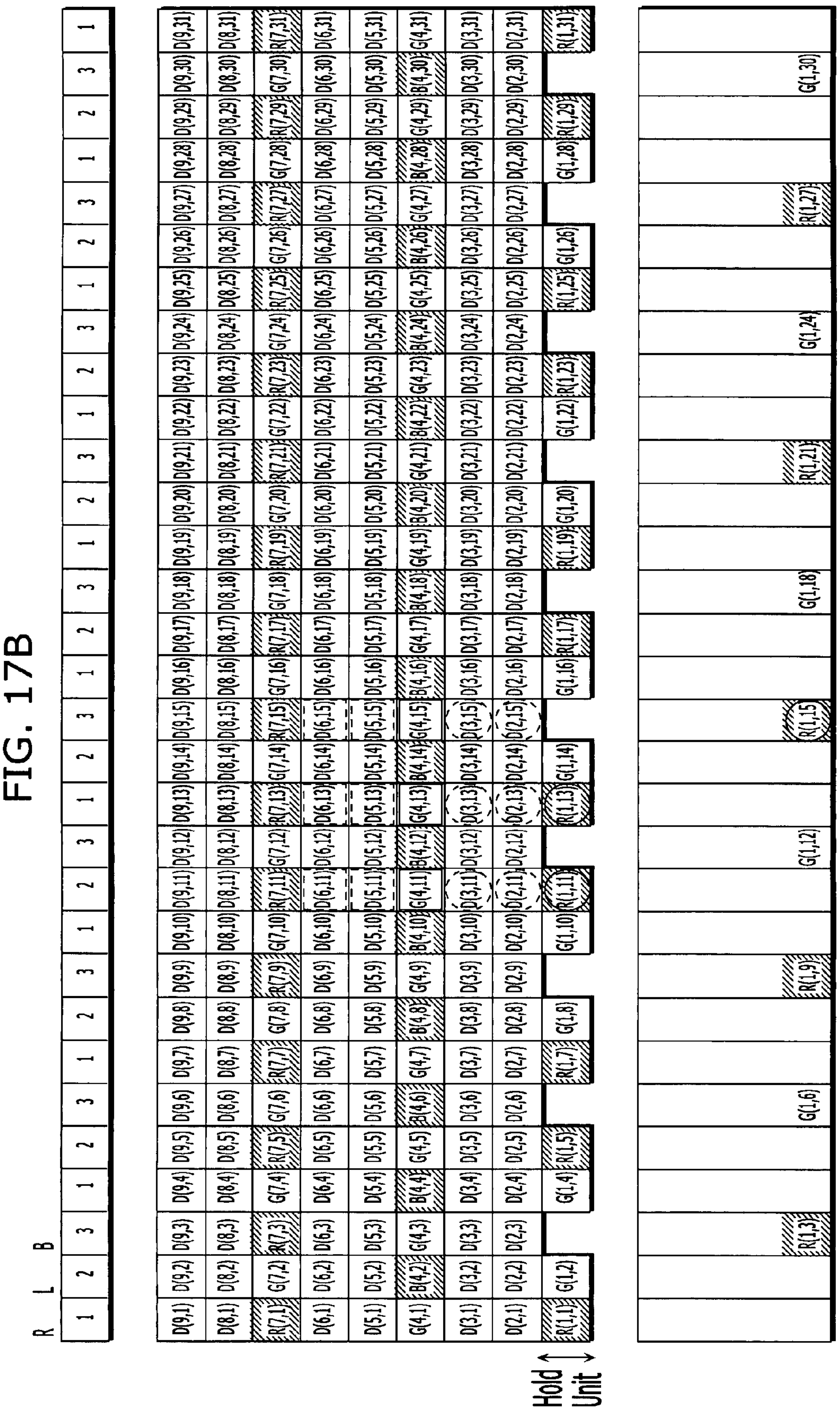
Figure 17C:
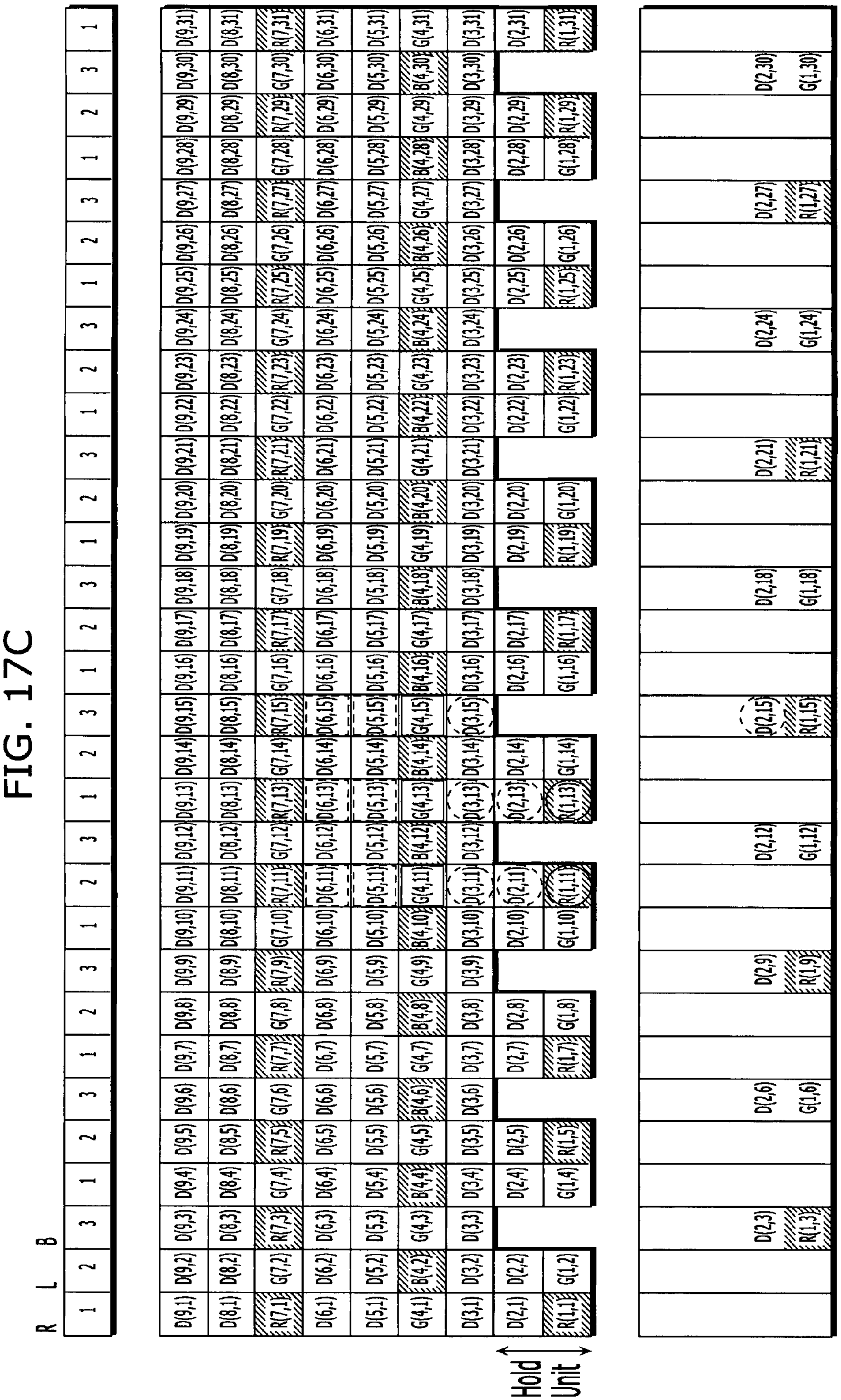
Figure 17D:
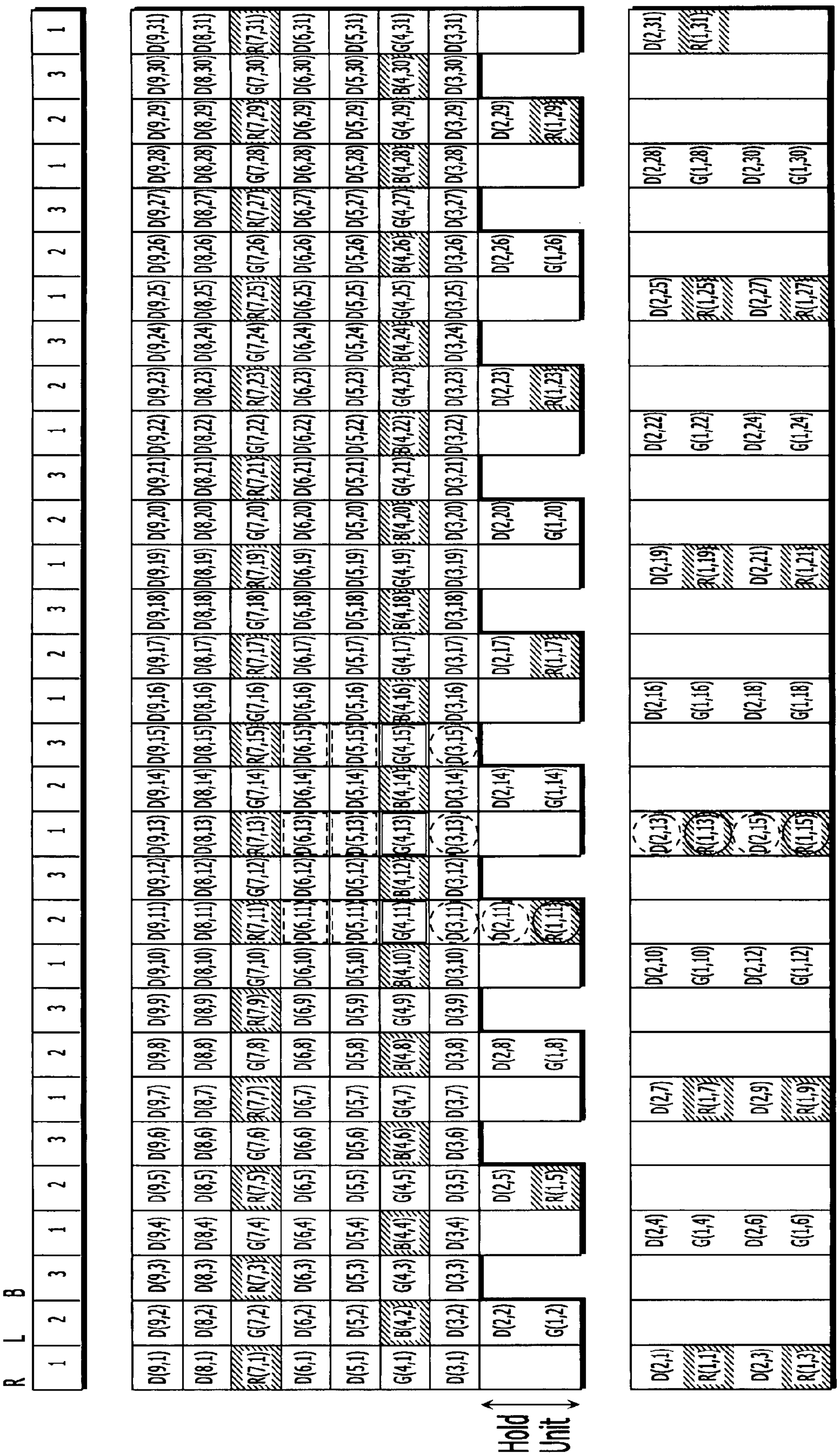
Figure 17E:
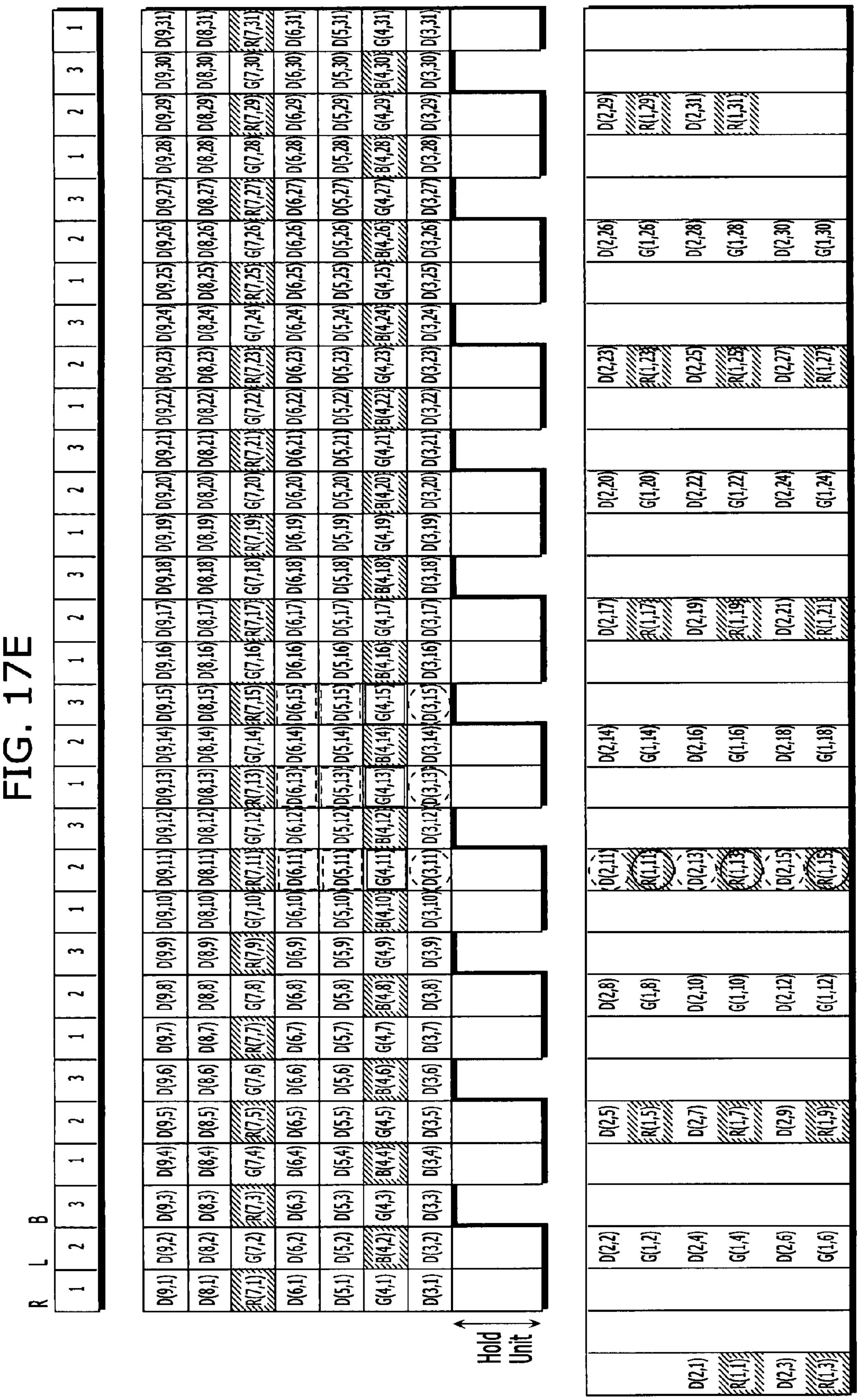
Figure 17F:
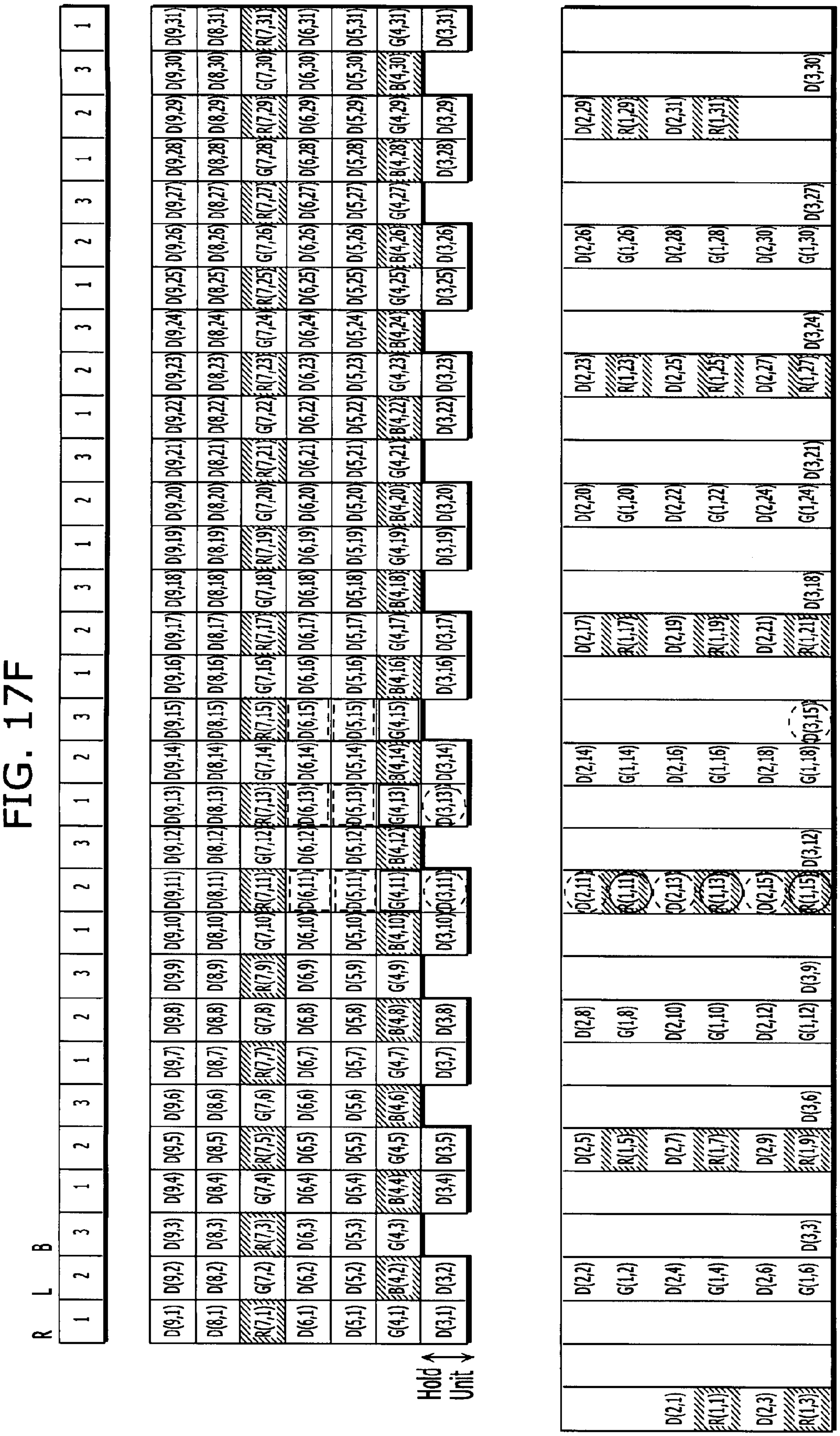
Figure 17G:
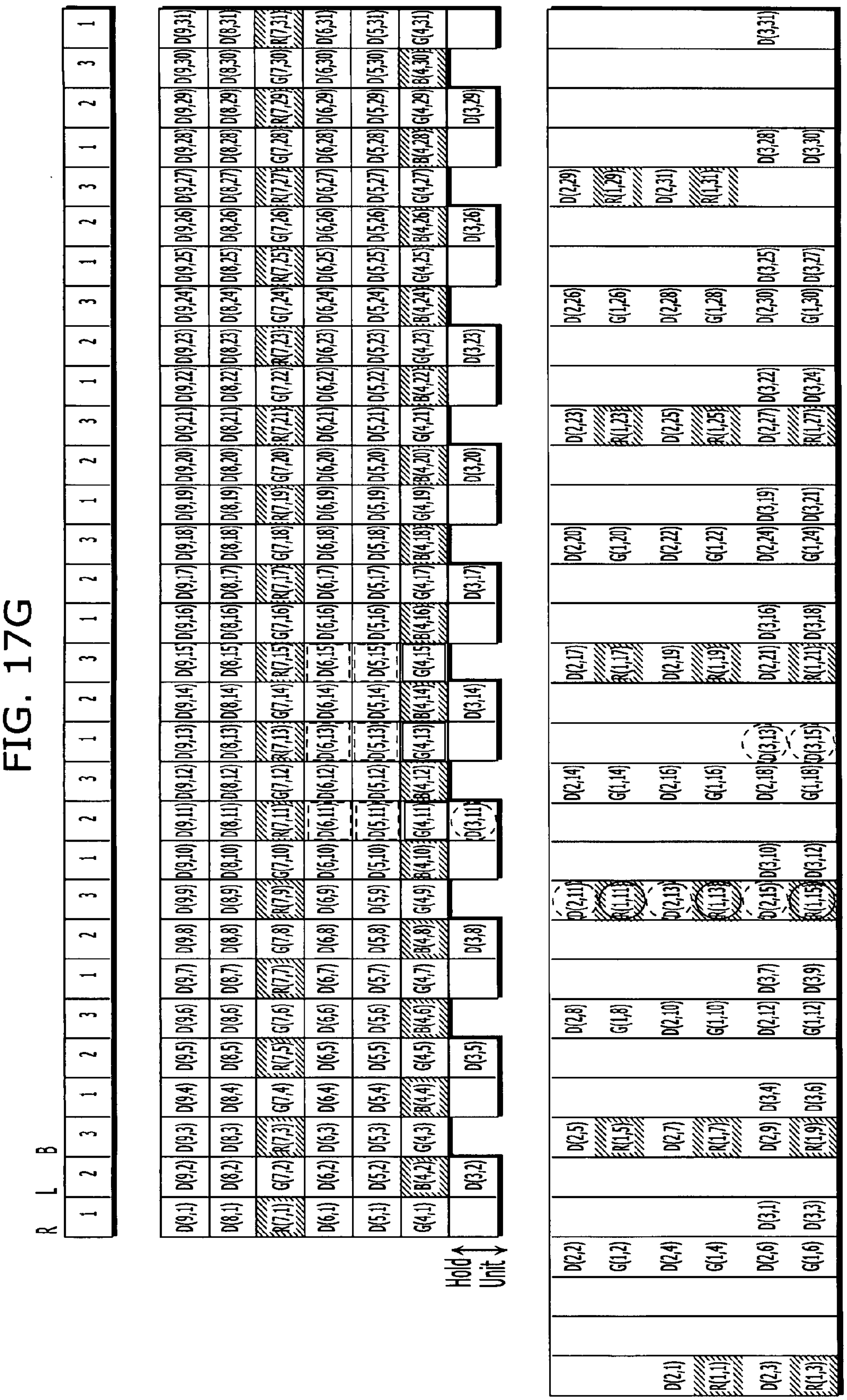
Figure 17H:
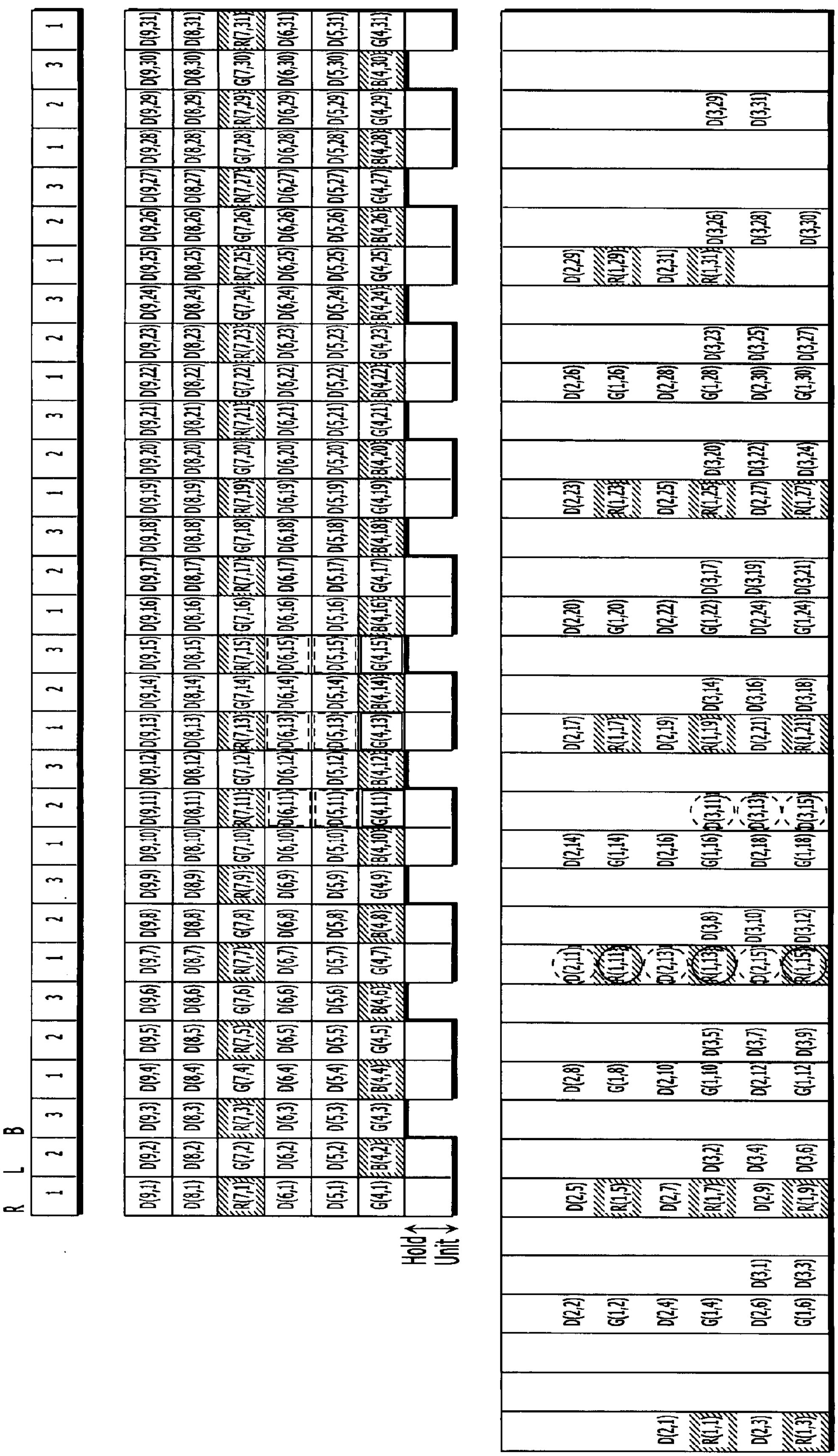
Figure 17I:
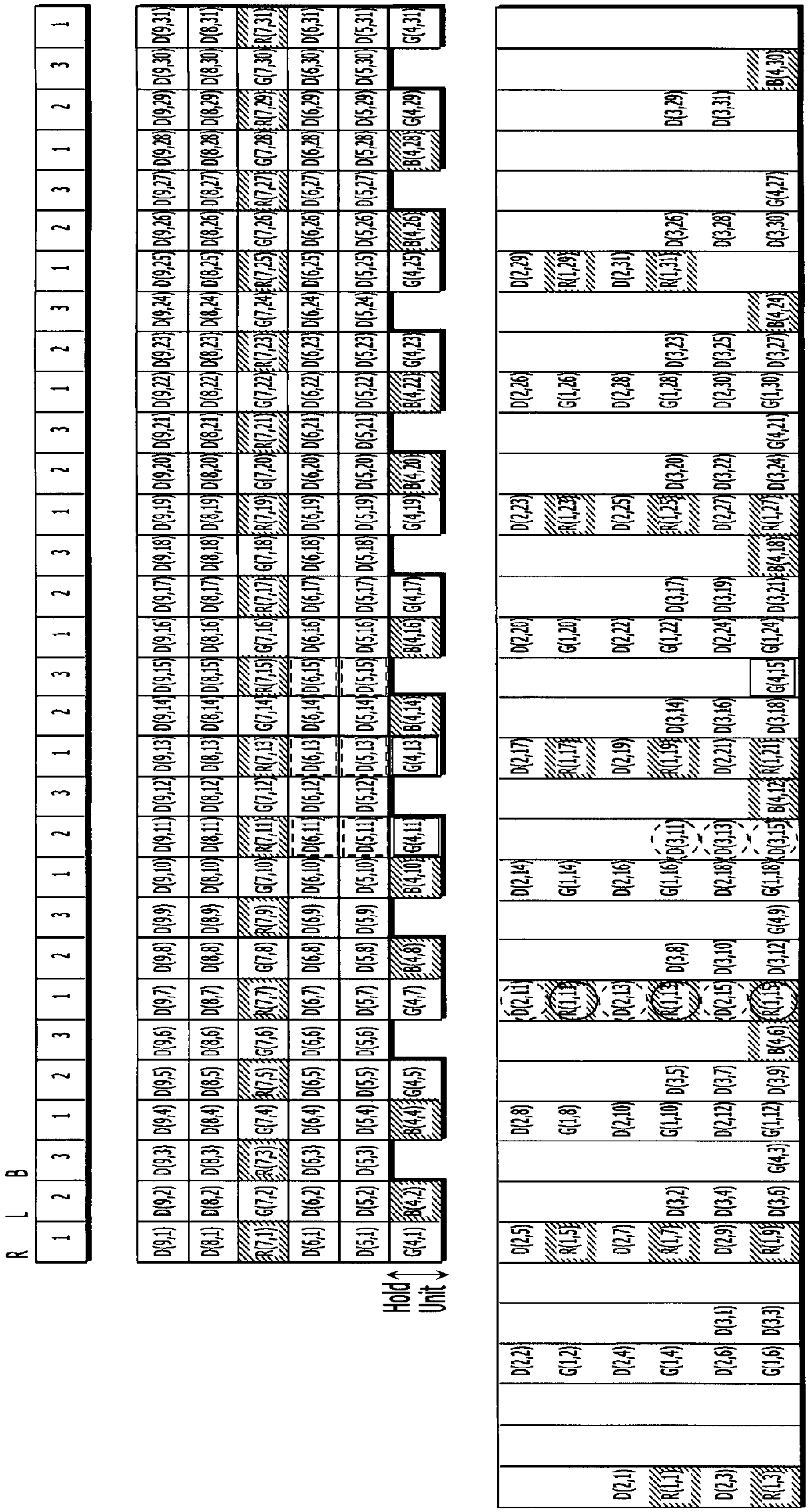
Figure 17J:
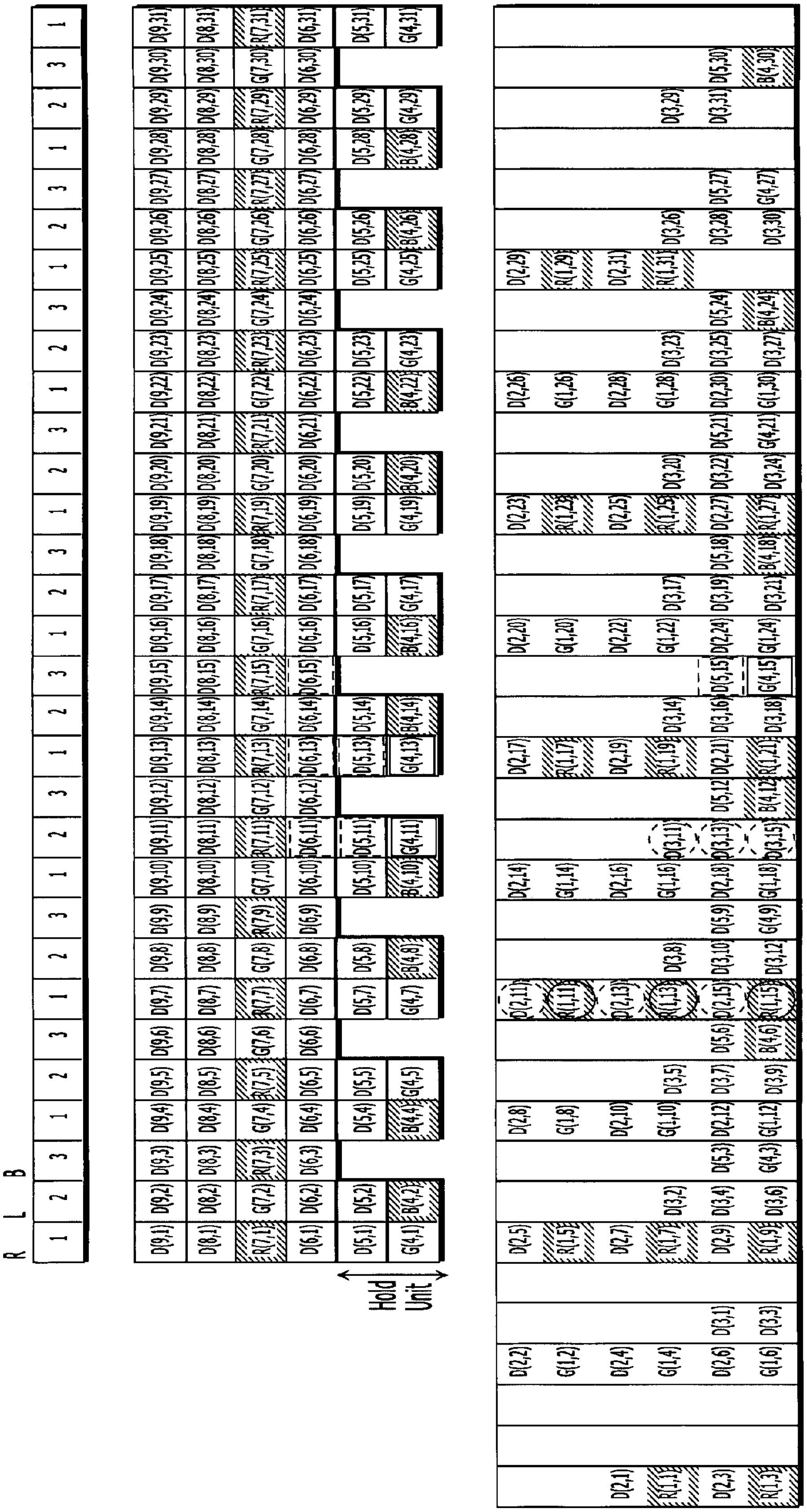
Figure 17K:
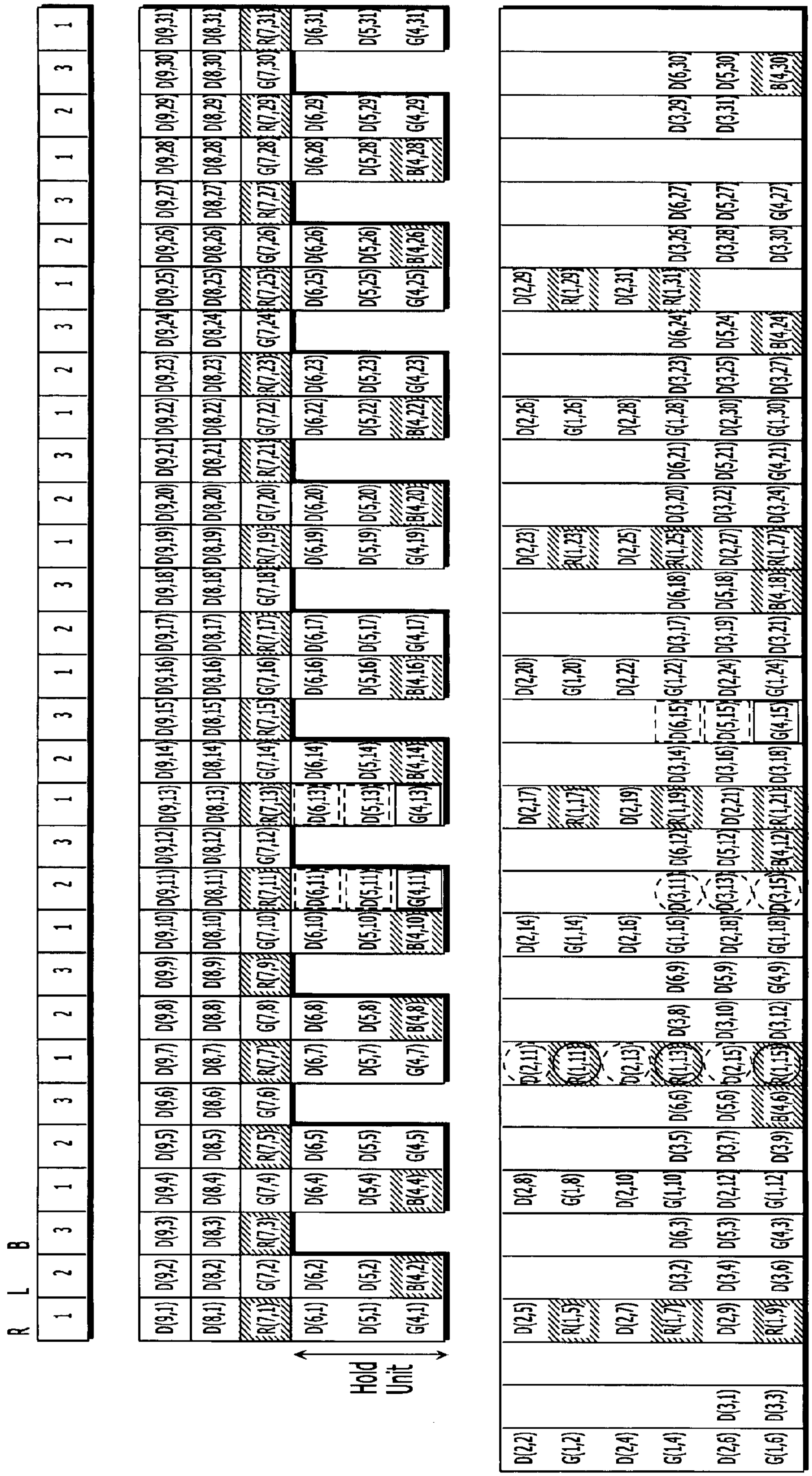
Figure 17L:
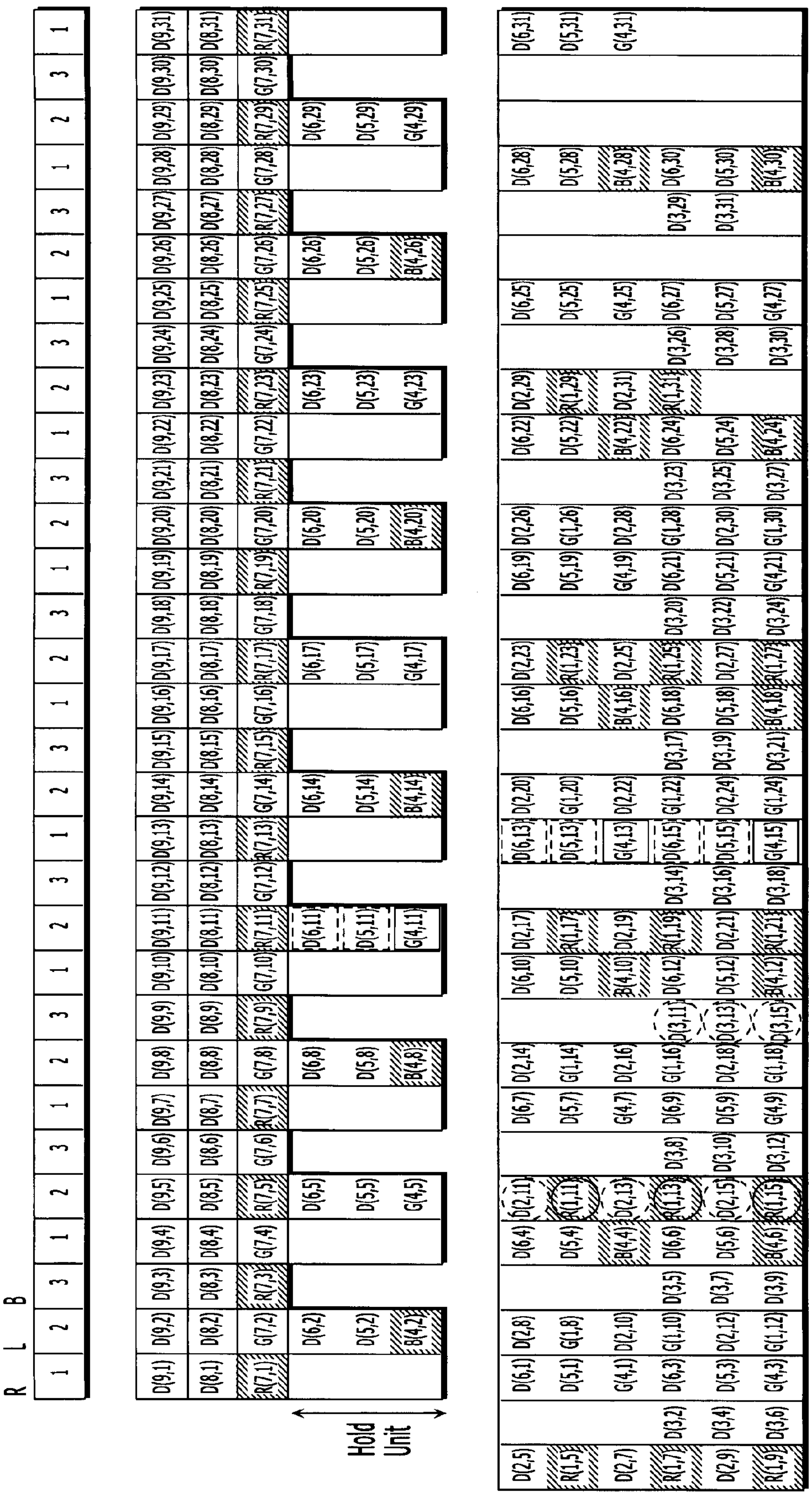
Figure 17M:
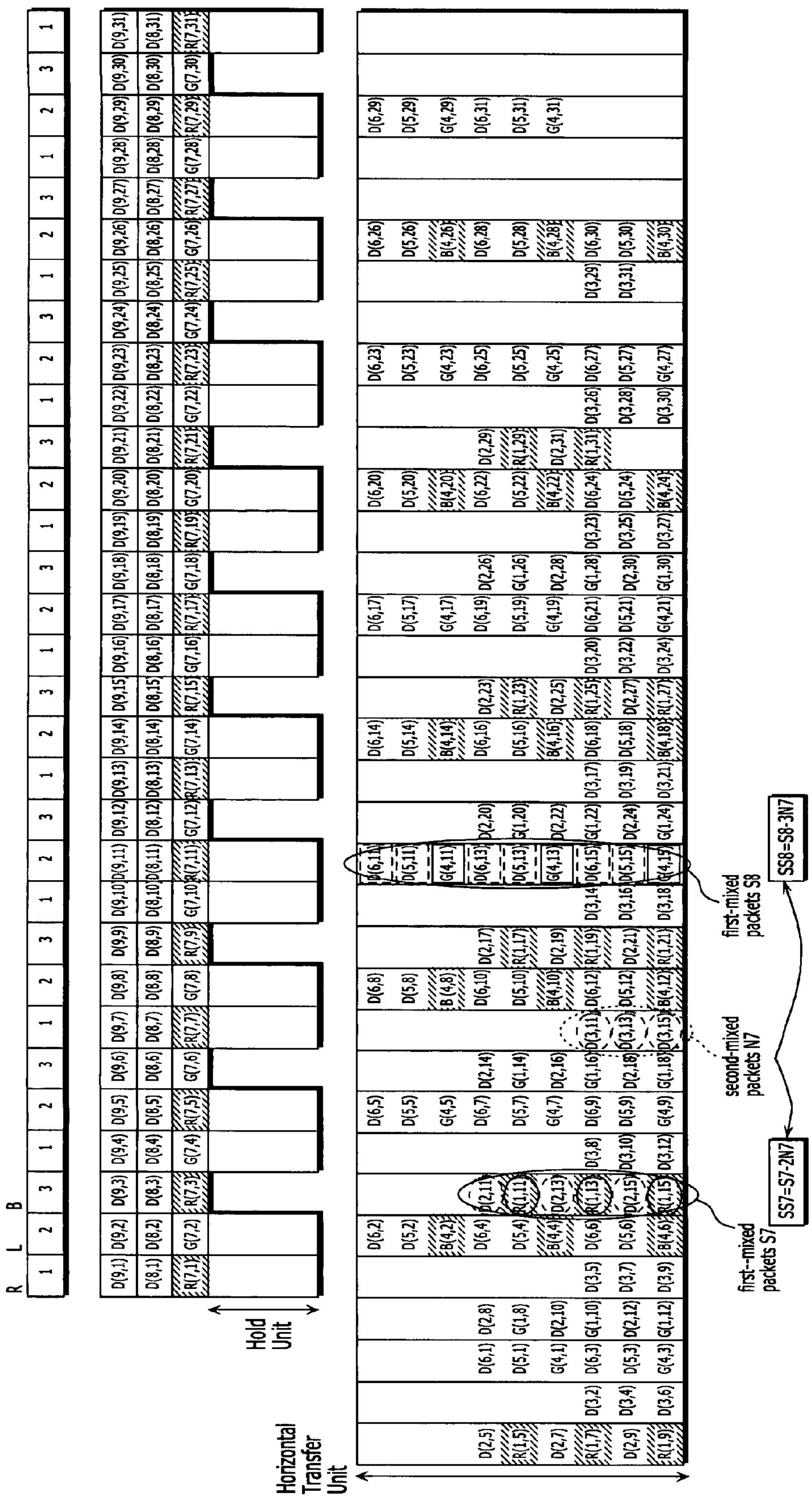

FIG. 17M shows a result of the processing starting from FIG. 17A, where the first mixed packets and the second mixed packets are generated in the horizontal transfer unit 14, by combining the vertical mixing and the horizontal mixing. FIGS. 17B to 17L show mid-steps in the processing. In the figures, solid-line circles and solid-line rectangles show signal packets, and dashed-line circles and dashed-line rectangles show dummy packets.

A first mixed packet S7 in FIG. 17M is one example of the first mixed packets of the first type in the horizontal transfer unit 14. A first mixed packet S8 is one example of the first mixed packets of the second type in the horizontal transfer unit 14. Furthermore, second mixed packets N7 in the figure are examples of a plurality of the second mixed packets in the horizontal transfer unit 14.

Noise in the first mixed packet S7 is almost cancelled according to the following equation 7.

$$SS7=S7-2N7 \qquad \text{(equation 7)}$$

Noise in the first mixed packet S8 is almost cancelled according to the following equation 8.

$$SS8=S8-3N7 \qquad \text{(equation 8)}$$

In this noise reduction processing, relativity between a column of the first mixed packet and a column of the second mixed packet is improved, so that noise components in the first mixed packet become just integral multiple of noise components in the second mixed packet. Thereby, accuracy of the noise reduction processing is improved.

Moreover, all columns of the 1st, 2nd, and 3rd columns always have backup of dummy packets. In other words, each signal packet has one dummy packet belonging to the same column. Therefore, vertical line noise rarely occurs in any columns. In other words, regarding the first and second mixed packets in all columns, the noise reduction processing can almost prevent the vertical line noise which occurs when transfer channels in the vertical transfer units or readout gates from the light-receiving elements have defective.

Figure 18:
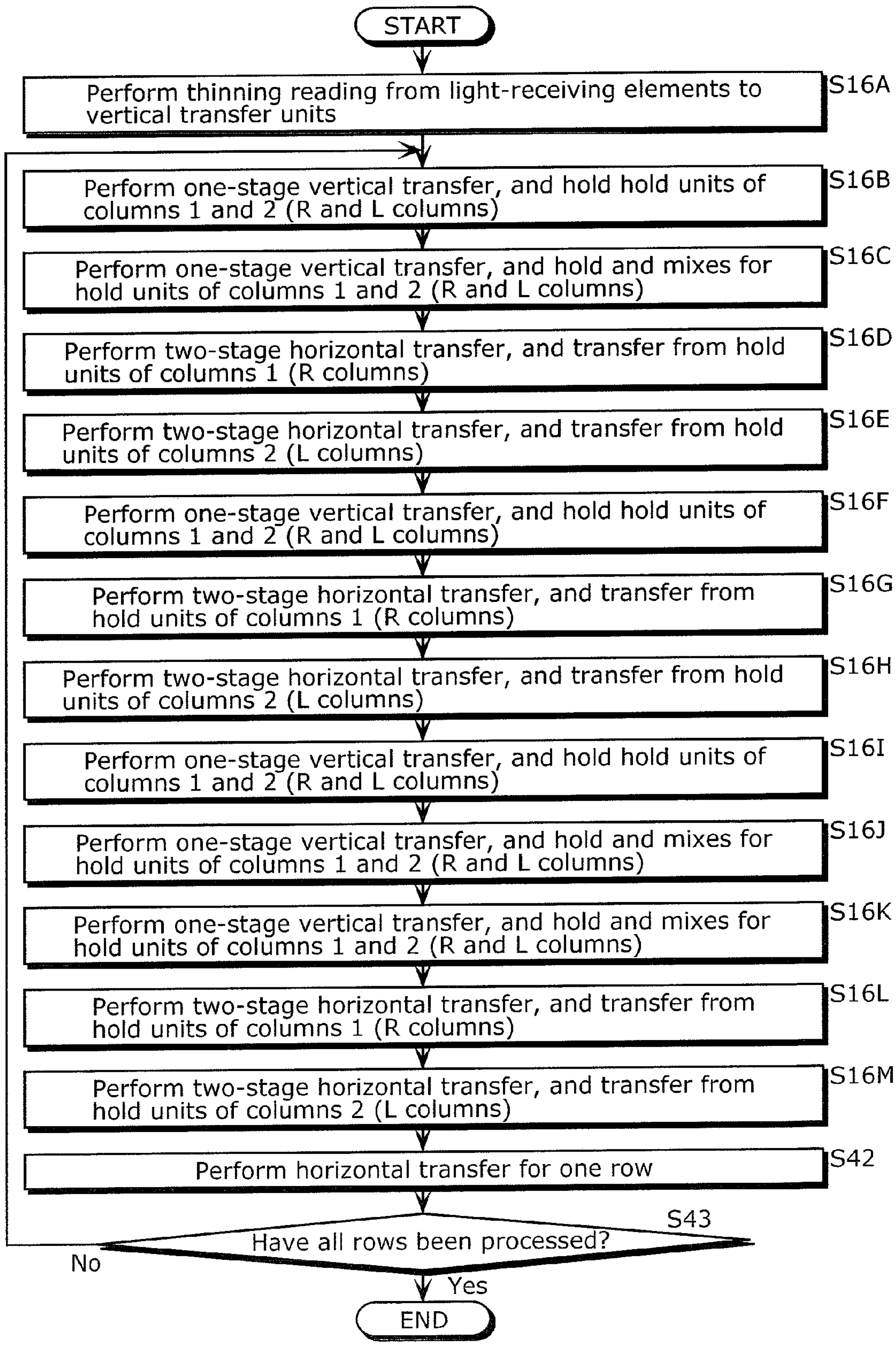
FIG. 18 is a flowchart of driving the pixel mixing according to the fourth embodiment.

FIG. 18 is a flowchart performed by the timing generation circuit 20 for driving transfer processing of FIGS. 17A to 17M. Steps S16A to S16M correspond to FIGS. 17A to 17M, respectively.

At step S16A of FIG. 18, the timing generation circuit 20 drives the vertical transfer units 13 to perform thinning reading from the light-receiving elements 12 to the vertical transfer units 13. The result is shown in FIG. 17A. In FIG. 17A, all stages of the horizontal transfer unit 14 are still empty.

At step S16B, the timing generation circuit 20 drives the vertical transfer unit 13 to perform one-stage vertical transfer, including holding in the 1st and 2nd columns (R and L columns). The result is shown in FIG. 17B.

At step S16C, the timing generation circuit 20 drives the vertical transfer unit 13 to perform one-stage vertical transfer, including holding and mixing in the 1st and 2nd columns (R and L columns). The result is shown in FIG. 17C.

At step S16D, the timing generation circuit 20 drives the horizontal transfer unit 14 to perform two-stage horizontal transfer, and the vertical transfer unit 13 to perform transfer from the hold units in the 1st columns (R columns). The result is shown in FIG. 17D.

At step S16E, the timing generation circuit 20 drives the horizontal transfer unit 14 to perform two-stage horizontal transfer, and the vertical transfer unit 13 to perform transfer from the hold units in the 2nd columns (L columns). The result is shown in FIG. 17E.

At step S16F, the timing generation circuit 20 drives the vertical transfer unit 13 to perform one-stage vertical transfer, including holding in the 1st and 2nd columns (R and L columns). The result is shown in FIG. 17F.

At step S16G, the timing generation circuit 20 drives the horizontal transfer unit 14 to perform two-stage horizontal transfer, and the vertical transfer unit 13 to perform transfer from the hold units in the 1st columns (R columns). The result is shown in FIG. 17G.

At step S16H, the timing generation circuit 20 drives the horizontal transfer unit 14 to perform two-stage horizontal transfer, and the vertical transfer unit 13 to perform transfer from the hold units in the 2nd columns (L columns). The result is shown in FIG. 17H.

At step S16I, the timing generation circuit 20 drives the vertical transfer unit 13 to perform one-stage vertical transfer, including holding in the 1st and 2nd columns (R and L columns). The result is shown in FIG. 17I.

At step S16J, the timing generation circuit 20 drives the vertical transfer unit 13 to perform one-stage vertical transfer, including holding and mixing in the 1st and 2nd columns (R and L columns). The result is shown in FIG. 17J.

At step S16K, the timing generation circuit 20 drives the vertical transfer unit 13 to perform one-stage vertical transfer, including holding and mixing in the 1st and 2nd columns (R and L columns). The result is shown in FIG. 17K.

At step S16L, the timing generation circuit 20 drives the horizontal transfer unit 14 to perform two-stage horizontal transfer, and the vertical transfer unit 13 to perform transfer from the hold units in the 1st columns (R columns). The result is shown in FIG. 17L.

At step S16M, the timing generation circuit 20 drives the horizontal transfer unit 14 to perform two-stage horizontal transfer, and the vertical transfer unit 13 to perform transfer from the hold units in the 2nd columns (L columns). The result is shown in FIG. 17M.

Then, at Step S42, the timing generation circuit 20 drives the horizontal transfer unit 14 to sequentially transfer for one row. At step S43, it is determined whether or not there is any signal packet in the vertical transfer unit 13 which has not yet been transferred. If the determination is made that there is no such a signal packet (Yes at S43), then the processing is complete. On the other hand, if there is any such a signal packet (No at S43), then the processing returns to step S16B to repeat the above-explained processing.

During a horizontal transfer period for one row at Step S42, the image processing unit 33 performs the noise reduction processing.

Figure 19:
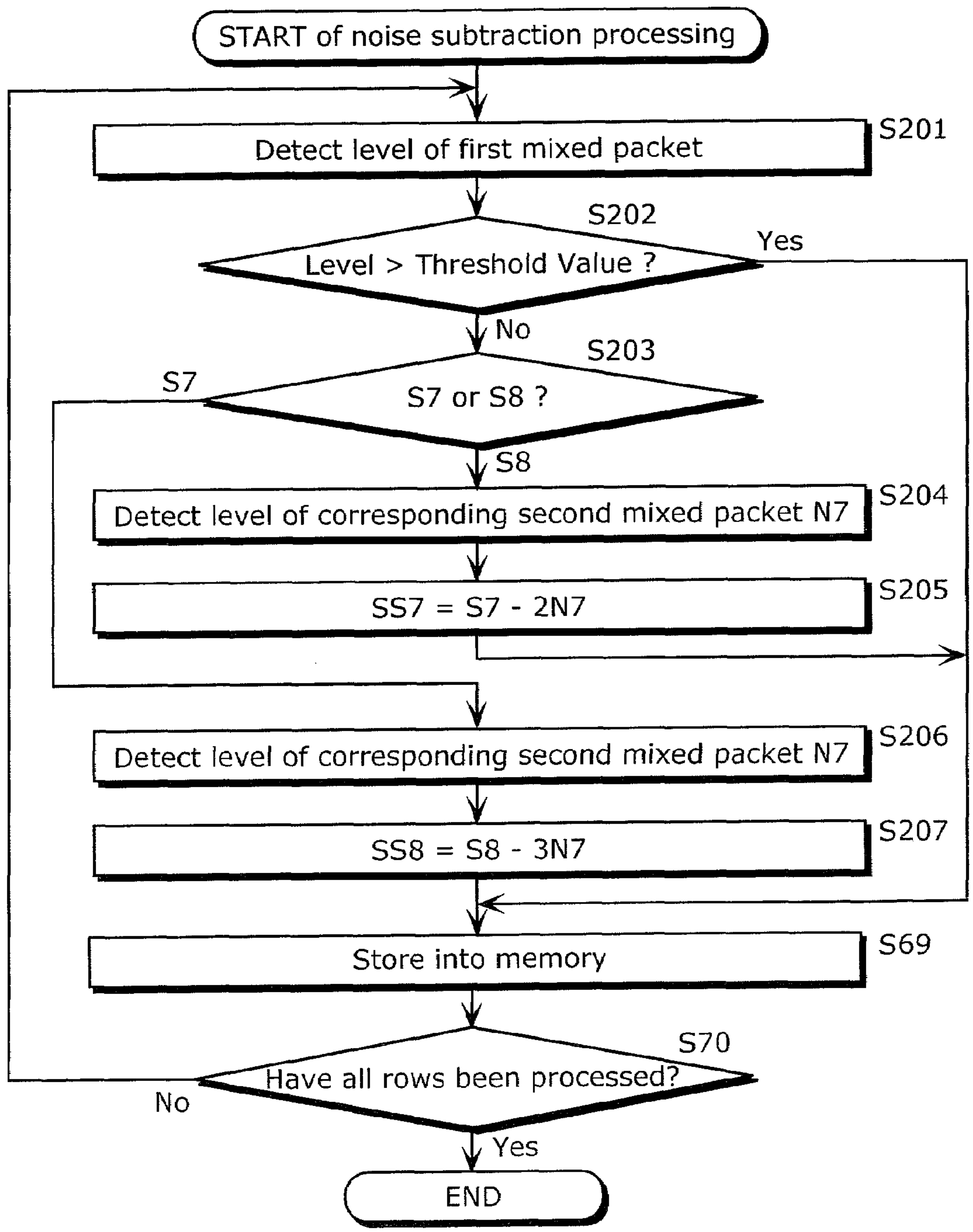
FIG. 19 is a flowchart of noise reduction processing according to the fourth embodiment.

FIG. 19 is a flowchart of noise reduction processing performed by the image processing unit 33. The noise reduction processing of FIG. 19 is the almost same as the processing of FIGS. 7 and 10. The following describes mainly the difference between the processing of FIG. 19 and the processing of FIGS. 7 and 10.

At Step S205, the image processing 33 almost cancels noise components from the first mixed packet according to the equation 7.

$$SS7=S7-2N7 \quad \text{(equation 7)}$$

In addition, at Step S207, the image processing 33 almost cancels noise components from the first mixed packet according to the equation 8.

$$SS8=S8-3N7 \quad \text{(equation 8)}$$

As described above, in the solid-state imaging apparatus according to the fourth embodiment, relativity between a column of the first mixed packet and a column of the second mixed packet is improved, so that noise components in the first mixed packet become just integral multiple of noise components in the second mixed packet. Thereby, accuracy of the noise reduction processing is improved. Moreover, all columns always have backup of dummy packets, which makes it possible to prevent the vertical line noise. Transfer is performed from the hold units to the horizontal transfer unit, so that timing of the driving become easy.

Note that, in the first to fourth embodiments, as the second mixed packets used for the noise reduction, it is also possible to use an average value of second mixed packets which belong to the identical column based on output from horizontal transfer unit in a plurality of rows. Since each transfer packet has random noise such as shot noise corresponding to an amount of charges in the packet, simple subtraction processing using such transfer packets would increase the random noise. However, by using a value of the second mixed packet in which random noise is reduced, it is possible to prevent noise increase in the processing, thereby improving image quality.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of this invention.

INDUSTRIAL APPLICABILITY

The present invention is suitable for a solid-state imaging apparatus having a plurality of light-receiving elements formed on a semiconductor substrate, and a camera having the solid-state imaging apparatus. For example, the present invention is suitable for a CCD image sensor, a digital still camera, a portable telephone having a camera function, a monitoring camera, a camera unit connected to an information processing apparatus, or the like.

What is claimed is:

1. A solid-state imaging apparatus comprising:

a plurality of light-receiving elements which are arranged by rows and columns;

a plurality of vertical transfer units each of which is arranged for a corresponding column of said light-receiving elements, and is operable to vertically transfer a plurality of signal packets and a dummy packet in a packets-mixing mode, the signal packets including charges read from said light-receiving elements, the dummy packet being a packet other than the signal packets, and N columns of said vertical transfer units forming one column group;

a plurality of holding units which are arranged in final stages of said vertical transfer units in N columns except M columns in the column group, and each of which is operable to mix, hold, and vertically transfer charges of the signal packets and the dummy packet without depending on vertical transfer from upstream of said corresponding vertical transfer unit;

a horizontal transfer unit operable to mix, hold, and horizontally transfer the charges transferred from said holding units or said vertical transfer units in the M columns in the column group; and a driving unit operable to drive said vertical transfer units, said holding units, and said horizontal transfer unit, wherein said driving unit is operable to drive, in said packets-mixing mode, said holding units and said horizontal transfer unit to generate a first mixed packet and a second mixed packet in said horizontal transfer unit, the first mixed packet includes: a plurality of signal packets belonging to a same row and neighbor columns of a same color; and a dummy packet belonging to a same column as the signal packets, and the second mixed packet includes no signal packet but a plurality of dummy packets in a same column as the signal packets included in the first mixed packet.

2. The solid-state imaging apparatus according to claim 1, wherein said driving unit is operable to drive said holding units and said horizontal transfer unit to generate the second mixed packet, by mixing dummy packets belonging to an identical column in said holding units and then mixing the mixed dummy packets to a dummy packet belonging to a different column in said horizontal transfer unit by transferring the mixed packets from said holding units to said horizontal transfer unit.

3. The solid-state imaging apparatus according to claim 1, wherein the first mixed packet is classified into a first type and a second type, this first mixed packet of the first type includes: i signal packets belonging to a same row and neighbor columns of a same color; and i or less dummy packets belonging to same columns as the signal packets, where i is equal to or more than 2, the first mixed packet of the second type includes: i signal packets belonging to a same row and neighbor columns of a same color; j dummy packets belonging to same columns as the signal packets; and k, where j+K>i, dummy packets not belonging to same columns as the signal packets, and the second mixed packet includes dummy packets belonging to same columns as the signal packets and the dummy packets included in the first mixed packet, said solid-state imaging apparatus further comprising:

a first noise reduction unit operable to reduce noise in the first mixed packet of the first type using the second mixed packet; and a second noise reduction unit operable to reduce noise in the first mixed packet of the second type using the second mixed packet.

4. The solid-state imaging apparatus according to claim 1, wherein said plurality of holding units further include holding units formed in final stages of said vertical transfer units in M columns except N columns in the column group, and each of which is operable to mix, hold, and vertically transfer charges of the signal packets and the dummy packets without depending on vertical transfer from upstream of said corresponding vertical transfer unit.

5. The solid-state imaging apparatus according to claim 3, further comprising:

a comparison unit operable to compare a signal level of the first mixed packet of the first and second type to a threshold value, wherein said first noise reduction unit and said second noise reduction unit are operable not to reduce noise from the first mixed packet, when the signal level of the first mixed packet exceeds the threshold value.

6. The solid-state imaging apparatus according to claim 5, wherein the threshold value is a value corresponding to a saturated signal amount of the first mixed packet.

7. The solid-state imaging apparatus according to claim 3, wherein said light-receiving elements include an optical black pixel, said solid-state imaging apparatus further comprising a pre-processing unit operable to reduce a signal level of the optical black pixel from the second mixed packet, prior to the reducing performed by said first noise reduction unit and said second noise reduction unit.

8. The solid-state imaging apparatus according to claim 1, wherein said driving unit is operable to drive said holding units and said horizontal transfer unit to generate the first mixed packet, by mixing a signal packet and a dummy packet belonging to an identical column in said holding units and then mixing the mixed packets to a signal packet belonging to a different column in said horizontal transfer unit by transferring the mixed packets from said holding units to said horizontal transfer unit.

9. The solid-state imaging apparatus according to claim 1, wherein said driving unit is operable to:

drive said holding units and said horizontal transfer units to generate the first mixed packet, by mixing a signal packet and at least one dummy packet in said holding units and then mixing the mixed packets to another mixed packet including a signal packet belonging to a different column in said horizontal transfer unit by transferring the mixed packets from said holding units to said horizontal transfer unit, the dummy packet being among sequential dummy packets belonging to an identical column and being transferred vertically and sequentially after the former signal packet, and drive said holding units and said horizontal transfer unit to generate the second mixed packet, by mixing dummy packets remaining in the sequential dummy packets and mixing the mixed packets to another mixed packet including a dummy packet belonging to a different column in said horizontal transfer unit by transferring the mixed packets from said holding units to said horizontal transfer unit.

10. The solid-state imaging apparatus according to claim 1, wherein said driving unit is operable to:

drive said holding units and said horizontal transfer unit to generate the first or second mixed packet, by vertical mixing for mixing packets belonging to an identical column in said holding units, and horizontal mixing for mixing packets belonging to respective different columns in said horizontal transfer unit by transferring the packets from said holding unit or said vertical transfer units corresponding to the M columns, to said horizontal transfer unit; and drive the vertical mixing in said holding units in N columns except M columns in the column group, and simultaneously the horizontal mixing from said holding units corresponding to at least one column among the N columns and said vertical transfer units corresponding to the M columns, to said horizontal transfer unit.

11. The solid-state imaging apparatus according to claim 1, wherein said holding units are final transfer stages of said vertical transfer units in N columns except M columns in the column group, and have independent transfer electrodes in every N other columns.

12. The solid-state imaging apparatus according to claim 1, wherein said holding units, each of which is formed between said horizontal transfer unit and each of said vertical transfer units in N columns except M columns in the column group, are operable to hold and transfer the charges independently in every N other columns.

13. The solid-state imaging apparatus according to claim 3, wherein one of said first and second noise reduction units is operable to reduce noise from the first mixed packet using an average value of a plurality of second mixed packets belonging to an identical column, based on outputs from a plurality of rows outputted from said horizontal transfer unit.

14. A solid-state imaging apparatus, comprising:

a plurality of light-receiving elements which are arranged by rows and columns;

a plurality of vertical transfer units each of which is arranged for a corresponding column of said light-receiving elements, and is operable to vertically transfer a plurality of signal packets and a dummy packet in a packets-mixing mode, the signal packets including charges read from said light-receiving elements, the dummy packet being a packet other than the signal packets, and N columns of said vertical transfer units forming one column group which is repeated in a horizontal direction;

a plurality of holding units which are arranged in final stages of said vertical transfer units in N columns except M columns in the column group, and each of which is operable to mix, hold, and vertically transfer charges of the signal packets and the dummy packet without depending on vertical transfer from upstream of said corresponding vertical transfer unit;

a horizontal transfer unit operable to mix, hold, and horizontally transfer the charges transferred from said holding units or said vertical transfer units in the M columns in the column group; and a driving unit operable to drive said vertical transfer units, said holding units, and said horizontal transfer unit, wherein said driving unit is operable to drive, in said packets-mixing mode, said holding units and said horizontal transfer unit to generate a first mixed packet and a second mixed packet in said horizontal transfer unit, the first mixed packet includes: a plurality of signal packets belonging to a same row and neighbor columns of a same color; a dummy packet belonging to a same column as the signal packets, and the second mixed packet includes no signal packet but a plurality of dummy packets in a same column as the signal packets included in the first mixed packet, and said solid-state imaging apparatus further comprises:

a comparison unit operable to compare a signal level of the first mixed packet to a threshold value; and a noise reduction unit operable to reduce noise from the first mixed packet using the second mixed packet, when the signal level of the first mixed packet is less than the threshold value.

15. The solid-state imaging apparatus according to claim 14, wherein said noise reduction unit is operable to:

reduce noise from the first mixed packet using an average value of a plurality of second mixed packets belonging to an identical column, based on outputs from a plurality of rows outputted from said horizontal transfer unit.

16. A driving method of driving the solid-state imaging apparatus according to claim 1, said driving method comprising:

mixing dummy packets belonging to an identical column in the holding units; and mixing the mixed dummy packets to a dummy packet belonging to a different column in the horizontal transfer unit by transferring the mixed packets from the holding units to the horizontal transfer unit, so that the second mixed packet is generated.

17. A camera, comprising the solid-state imaging apparatus according to claim 1.

* * * * *